United States Patent
Candelore

(10) Patent No.: US 7,711,115 B2
(45) Date of Patent: May 4, 2010

(54) DESCRAMBLER

(75) Inventor: Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1218 days.

(21) Appl. No.: 10/690,192

(22) Filed: Oct. 21, 2003

(65) Prior Publication Data

US 2004/0088558 A1     May 6, 2004

Related U.S. Application Data

(63) Continuation-in-part of application No. 10/388,002, filed on Mar. 12, 2003.

(60) Provisional application No. 60/424,381, filed on Nov. 5, 2002.

(51) Int. Cl.
H04N 7/167 (2006.01)
(52) U.S. Cl. .................. 380/227; 380/228; 713/162
(58) Field of Classification Search ............ 380/284, 380/200–244; 713/162, 163
See application file for complete search history.

(56) References Cited

U.S. PATENT DOCUMENTS

| | | | |
|---|---|---|---|
| 3,852,519 A | 12/1974 | Court | 178/5.1 |
| 4,381,519 A | 4/1983 | Wilkinson et al. | |
| 4,419,693 A | 12/1983 | Wilkinson | |
| 4,521,853 A | 6/1985 | Guttag | |
| 4,634,808 A | 1/1987 | Moerder | |
| 4,700,387 A | 10/1987 | Hirata | |
| 4,703,351 A | 10/1987 | Kondo | |
| 4,703,352 A | 10/1987 | Kondo | |
| 4,710,811 A | 12/1987 | Kondo | |
| 4,712,238 A | 12/1987 | Gilhousen et al. | |
| 4,722,003 A | 1/1988 | Kondo | |
| 4,739,510 A | 4/1988 | Jeffers et al. | 380/15 |
| 4,772,947 A | 9/1988 | Kono | |
| 4,785,361 A | 11/1988 | Brotby | |
| 4,788,589 A | 11/1988 | Kondo | |
| 4,802,215 A | 1/1989 | Mason | 380/21 |
| 4,803,725 A | 2/1989 | Horne et al. | 380/44 |
| 4,815,078 A | 3/1989 | Shimura | |

(Continued)

FOREIGN PATENT DOCUMENTS

CA     2389247     5/2001

(Continued)

OTHER PUBLICATIONS

"How Networks Work, Millennium Edition", *Que Corporation*, (Sep. 2000),88-89.

(Continued)

*Primary Examiner*—Kimyen Vu
*Assistant Examiner*—Randal D Moran
(74) *Attorney, Agent, or Firm*—Blakely, Sokoloff, Taylor & Zafman LLP

(57) ABSTRACT

A descrambler adapted as an integrated circuit (IC) according to one embodiment. The descrambler comprises a control word ladder logic to produce, among other data, a control word to descramble incoming scrambled content. The descrambler further comprises copy protection key ladder logic to recover a copy protection key for encrypting descrambled content before subsequent transmission to a digital device.

31 Claims, 32 Drawing Sheets

U.S. PATENT DOCUMENTS

| | | |
|---|---|---|
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. ................... 380/20 |
| 4,953,023 A | 8/1990 | Kondo |
| 4,989,245 A | 1/1991 | Bennett |
| 4,995,080 A | 2/1991 | Bestler et al. ................. 380/21 |
| 5,018,197 A | 5/1991 | Jones et al. ................... 380/20 |
| 5,023,710 A | 6/1991 | Kondo et al. |
| 5,091,936 A | 2/1992 | Katznelson et al. .......... 380/19 |
| 5,122,873 A | 6/1992 | Golin |
| 5,124,117 A | 6/1992 | Tatebayashi et al. |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. ................. 380/9 |
| 5,258,835 A | 11/1993 | Kato |
| 5,319,707 A | 6/1994 | Wasilewski et al. |
| 5,325,432 A | 6/1994 | Gardeck et al. ............... 380/21 |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski et al. ...... 370/110.1 |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan ......................... 380/25 |
| 5,539,823 A | 7/1996 | Martin et al. .................. 380/20 |
| 5,539,828 A | 7/1996 | Davis |
| 5,555,305 A | 9/1996 | Robinson et al. ............. 380/14 |
| 5,561,713 A | 10/1996 | Suh ................................ 380/10 |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,721 A | 2/1997 | Kitazato |
| 5,606,359 A | 2/1997 | Youden et al. ................. 387/7 |
| 5,608,448 A | 3/1997 | Smoral et al. ................. 348/7 |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Dillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis ..................... 386/46 |
| 5,726,702 A | 3/1998 | Hamaguchi et al. |
| 5,732,346 A | 3/1998 | Lazaridis et al. |
| 5,742,680 A | 4/1998 | Wilson ......................... 380/16 |
| 5,742,681 A | 4/1998 | Giachetti et al. .............. 380/20 |
| 5,751,280 A | 5/1998 | Abbott et al. ................ 345/302 |
| 5,751,743 A | 5/1998 | Takizawa |
| 5,751,813 A | 5/1998 | Dorenbos ..................... 380/49 |
| 5,754,650 A | 5/1998 | Katznelson ................... 380/15 |
| 5,757,417 A | 5/1998 | Aras et al. ..................... 348/10 |
| 5,757,909 A | 5/1998 | Park |
| 5,768,539 A | 6/1998 | Metz et al. |
| 5,784,464 A | 7/1998 | Akiyama et al. |
| 5,787,171 A | 7/1998 | Kubota et al. |
| 5,787,179 A | 7/1998 | Ogawa et al. |
| 5,790,842 A | 8/1998 | Charles et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. ............... 380/10 |
| 5,805,712 A | 9/1998 | Davis |
| 5,805,762 A | 9/1998 | Boyce et al. |
| 5,809,147 A | 9/1998 | De Lange et al. ............. 380/28 |
| 5,815,146 A | 9/1998 | Youden et al. .............. 345/327 |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette .................... 348/7 |
| 5,894,516 A | 4/1999 | Brandenburg ................. 380/4 |
| 5,897,218 A | 4/1999 | Nishimura et al. ........... 386/94 |
| 5,915,018 A | 6/1999 | Aucsmith ..................... 380/4 |
| 5,917,830 A | 6/1999 | Chen et al. |
| 5,917,915 A | 6/1999 | Hirose |
| 5,922,048 A | 7/1999 | Emura ......................... 709/219 |
| 5,923,486 A | 7/1999 | Sugiyama et al. |
| 5,923,755 A | 7/1999 | Birch |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. ............... 345/302 |
| 5,973,722 A | 10/1999 | Wakai et al. |
| 5,999,622 A | 12/1999 | Yasukawa et al. ............ 380/4 |
| 5,999,698 A | 12/1999 | Nakai et al. ................. 386/125 |
| 6,005,561 A | 12/1999 | Hawkins et al. ............ 345/327 |
| 6,011,849 A | 1/2000 | Orrin ........................... 380/42 |
| 6,012,144 A | 1/2000 | Pickett ........................ 713/201 |
| 6,016,348 A | 1/2000 | Blatter et al. |
| 6,021,199 A | 2/2000 | Ishibashi ..................... 380/10 |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson ..................... 380/47 |
| 6,055,314 A | 4/2000 | Spies et al. |
| 6,055,315 A | 4/2000 | Doyle et al. |
| 6,057,872 A | 5/2000 | Candelore ..................... 348/3 |
| 6,058,186 A | 5/2000 | Enari ........................... 380/10 |
| 6,058,192 A | 5/2000 | Guralnick et al. |
| 6,061,451 A | 5/2000 | Muratani et al. |

| Patent Number | Date | Inventor | Ref |
|---|---|---|---|
| 6,064,748 A | 5/2000 | Hogan | 382/100 |
| 6,065,050 A | 5/2000 | DeMoney | 709/219 |
| 6,069,647 A | 5/2000 | Sullivan et al. | |
| 6,072,872 A | 6/2000 | Chang et al. | |
| 6,072,873 A | 6/2000 | Bewick | 380/217 |
| 6,073,122 A | 6/2000 | Wool | |
| 6,088,450 A | 7/2000 | Davis et al. | |
| 6,105,134 A | 8/2000 | Pinder et al. | |
| 6,108,422 A | 8/2000 | Newby et al. | |
| 6,115,821 A | 9/2000 | Newby et al. | |
| 6,118,873 A | 9/2000 | Lotspiech et al. | |
| 6,125,349 A | 9/2000 | Maher | |
| 6,134,237 A | 10/2000 | Brailean et al. | |
| 6,134,551 A | 10/2000 | Aucsmith | |
| 6,138,237 A | 10/2000 | Ruben et al. | |
| 6,154,206 A | 11/2000 | Ludtke | |
| 6,157,719 A * | 12/2000 | Wasilewski et al. | 380/210 |
| 6,178,242 B1 | 1/2001 | Tsuria et al. | |
| 6,181,334 B1 | 1/2001 | Freeman et al. | |
| 6,185,369 B1 | 2/2001 | Ko et al. | 386/125 |
| 6,185,546 B1 | 2/2001 | Davis | |
| 6,189,096 B1 | 2/2001 | Haverty | |
| 6,192,131 B1 | 2/2001 | Geer, Jr. et al. | |
| 6,199,053 B1 | 3/2001 | Herbert et al. | |
| 6,204,843 B1 | 3/2001 | Freeman et al. | 345/327 |
| 6,209,098 B1 | 3/2001 | Davis | |
| 6,215,484 B1 | 4/2001 | Freeman et al. | 345/327 |
| 6,222,924 B1 | 4/2001 | Salomaki | |
| 6,223,290 B1 | 4/2001 | Larsen et al. | |
| 6,226,618 B1 | 5/2001 | Downs | |
| 6,229,895 B1 | 5/2001 | Son et al. | 380/200 |
| 6,230,194 B1 | 5/2001 | Frailong et al. | |
| 6,230,266 B1 | 5/2001 | Perlman et al. | |
| 6,233,577 B1 | 5/2001 | Ramasubramani et al. | |
| 6,236,727 B1 | 5/2001 | Ciacelli et al. | |
| 6,240,553 B1 | 5/2001 | Son et al. | 725/95 |
| 6,246,720 B1 | 6/2001 | Kutner et al. | |
| 6,247,127 B1 | 6/2001 | Vandergeest | 713/100 |
| 6,256,747 B1 | 7/2001 | Inohara et al. | |
| 6,263,506 B1 | 7/2001 | Ezaki et al. | |
| 6,266,416 B1 | 7/2001 | Sigbjornsen et al. | |
| 6,266,480 B1 | 7/2001 | Ezaki et al. | |
| 6,272,538 B1 | 8/2001 | Holden et al. | |
| 6,278,783 B1 | 8/2001 | Kocher et al. | |
| 6,289,455 B1 * | 9/2001 | Kocher et al. | 713/194 |
| 6,292,568 B1 | 9/2001 | Akins et al. | 380/239 |
| 6,292,892 B1 | 9/2001 | Davis | |
| 6,307,939 B1 | 10/2001 | Vigarie | 380/210 |
| 6,311,012 B1 | 10/2001 | Cho et al. | 386/98 |
| 6,324,288 B1 | 11/2001 | Hoffman | |
| 6,330,672 B1 | 12/2001 | Shur | 713/176 |
| 6,351,538 B1 | 2/2002 | Uz | |
| 6,351,813 B1 | 2/2002 | Mooney et al. | |
| 6,377,589 B1 | 4/2002 | Knight et al. | |
| 6,378,130 B1 | 4/2002 | Adams | |
| 6,389,533 B1 | 5/2002 | Davis et al. | |
| 6,389,537 B1 | 5/2002 | Davis et al. | |
| 6,415,031 B1 | 7/2002 | Colligan et al. | 380/200 |
| 6,415,101 B1 | 7/2002 | deCarmo et al. | 386/105 |
| 6,418,169 B1 | 7/2002 | Datari | |
| 6,424,717 B1 | 7/2002 | Pinder et al. | |
| 6,430,361 B2 | 8/2002 | Lee | 386/98 |
| 6,442,689 B1 | 8/2002 | Kocher | |
| 6,445,738 B1 | 9/2002 | Zdepski et al. | |
| 6,449,718 B1 | 9/2002 | Rucklidge et al. | 713/168 |
| 6,452,923 B1 | 9/2002 | Gerszberg et al. | |
| 6,453,115 B1 | 9/2002 | Boyle | |
| 6,456,985 B1 | 9/2002 | Ohtsuka | |
| 6,459,427 B1 | 10/2002 | Mao et al. | 345/327 |
| 6,463,152 B1 | 10/2002 | Takahashi | 380/201 |
| 6,466,671 B1 | 10/2002 | Maillard et al. | |
| 6,477,649 B2 | 11/2002 | Kambayashi et al. | |
| 6,505,032 B1 | 1/2003 | McCorkle et al. | 455/41 |
| 6,510,554 B1 | 1/2003 | Gordon et al. | 725/90 |
| 6,519,693 B1 | 2/2003 | Debey | |
| 6,526,144 B2 | 2/2003 | Markandey et al. | |
| 6,529,526 B1 | 3/2003 | Schneidewend | |
| 6,543,053 B1 | 4/2003 | Li et al. | 725/88 |
| 6,549,229 B1 | 4/2003 | Kirby et al. | |
| 6,550,008 B1 | 4/2003 | Zhang et al. | |
| 6,557,031 B1 | 4/2003 | Mimura et al. | |
| 6,587,561 B1 | 7/2003 | Sered et al. | 380/241 |
| 6,590,979 B1 | 7/2003 | Ryan | |
| 6,609,039 B1 | 8/2003 | Schoen | 700/94 |
| 6,640,145 B2 | 10/2003 | Hoffberg et al. | 700/83 |
| 6,640,305 B2 | 10/2003 | Kocher et al. | |
| 6,643,298 B1 | 11/2003 | Brunheroto et al. | |
| 6,650,754 B2 | 11/2003 | Akiyama et al. | |
| 6,654,389 B1 | 11/2003 | Brunheroto et al. | |
| 6,678,740 B1 | 1/2004 | Rakib et al. | |
| 6,681,326 B2 | 1/2004 | Son et al. | 713/150 |
| 6,697,489 B1 | 2/2004 | Candelore | |
| 6,697,944 B1 | 2/2004 | Jones et al. | |
| 6,707,696 B1 | 3/2004 | Turner et al. | |
| 6,714,650 B1 | 3/2004 | Maillard et al. | |
| 6,754,276 B1 | 6/2004 | Harumoto et al. | |
| 6,772,340 B1 | 8/2004 | Peinado et al. | |
| 6,788,690 B2 | 9/2004 | Harri | |
| 6,788,882 B1 | 9/2004 | Geer et al. | |
| 6,826,185 B1 | 11/2004 | Montanaro et al. | |
| 6,834,110 B1 | 12/2004 | Marconcini et al. | |
| 6,895,128 B2 | 5/2005 | Bohnenkamp | |
| 6,904,520 B1 | 6/2005 | Rosset et al. | |
| 6,917,684 B1 | 7/2005 | Tatebayashi et al. | |
| 6,938,162 B1 | 8/2005 | Nagai et al. | |
| 6,976,166 B2 | 12/2005 | Herley et al. | |
| 7,010,685 B1 | 3/2006 | Candelore | |
| 7,039,802 B1 | 5/2006 | Eskicioglu et al. | |
| 7,039,938 B2 | 5/2006 | Candelore | |
| 7,058,806 B2 | 6/2006 | Smeets et al. | |
| 7,065,213 B2 | 6/2006 | Pinder | |
| 7,120,250 B2 | 10/2006 | Candelore | |
| 7,124,303 B2 | 10/2006 | Candelore et al. | |
| 7,127,619 B2 | 10/2006 | Unger et al. | |
| 7,139,398 B2 | 11/2006 | Candelore et al. | |
| 7,143,289 B2 | 11/2006 | Denning et al. | |
| 7,146,007 B1 | 12/2006 | Maruo et al. | |
| 7,151,831 B2 | 12/2006 | Candelore et al. | |
| 7,155,012 B2 | 12/2006 | Candelore et al. | |
| 7,242,766 B1 | 7/2007 | Lyle | |
| 2001/0030959 A1 | 10/2001 | Ozawa et al. | |
| 2001/0036271 A1 | 11/2001 | Javed | |
| 2001/0042043 A1 | 11/2001 | Shear et al. | |
| 2002/0003881 A1 | 1/2002 | Reitmeier et al. | |
| 2002/0021805 A1 | 2/2002 | Schumann et al. | |
| 2002/0026587 A1 | 2/2002 | Talstra et al. | |
| 2002/0044658 A1 | 4/2002 | Wasilewski et al. | |
| 2002/0046406 A1 | 4/2002 | Chelehmal et al. | |
| 2002/0047915 A1 | 4/2002 | Misu | |
| 2002/0059425 A1 | 5/2002 | Belfiore et al. | 709/226 |
| 2002/0066101 A1 | 5/2002 | Gordon et al. | |
| 2002/0083438 A1 | 6/2002 | So et al. | |
| 2002/0083439 A1 | 6/2002 | Eldering | |
| 2002/0090090 A1 * | 7/2002 | Van Rijnsoever et al. | 380/279 |
| 2002/0094084 A1 * | 7/2002 | Wasilewski et al. | 380/241 |
| 2002/0097322 A1 | 7/2002 | Monroe et al. | |
| 2002/0108035 A1 | 8/2002 | Herley et al. | |
| 2002/0109707 A1 | 8/2002 | Lao et al. | |
| 2002/0116705 A1 | 8/2002 | Perlman et al. | |
| 2002/0126890 A1 | 9/2002 | Katayama | |
| 2002/0129243 A1 | 9/2002 | Nanjundiah | |
| 2002/0150239 A1 | 10/2002 | Carny et al. | |
| 2002/0164022 A1 | 11/2002 | Strasser et al. | |
| 2002/0170053 A1 | 11/2002 | Peterka et al. | |
| 2002/0184506 A1 | 12/2002 | Perlman | |
| 2002/0188567 A1 | 12/2002 | Candelore | |

| | | | | | | |
|---|---|---|---|---|---|---|
| 2002/0194613 | A1 | 12/2002 | Unger ................... 725/118 | 2005/0097598 | A1 | 5/2005 | Pedlow, Jr. et al. |
| 2002/0196939 | A1 | 12/2002 | Unger et al. | 2005/0097614 | A1 | 5/2005 | Pedlow, Jr. et al. |
| 2003/0009669 | A1 | 1/2003 | White et al. | 2005/0102702 | A1 | 5/2005 | Candelore et al. |
| 2003/0021412 | A1 | 1/2003 | Candelore et al. ........... 380/217 | 2005/0129233 | A1 | 6/2005 | Pedlow |
| 2003/0026423 | A1 | 2/2003 | Unger et al. ................ 380/217 | 2005/0141713 | A1 | 6/2005 | Genevois |
| 2003/0026523 | A1 | 2/2003 | Chua et al. | 2005/0144646 | A1 | 6/2005 | Lecrom et al. |
| 2003/0035540 | A1 | 2/2003 | Freeman et al. | 2005/0169473 | A1 | 8/2005 | Candelore |
| 2003/0035543 | A1 | 2/2003 | Gillon et al. | 2005/0192904 | A1 | 9/2005 | Candelore |
| 2003/0046686 | A1 | 3/2003 | Candelore et al. ............. 725/31 | 2006/0026926 | A1 | 2/2006 | Triel et al. |
| 2003/0059047 | A1 | 3/2003 | Iwamura | 2006/0029060 | A1 | 2/2006 | Pister |
| 2003/0063615 | A1 | 4/2003 | Luoma et al. | 2006/0115083 | A1 | 6/2006 | Candelore et al. |
| 2003/0072555 | A1 | 4/2003 | Yap et al. | 2006/0130119 | A1 | 6/2006 | Candelore et al. |
| 2003/0078891 | A1 | 4/2003 | Capitant | 2006/0130121 | A1 | 6/2006 | Candelore et al. |
| 2003/0081630 | A1 | 5/2003 | Mowery et al. | 2006/0136976 | A1 | 6/2006 | Coupe et al. |
| 2003/0081776 | A1 | 5/2003 | Candelore ................... 380/200 | 2006/0153379 | A1 | 7/2006 | Candelore et al. |
| 2003/0084284 | A1 | 5/2003 | Ando et al. | 2006/0174264 | A1 | 8/2006 | Candelore |
| 2003/0097662 | A1 | 5/2003 | Russ et al. | | | | |
| 2003/0108199 | A1* | 6/2003 | Pinder et al. ................ 380/200 | | | | |

FOREIGN PATENT DOCUMENTS

| | | |
|---|---|---|
| CA | 2328645 | 7/2001 |
| EP | 0471373 A2 | 8/1991 |
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 674 440 | 9/1995 |
| EP | 0 674 441 | 9/1995 |
| EP | 0720374 | 7/1996 |
| EP | 0833517 | 4/1998 |
| EP | 0866615 A2 | 6/1998 |
| EP | 0866615 | 9/1998 |
| EP | 1187483 | 3/2002 |
| JP | 07-046575 | 2/1995 |
| JP | 7067028 | 3/1995 |
| JP | 11159162 | 6/1999 |
| JP | 11243534 | 10/2002 |
| JP | 2003330897 | 11/2003 |
| WO | WO86/07224 | 12/1986 |
| WO | WO 86/07224 | 12/1986 |
| WO | WO-8902682 | 3/1989 |
| WO | WO-93/09525 | 5/1993 |
| WO | WO-94/10775 | 5/1994 |
| WO | WO97/38530 | 10/1997 |
| WO | WO00/31964 | 6/2000 |
| WO | WO0051039 | 8/2000 |
| WO | WO-00/59203 | 10/2000 |
| WO | WO 01 11819 | 2/2001 |
| WO | WO-01/26372 | 4/2001 |
| WO | WO 01/65762 A2 | 9/2001 |
| WO | WO01/78386 | 10/2001 |

| | | | |
|---|---|---|---|
| 2003/0123664 | A1 | 7/2003 | Pedlow, Jr. et al. ......... 380/218 |
| 2003/0123849 | A1 | 7/2003 | Nallur et al. |
| 2003/0133570 | A1 | 7/2003 | Candelore et al. ........... 380/210 |
| 2003/0145329 | A1 | 7/2003 | Candelore ................... 725/87 |
| 2003/0152224 | A1 | 8/2003 | Candelore et al. ........... 380/210 |
| 2003/0152226 | A1 | 8/2003 | Candelore et al. ........... 380/218 |
| 2003/0156718 | A1 | 8/2003 | Candelore et al. ........... 380/211 |
| 2003/0157140 | A1 | 8/2003 | Takada |
| 2003/0159139 | A1 | 8/2003 | Candelore et al. ............. 725/25 |
| 2003/0159140 | A1 | 8/2003 | Candelore ................... 725/31 |
| 2003/0159152 | A1 | 8/2003 | Lin et al. |
| 2003/0174837 | A1 | 9/2003 | Candelore et al. |
| 2003/0174844 | A1 | 9/2003 | Candelore |
| 2003/0188164 | A1 | 10/2003 | Okimoto et al. |
| 2003/0190054 | A1 | 10/2003 | Troyansky et al. |
| 2003/0198223 | A1 | 10/2003 | Mack et al. |
| 2003/0204717 | A1 | 10/2003 | Kuehnel |
| 2003/0222994 | A1 | 12/2003 | Dawson |
| 2003/0226149 | A1 | 12/2003 | Chun et al. |
| 2004/0003008 | A1* | 1/2004 | Wasilewski et al. ......... 707/200 |
| 2004/0021764 | A1 | 2/2004 | Driscoll, Jr. et al. |
| 2004/0037421 | A1 | 2/2004 | Truman |
| 2004/0047470 | A1 | 3/2004 | Candelore et al. |
| 2004/0049688 | A1 | 3/2004 | Candelore et al. |
| 2004/0049690 | A1 | 3/2004 | Candelore et al. ........... 713/193 |
| 2004/0049691 | A1 | 3/2004 | Candelore et al. ........... 713/193 |
| 2004/0049694 | A1 | 3/2004 | Candelore |
| 2004/0064688 | A1 | 4/2004 | Jacobs |
| 2004/0073917 | A1 | 4/2004 | Pedlow, Jr. et al. |
| 2004/0078575 | A1 | 4/2004 | Morten et al. |
| 2004/0088541 | A1 | 5/2004 | Messerges |
| 2004/0088552 | A1 | 5/2004 | Candelore |
| 2004/0093494 | A1 | 5/2004 | Nishimoto et al. |
| 2004/0100510 | A1 | 5/2004 | Milic-Frayling et al. |
| 2004/0111613 | A1 | 6/2004 | Shen-Orr et al. |
| 2004/0123094 | A1 | 6/2004 | Sprunk |
| 2004/0136532 | A1 | 7/2004 | Pinder et al. |
| 2004/0139337 | A1 | 7/2004 | Pinder et al. |
| 2004/0141314 | A1 | 7/2004 | Vautrin et al. |
| 2004/0158721 | A1 | 8/2004 | Candelore |
| 2004/0165586 | A1 | 8/2004 | Read et al. ................... 370/389 |
| 2004/0181666 | A1 | 9/2004 | Candelore |
| 2004/0187161 | A1 | 9/2004 | Cao ........................... 725/110 |
| 2004/0240668 | A1 | 12/2004 | Bonan et al. |
| 2004/0267602 | A1 | 12/2004 | Gaydos et al. |
| 2005/0004875 | A1 | 1/2005 | Kontio et al. |
| 2005/0021941 | A1 | 1/2005 | Ohmori et al. |
| 2005/0028193 | A1 | 2/2005 | Candelore et al. |
| 2005/0036067 | A1 | 2/2005 | Ryal et al. |
| 2005/0063541 | A1 | 3/2005 | Candelore |
| 2005/0066357 | A1 | 3/2005 | Ryal |
| 2005/0094808 | A1 | 5/2005 | Pedlow, Jr. et al. |
| 2005/0094809 | A1 | 5/2005 | Pedlow, Jr. et al. |
| 2005/0097596 | A1 | 5/2005 | Pedlow, Jr. |
| 2005/0097597 | A1 | 5/2005 | Pedlow, Jr. et al. |

OTHER PUBLICATIONS

Benini, Luca, et al., "Energy-Efficient Data Acrambling on Memory-Processor Interfaces", *ISLPED'03*, Aug. 25-27 2003, Seoul, Korea, (2003),26-29.

Brown, Jessica, "The Interactive Commercial, Coming Soon to a TV Near You".

Liu, Zheng, et al., "Motion Vector Encryption in Multimedia Streaming", *Proccedinqs of the 10th International Multimedia Modeling Conference 2004 IEEE*, (2004),1-8.

Naor, Moni, et al., "Certificate Revocation and Certificate update", Apr. 2000, *IEEE Journal on Selected Areas in Communications, IEEE*, vol. 18, No. 4, (2000),561-570.

NCUBE, "Digital Program Insertion", (May 2001).

OPENTV, "OPENTV to Showcase Several Advanced Interactive Television Solutions at IBC 2004", (Sep. 6, 2004).

Pazarci, Melih, et al., "Data Embedding in Scrambled Digital Video", *Computers and Communication Proceedings, Eighth IEEE International Symposium on 2003*, vol. 1 (ISCC 2003, (2003),498-503.

Thawani, Amit, et al., "Context Aware Personalized Ad Insertion in an Interactive TV Environment".

"Ad Agencies and Advertisers To Be Empowered with Targeted Ad Delivered by Television's Prevailing Video Servers", *Article Business Section of The New York Times*, (Dec. 20, 2001).

"CLearPlay: The Technology of Choice", from web site, http://www.clearplay.com/what.asp, ClearPlay 2001-2003.

"McCormac Hack Over Cablemodem", *HackWatch*, http://www.hackwatch.com/cablemodbook.html, (Aug. 10, 1998).

"Message Authentication with Partial Encryption",*Research disclosure RD 296086*, (Dec. 10, 1988).

"Metro Media PVR-DVD-MP3-Web", Internet publication from www.metrolink.com, (undated).

"New Digital Copy protection Proposal Would Secure Authorized Copies", *PR Newswire*, (Nov. 13, 1998),1-3.

"Passage Freedom to Choose", *Sony Electronics Inc.*, (2003).

"Pre-Encryption Profiles—Concept Overview and Proposal", Rev. 1.2 as submitted to the Open CAS consortium on Dec. 28, 2000.

Agi, Iskender, et al., "An Empirical Study of Secure MPEG Video Transmissions", *IEEE, Proceedings of SNDSS 96*, (1996),137-144.

Alattar, Adnan, et al., "Evaluation of Selective Encryption Techniques for Transmission of MPEG-Compressed Bit-Streams", *IEEE*, (1999),IV-340 to IV-343.

Alattar, Adnan M., et al., "Improved Selective Encryption Techniques for Secure Transmission of MPEG Video Bit-Streams", *IEEE*, (1999),256-260.

Dittmann, Jana, et al., "Multimedia and Security Workshop at ACM Multimedia", Bristol, U.K., (Sep. 1998).

Dondeti, Lakshminath R., et al., "A Dual Encryption Protocol for Scalable Secure Multicasting", *1999 International Symposium on Computers and Communication*, Jul. 6-8, 1999.

Gulwani, Sumit, "A Report on Security Issues in Multimedia", *Department of Computer Science and Engineering, Indian Institute of Technology Kanpur, Course Notes*,(Apr. 30, 2000),pp. 10-14.

Haberman, Seth, "Visible World—A High Impact Approach to Customized Television Advertising", (Dec. 2001).

Koenen, Rob H., et al., "The Long March to Interoperable Digital Rights Management", *IEEE*, (2004),1-17.

Kunkelmann, Thomas, "Applying Encryption to Video Communication", *Multimedia and Security Workshop at ACM Multimedia ?98*. Bristol. U.K., (Sep. 1998),41-47.

Naor, Moni, et al., "Certificate Revocation and Certificate update", Apr. 2000, *IEEE Journal on Selected Areas in Communications, IEEE*, vol. 18, No. 4, (2000),561-570.

Park, Joon S., et al., "Binding Identities and Attributes Using Digitally Singed Certificates", *IEEE*, (2000).

Piazza, Peter, "E-Signed, Sealed, and Delivered", *Security Management*, vol. 45, No. 4, (Apr. 2001),72-77.

Qiao, Lintian, et al., "Comparison of MPEG Encryption Algorithms", *Department of Computer Science, University of Illinois at Urbana-Champaign*, (Jan. 17, 1998),1-20.

Robert, Arnaud, et al., "Digital Cable: The Key to Your Content", *Access Intelligence's Cable Group*, online at http:www.cableworld.com/ct/archives/0202/0202digitalrights.htm, (Feb. 2002).

Seachange International, "Dynamic-Customized TV Advertising Creation and Production Tools", *Web Site Literature*.

Seachange International, "Transport Streams Insertion of Video in the Compressed Digital Domain", *Web Site Literature*, (2000).

Shavik, Kirstnamurthy, "Securant Technologies Delivers Broad PKI Integration to Enable Standards Based Security", *Business Wires*, (Oct. 4, 1999).

Shi, Changgui, et al., "An Efficient MPEG Video Encryption Algorithm", *1998 IEEE, Department of Computer Sciences, Purdue University*, West Lafayette, IN, 381-386.

Spanos, George A., et al., "Performance Study of a Selective Encryption Scheme for the Security of Networked, Real-Time Video", *IEEE*, (1995),2-10.

Taylor, Jim, "DVD Demystified—The Guidebook for DVD-Video and DVD-ROM", *Pub. McGraw-Hill*, ISBN: 0-07-064841-7, pp. 134-147, (1998),134-147.

Wu, Chung-Ping, et al., "Fast Encryption Methods for Audiovisual Data Confidentiality", *SPIE International Symposia on Information Technologies* (Boston, Ma., USA), (Nov. 2000),284-295.

Wu, S. Felix, et al., "Run-Time Performance Evaluation for a Secure MPEG System Supporting Both Selective Watermarking and Encryption", *submitted to JSAC special issue on Copyright and Privacy Protection*, (Mar. 1, 1997).

Wu, Tsung-Li, et al., "Selective Encryption and Watermarking of MPEG Video (Extended Abstract)", *International Conference on Image Science, Systems, and Technology, CISST?97*, (Feb. 17, 1997).

Zeng, Wenjun, et al., "Efficient Frequency Domain Video Scrambling for Content Access Control", *In Proc. ACM Multimedia*, (Nov. 1999).

Aravind, H., et al., "Image and Video Coding Standards", *AT&T Technical Journal*, (Jan./Feb. 1993),67-68.

Gonzalez, R. C., et al., "Digital Image Processing", *Addison Wesley Publishing Company, Inc.*, (1992),346-348.

Kim, et al., "Bit Rate Reduction Algorithm for a Digital VCR", *IEEE Transactions on Consumer Electronics*, vol. 37, No. 3, (Aug. 1, 1992),267-274.

Kondo, et al., "A New Concealment Method for Digital VCRs", *IEEE Visual Signal Processing and Communication*, Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR" (1991).

Menezes, Alfred J., et al., "Handbook of Applied Cryptography", *CRC Press*, 551-553.

NHK Laboratories Note, "Error Correction, Concealment and Shuffling", No. 424, (Mar. 1994),29-44.

Park, et al., "A Simple Concealment for ATM Bursty Cell Loss", *IEEE Transactions on Consumer Electronics*, No. 3, (Aug. 1993),704-709.

Tom, et al., "Packet Video for Cell Loss Protection Using Deinterleaving and Scrambling", *ICASSP 91: 1991 International Conference on Acoustics, Speech and Signal Processing*, vol. 4, (Apr. 1991),2857-2860.

Zhu, et al., "Coding and Cell-Loss Recovery in DCT-Based Packet Video", *IEEE Transactions on Circuits and Systems for Video Technology*, No. 3, NY,(Jun. 3, 1993).

United States Office Action dated Nov. 17, 2006 for U.S. Appl. No. 10/388,002, filed Mar. 12, 2003 entitled Mechanisim for Protecting the Transfer of Digital Content.

United States Office Action dated Apr. 27, 2007 for U.S. Appl. No. 10/388,002, filed Mar. 12, 2003 entitled Mechanism for Protecting the Transfer of Digital Content.

United States Office Action dated Sep. 7, 2007 for U.S. Appl. No. 10/388,002, filed Mar. 12, 2003 entitled Mechanisim for Protecting the Transfer of Digital Content.

U.S. Appl. No. 10/962,830 Office Action mailed Dec. 11, 2007.

U.S. Appl. No. 10/9602,830 Office Action mailed Jun. 26, 2008.

U.S. Appl. No. 10/962,830 Office Action mailed Oct. 28, 2008.

U.S. Appl. No. 10/962,830 Office Action mailed May 5, 2009.

PCT Internal Search Report and Written Opinion, International Application No. PCT/US05/31171, mailed Oct. 26, 2006.

PCT Internal Search Report, International Application No. PCT/US00/0511 mailed Apr. 7, 2000.

U.S. Appl. No. 10/388,002 Office Action mailed May 6, 2008.

U.S. Appl. No. 10/388,002 Office Action mailed Nov. 19, 2008.

* cited by examiner

| Entitlement Management Message | |
|---|---|
| STB Serial Number | (64 bits) |
| EMM Length | (16 bits) |
| Mating Key Generator | (64 bits) |
| Key Identifier #1 | (16 bits) |
| Encrypted Key #1 | (64 bits) |
| ... | |
| Key Identifier #M | (16 bits) |
| Encrypted Key #M | (64 bits) |

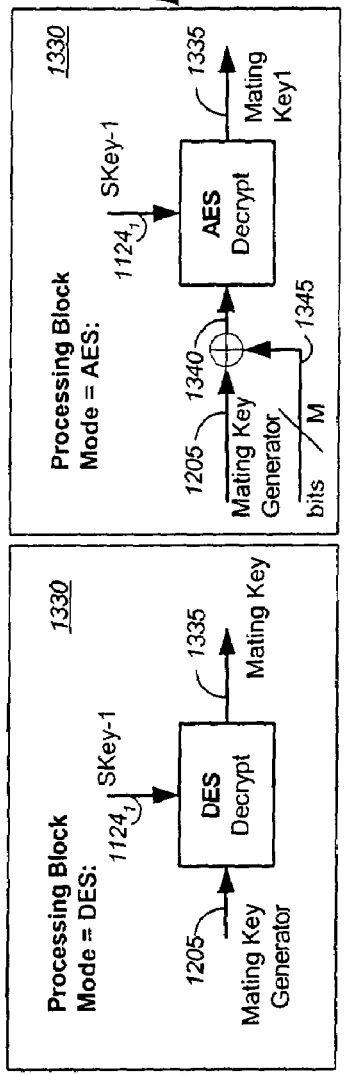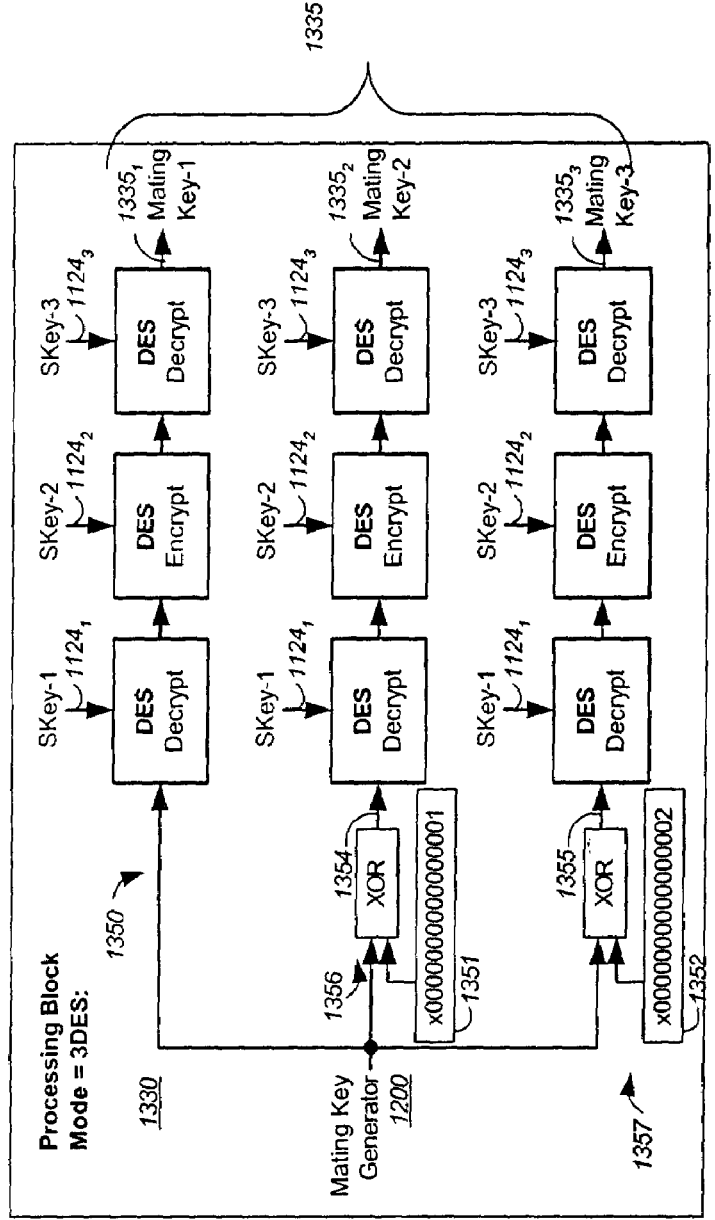
Figure 18A
Figure 18B
Figure 18C

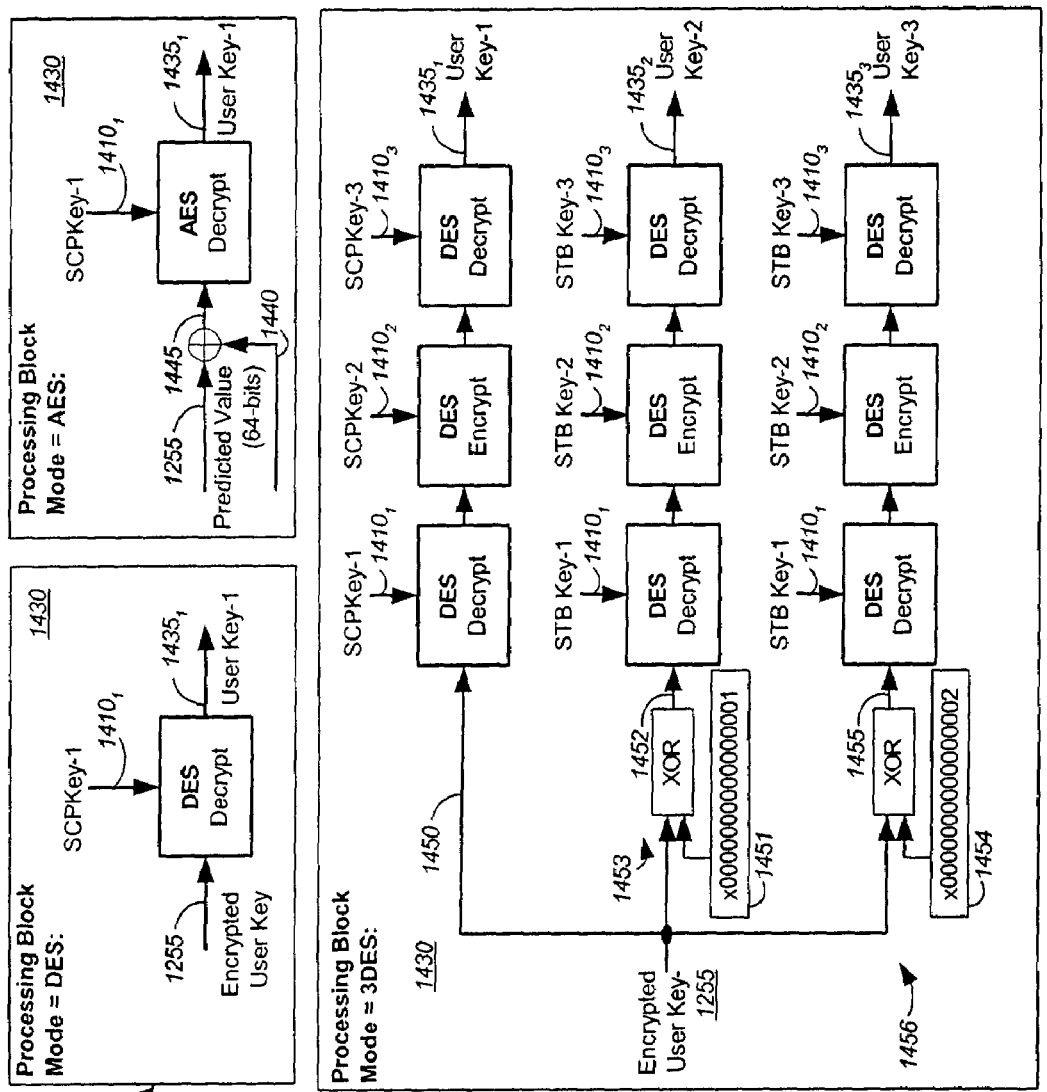

DESCRAMBLER

CROSS-REFERENCE TO RELATED APPLICATIONS

This application is a continuation-in-part Application of U.S. application Ser. No. 10/388,002 filed Mar. 12, 2003, which claims the benefit of priority on U.S. Provisional Application No. 60/424,381 filed on Nov. 5, 2002.

BACKGROUND

1. Field

Embodiments of the invention relate to digital devices. More specifically, one embodiment of the invention relates to a descrambler for descrambling digital content.

2. General Background

Analog communication systems are rapidly giving way to their digital counterparts. Digital television is currently scheduled to be available nationally. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who are reluctant in providing downloadable digital content due to fears of unauthorized and uncontrolled copying such digital content.

In response, there is a movement to require content providers, such as terrestrial broadcast, cable and direct broadcast satellite (DBS) companies, and companies having Internet sites which provide downloadable content, to introduce copy protection schemes. These desired copy protection schemes extend beyond the role of conditional access (CA), merely descrambling content to a CA-clear format for real-time viewing and/or listening, and now include constraints and conditions on the recording and playback.

Traditional CA systems for Impulse Pay-Per-View (IPPV) originated from one-way broadcast systems. A cryptographic processor, such as a smart card, in a conditional access unit, such as a set-top box, is generally infused with information and functionality in order to automatically grant access to programs. For example, a smart card with a Pay-TV access control application is adapted to receive messages that grant certain service entitlements. If the set-top box was allowed to view IPPV programs, then credit and cost limit information was transmitted as well. Likewise, when tuning to a program, the smart card received messages that described which entitlements the smart card needed in order to grant access to the program.

Currently, hackers have manipulated both types of messages in order to view programs without paying the requisite subscription fees. Not only can these messages be manipulated, but the hardware can be attacked as well. For instance, descrambling keys in the clear that are used to descramble scrambled content can be copied and sent to other set-top boxes over the Internet. Such hacking is costly to both content providers as well as the content owners.

BRIEF DESCRIPTION OF THE DRAWINGS

Embodiments of the invention are illustrated by way of example and not by way of limitation in the accompanying drawings, in which like references indicate similar elements and in which:

FIG. 9B is an exemplary embodiment of an entitlement management message (EMM) routed to a set-top box of the system of FIG. 9A;

FIGS. 18A-18C are exemplary embodiments of a second process block of the CW key ladder logic of FIG. 16;

FIGS. 21A-21C are exemplary embodiments of a fifth process block of the CP key ladder logic of FIG. 20;

FIGS. 22A-22C are exemplary embodiments of a sixth process block of the CP key ladder logic of FIG. 20;

DETAILED DESCRIPTION

Various embodiments of the invention relate to a descrambler for protecting the transfer of data. In one embodiment, such protection involves the descrambling and/or decrypting of digital content from one or more content providers completely within the descrambler, which can be deployed as a singe integrated circuit. Examples of a "content provider" include, but are not limited to a terrestrial broadcaster, cable operator, direct broadcast satellite (DBS) company, a company providing content for download via the Internet, or any similar sources of content.

In the following description, certain terminology is used to describe features of the invention. For instance, both terms "component" and "logic" are representative of hardware and/or software configured to perform one or more functions. Examples of "hardware" include, but are not limited or restricted to an integrated circuit such as a processor (e.g., microprocessor, application specific integrated circuit, a digital signal processor, a micro-controller, etc.), finite state machine, combinatorial logic or the like.

The term "logical derivative" is a result produced by performing a logical operation (e.g., Exclusive OR "XOR", AND, OR, Invert, or any combination thereof) on a digital signal. The logical operation may be performed in a bitwise manner, although it is contemplated that the logical operation may be performed on multiple bits concurrently.

The term "process block" represents hardware and/or software having a dedicated function, such as a finite state machine for example. An example of "software" includes a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

Figure 1:
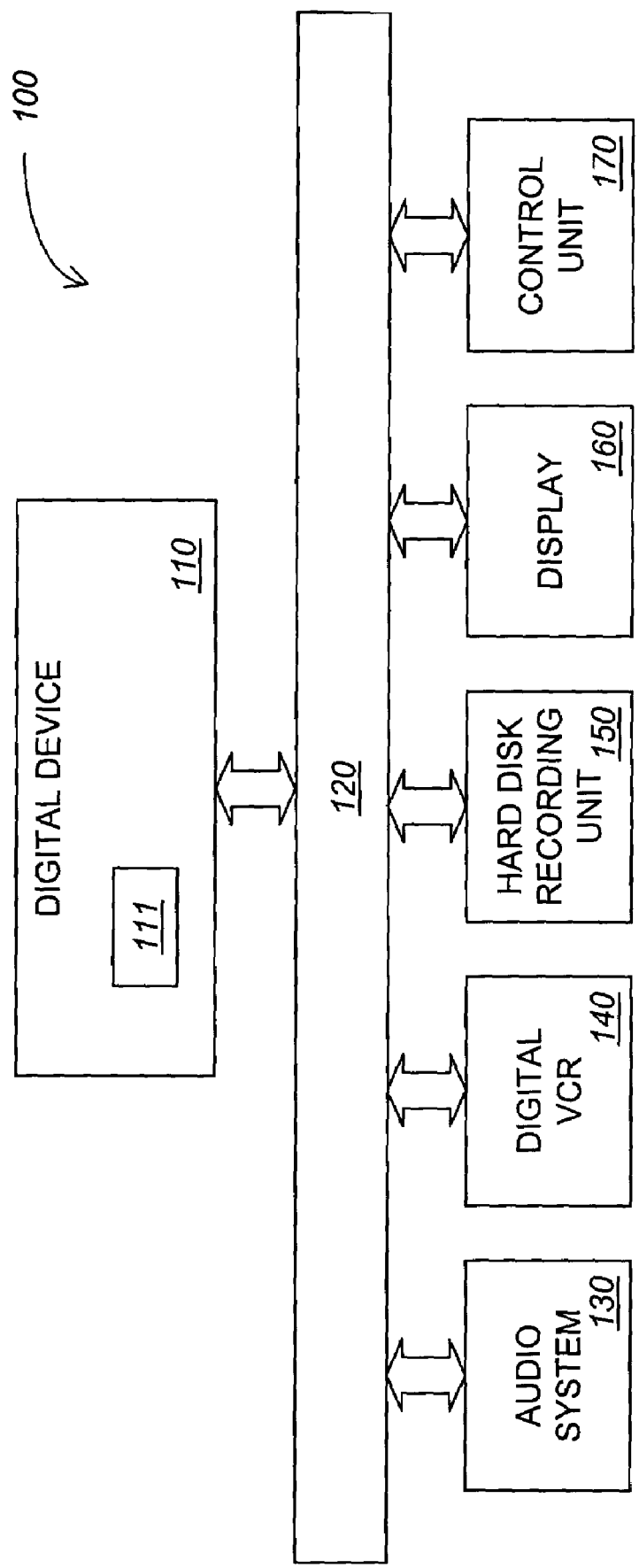
FIG. 1 is an exemplary embodiment of an content delivery system including a digital device.

Referring to FIG. 1, an exemplary embodiment of a content delivery system 100 is shown. Content delivery system 100 includes a digital device 110 that receives information including program data from one or more content providers. The program data may be propagated as a digital bit stream for example. Digital device 110 may operate as any number of electronic products such as a set-top box, a television, computer, audio-playback device (e.g., digital radio, MP3 player), audio-recording device, video-recording device (e.g., digital recorder), or the like.

For instance, digital device 110 may be configured in accordance with an embedded architecture, a split security architecture, or an external security architecture. As an embedded architecture, in one embodiment, digital device 110 is implemented as a set-top box or another electronic product that comprises fixed, internal circuitry supporting both entitlement management and descrambling operations.

Alternatively, in accordance with a split security architecture embodiment, digital device 110 may be adapted to receive a removable smart card that handles entitlement management, while descrambling of digital content is controlled by internal circuitry.

Yet, in accordance with an external security embodiment, digital device 110 may be a "point-of-deployment" product with a network card handling both entitlement management and descrambling operations by sending and receiving messages over an Out-of-Band channel. Of course, external security type may also be split so that the network card handles descrambling operations, but adapted to communicate with a smart card for handling entitlement management. These and other embodiments of digital device 110 may be implemented while still falling within the spirit and scope of the invention.

Digital device 110 comprises a receiver 111, which processes the incoming information, extracts the program data inclusive of the digital content therefrom, and provides the digital content in a perceivable format (e.g., viewable and/or audible). The "program data" comprises any or all of the following: system information, entitlement control message(s), entitlement management message(s), or digital content. The "digital content" in the program data stream may include an image, audio, video or any combination thereof. The content may be in a scrambled or clear format.

Herein, "system information" may include information on program names, time of broadcast, source, and a method of retrieval and decoding, as well as copy management commands that provide digital receivers and other devices with information that will control how and when the digital content may be replayed, retransmitted and/or recorded. These copy management commands may also be transmitted along with an entitlement control message (ECM), which is generally used to regulate access to a particular channel or service. An "Entitlement Management Message" (EMM) may be used to deliver entitlements (sometimes referred to as "privileges") to digital receiver 111. Examples of certain entitlements may include, but are not limited to access rights or descrambling keys. A descrambling key is generally a code that is required by descrambler logic to recover data in the clear from a scrambled format based on the entitlements granted.

As shown, when implemented as a set-top box, digital device 110 may be coupled to other components in content delivery system 100 via a transmission medium 120. The transmission medium 120 operates to transmit program data between digital device 110 and other components in content delivery system 100. The transmission medium 120 may include, but is not limited to electrical wires, optical fiber, cable, a wireless link established by wireless signaling circuitry, or the like.

Depending on the type of product corresponding to the digital device 110, content delivery system 100 may include an audio system 130 coupled to the transmission medium 120. A digital VCR 140, such as a D-VHS VCR, may also be coupled to the digital device 110 and other components of the content delivery system 100 through the transmission medium 120.

A hard disk recording unit 150 may also be coupled to digital device 110 and other components via transmission medium 120. Display 160 may include a high definition television display, a monitor, or another device capable of processing digital video signals. Finally, a control unit 170 may be coupled to the transmission medium 120. Control unit 170 may be used to coordinate and control the operation of some or each of the components on content delivery system 100.

The digital content of the program data may be transmitted in scrambled form. In one embodiment, as part of the program data, access requirements may be transmitted along with the scrambled content to digital device 110 (e.g., set-top box) that is implemented with receiver 111 thereby functioning as a conditional access unit. An "access requirement" is a restrictive parameter used to determine if digital device 110 implemented with conditional access functionality, hereinafter referred to as the "conditional access unit 110," is authorized to descramble the scrambled content for viewing or listening purposes. For example, the access requirement may be a key needed to perceive (view and/or listen to) the content, a service tag associated with a given content provider, or even a particular descrambling software code.

When a scrambled program is received by conditional access unit 110, the access requirements for the program are compared to the entitlements that conditional access unit 110 actually has. In order for conditional access unit 110 to display the scrambled content in clear form, in one embodiment, the access requirements associated with the digital content are compared to the entitlements of conditional access unit 110. The entitlements may state that conditional access unit 110 is entitled to view/playback content from a given content provider such as Home Box Office (HBO), for example. The entitlements may also include one or more keys needed to descramble the digital content. The entitlements also may define the time periods for which conditional access unit 110 may descramble the digital content.

Thus, in one embodiment, access requirements and entitlements form a part of the access control system to determine whether a conditional access unit or even a decoder is authorized to view a particular program. It is contemplated that the description below focuses on mechanisms to recover audio/visual content such as television broadcasts, purchased movies and the like. However, it is contemplated that the invention is also applicable to the descrambling of audible content only (e.g., digitized music files).

The access requirements and entitlements can provide consumers with a variety of choices for paying for the content and gaining access to the scrambled content. These choices may include pay per play (PPP), pay per view (PPV), impulse pay per view (IPPV), time based historical, pay per time (PPT). "Impulse pay per view" is a feature which allows purchase of PPV movies through credit that has been previously downloaded into the set-top box. Purchase records may be stored and forwarded by phone to a billing center. "Time based historical" allows access to content that was delivered during a past time period, such as March through December, 1997, for example. The access requirements and entitlements can also provide consumers with different options for storing the scrambled content.

The access requirements may be delivered to the conditional access unit, located within digital device 110 or coupled thereto over transmission medium 120, using packet identifiers (PIDs). Each PID may contain the access requirements associated with a given service. The content that is delivered to the conditional access unit may also include a large number of PIDs, thus enabling special revenue features, technical features, or other special features to be performed locally.

Before receiving the content, the customer may be given a number of choices for gaining access to the digital content that is going to be stored to media. The customer may be required to purchase the right to access and view the content. Therefore, if the customer wants to record the content for later retrieval and viewing, the access requirements that the customer bought also need to be stored with the digital content.

Figure 12:
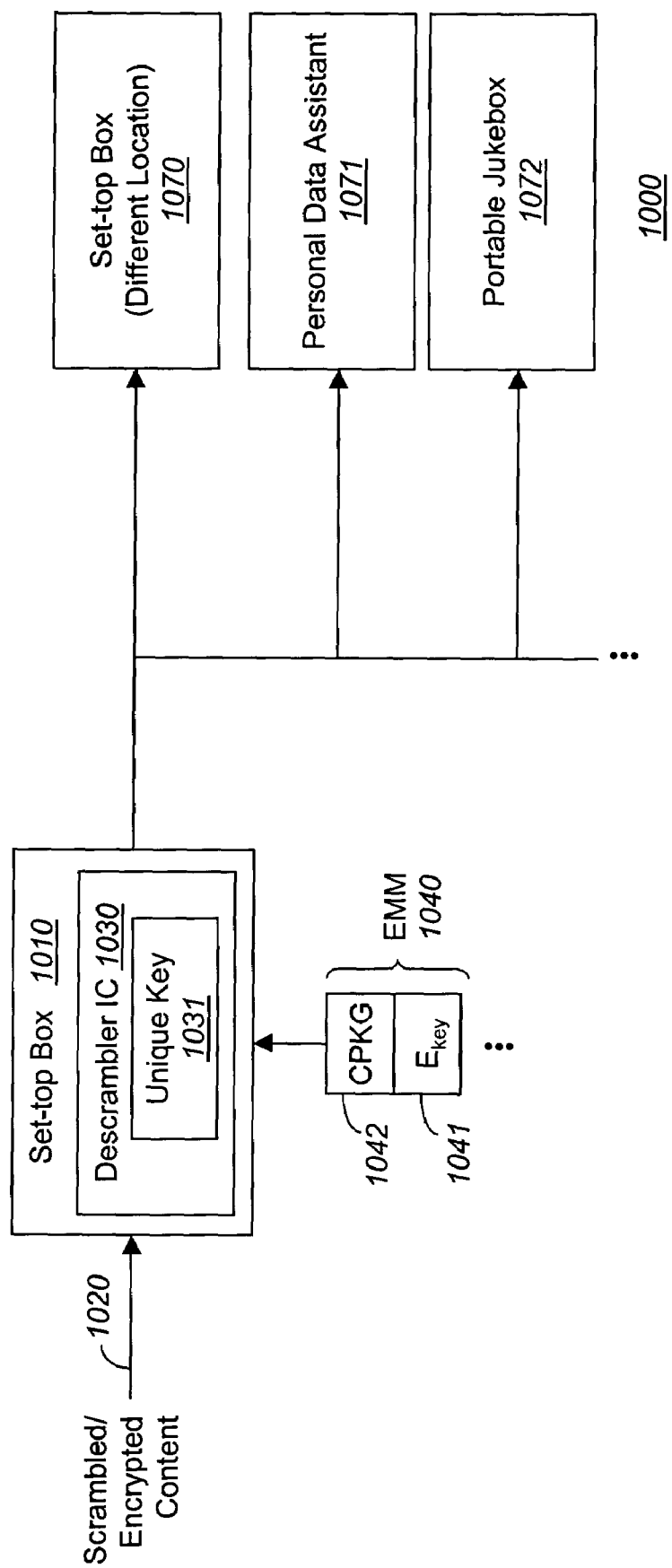
FIG. 12 is an exemplary embodiment of a portion of a seventh exemplary embodiment of a secure content delivery system in which the digital device is adapted with copy protection functionality.
Figure 13:
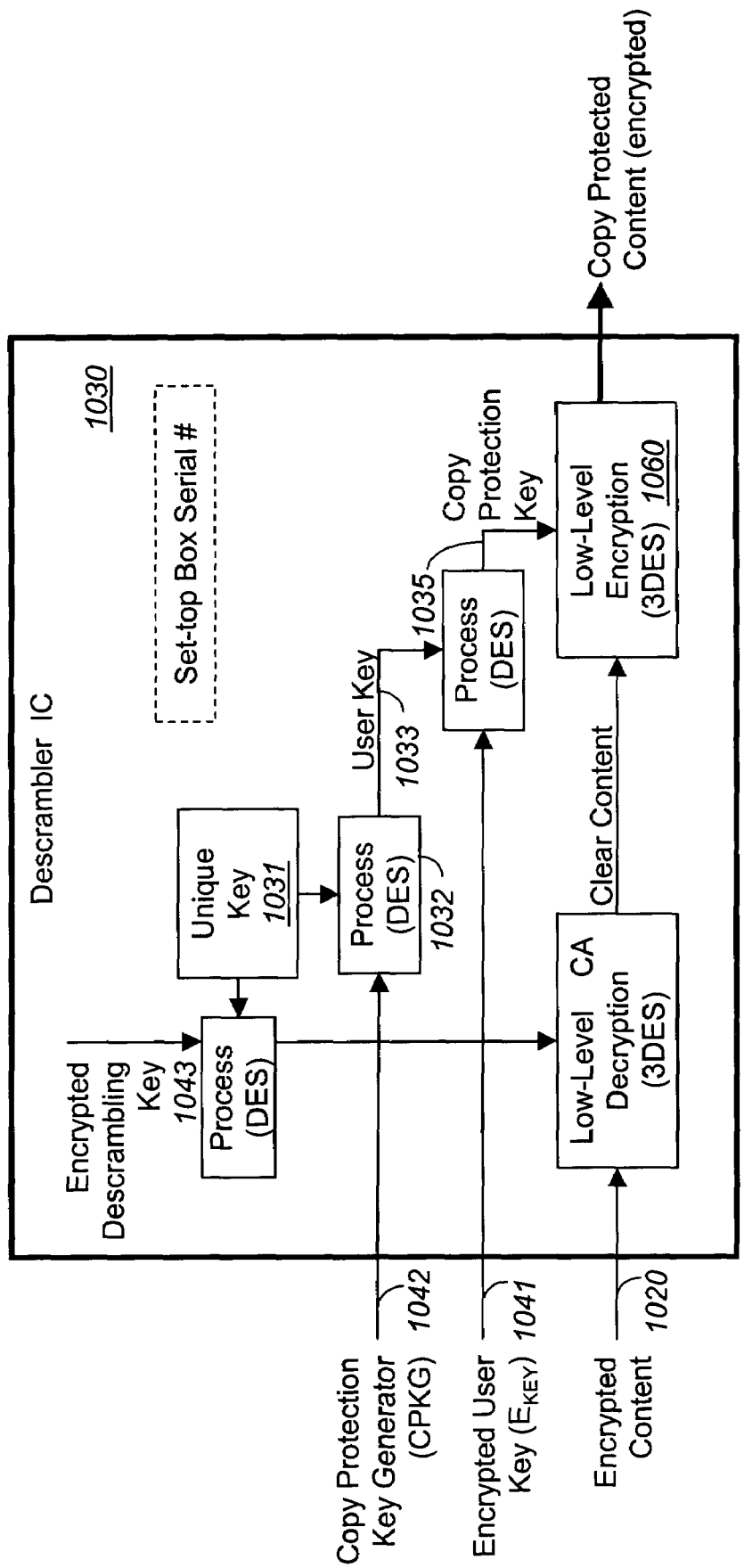
FIG. 13 is an exemplary embodiment of the decoder implemented within the digital device of FIG. 12.

In addition, there may be copy-protection applied to the descrambled digital content (e.g., transport stream) as shown in FIGS. 12 and 13. Copy-protected digital content will be re-scrambled across an interface interconnecting a destination interface and a source. The source and destination interface need to agree on the key used to re-encrypt this content. This copy protection key can be encrypted with the unique key associated with the digital device. The unique key can be received through an EMM or other method, e.g. factory load procedure.

Figure 2:
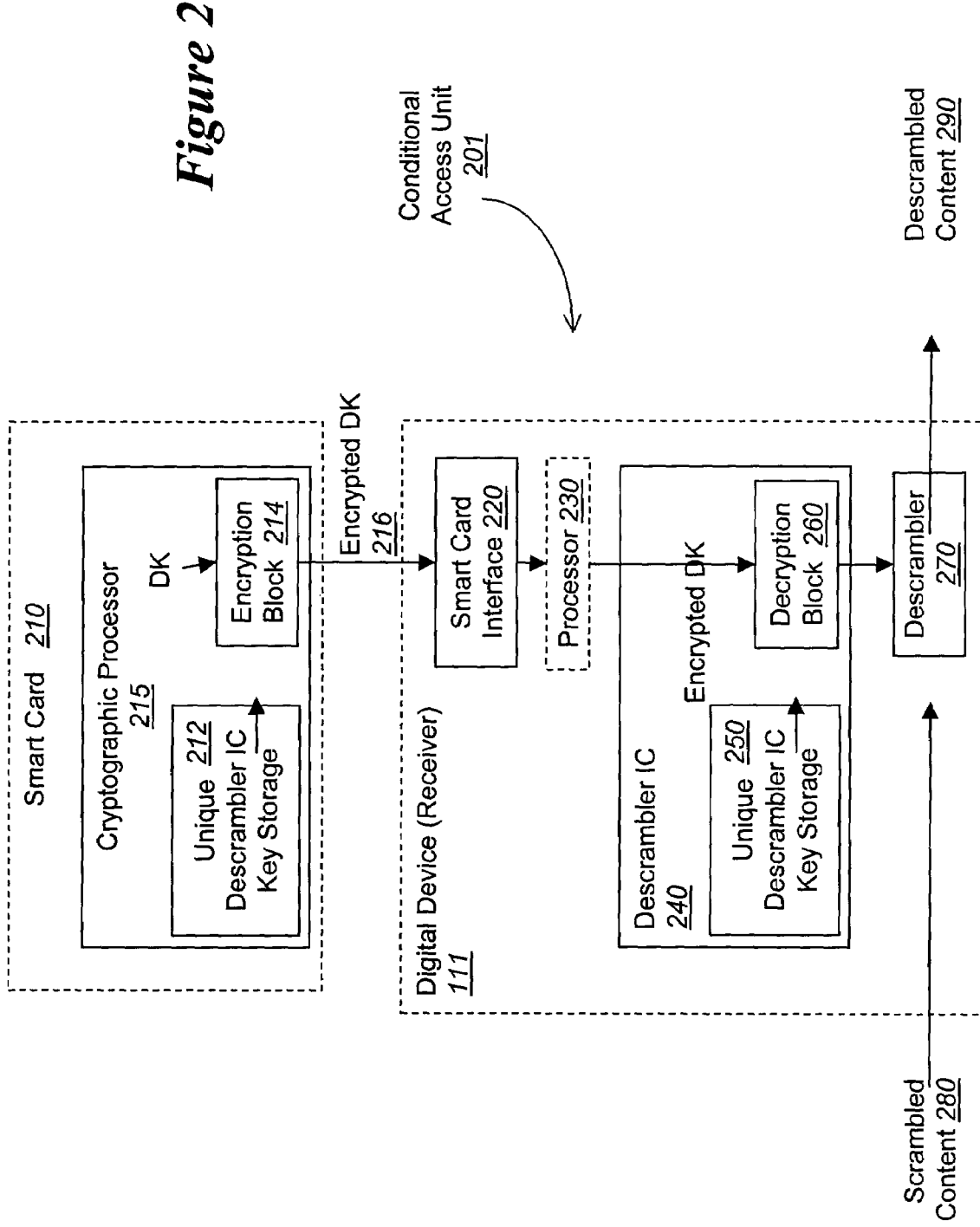
FIG. 2 is a first exemplary embodiment of a secure content delivery system that comprises the conditional access unit adapted to operate with a smart card.

As seen in FIG. 2, a first exemplary embodiment of a secure content delivery system that comprises a conditional access unit 201 adapted to operate with a smart card interface 220 is shown. This embodiment is consistent with a split security architecture and an external security architecture. In a split security architecture implementation, digital device 110 operates as a conditional access unit 201 (e.g., equivalent to conditional access unit 110 of FIG. 1), but is implemented as a set-top box or other type of digital device.

Although smart card interface 220 may be built into digital receiver 111, it is expected that digital receiver 111 will have an expansion slot, such as a PCMCIA slot or Universal Serial Bus (USB) slot for example, to receive a smart card 210 complementary to interface 220. For this embodiment, digital receiver 111 comprises an optional processor 230 and a descrambler 240. Herein, for this embodiment, descrambler 240 is implemented as an integrated circuit (IC).

Smart card interface 220 is adapted for attachment to smart card 210, which stores one or more encrypted descrambling keys for descrambling incoming digital content. Smart card 210 transmits the descrambling key(s) in encrypted form to smart card interface 220. In order to protect the descrambling key(s), generally referred to as "DK," from being improperly extracted by an interloper monitoring communications between smart card 210 and smart card interface 220, smart card 210 may use an encryption key unique to conditional access unit 201 to encrypt the DK. This allows conditional access unit 201 to decrypt the DK in a secure manner and use the DK in a clear format to descramble the digital content.

More specifically, according to one embodiment of the invention, an external cryptographic processor 215 of smart card 210, receives the DK needed to descramble content. A storage element 212 (e.g., volatile or nonvolatile memory) is previously loaded with one or more keys for encrypting the DK. Such loading may be performed during manufacture of smart card 210, during manufacture of storage element 212 or by cryptographic processor 215 when storage element 212 is on-chip. Encryption logic 214 of smart card 210 encrypts the DK with the one or more keys that are unique to descrambler 240.

For this embodiment, smart card 210 delivers the encrypted DK 216 to descrambler 240. Herein, processor 230 receives encrypted DK 216 through interface 220, although encrypted DK 216 may be sent directly to decryption logic 260. Processor 230 may be implemented to perform additional operations to counteract additional obfuscation techniques performed on the DK.

Decryption logic 260 of descrambler 240 will decrypt the DK using one or more unique keys stored in a storage element 250. In one embodiment, storage element 250 comprises one or more key registers loaded at manufacturer or after implemented within conditional access unit 201 through initial program data transmitted to conditional access unit 201. Decryption logic 260 then writes the decrypted DK alternately into ODD and EVEN key storage elements (not shown) of descrambler logic 270.

Descrambler logic 270 then applies the ODD/EVEN descrambler key(s) to the incoming scrambled content 280 at the right time and outputs descrambled program content 290. Of course, alternatives to the loading of ODD and EVEN key storage elements may be utilized for descrambling of incoming scrambled content 280. Descrambler logic 270 may be implemented as internal logic of the descrambler 240 or externally as illustratively shown.

Thus, the transfer of the descrambling key from smart card 210 to conditional access unit 201 is secure, because the descrambling key is transferred in encrypted form. The descrambling key remains secure in conditional access unit 201 because the descrambling key is not decrypted by non-secure processor 230. The descrambling key is only decrypted in descrambler 240 that actually uses the descrambling key, and thus, the descrambling key is never exposed in the clear, and cannot be obtained by hackers.

Furthermore, the key used to decrypt the encrypted DK 216 is stored in hardware (e.g., storage element 250) of descrambler 240. Storage element 250 cannot be hacked unless the silicon of storage element 250 is probed. Furthermore, the key may only be valid for one particular conditional access unit 201, and may not be used by other units to decrypt the encrypted DK 216, because the DK is encrypted by smart card 210 using a key that is unique to an associated conditional access unit 201. Therefore, the transmission of the encrypted DK 216 to conditional access unit 201 is secure.

Descrambler 240 handles the secure processing of the descrambling keys. This descrambler 240 has no CPU, no firmware, and no software. There is no complicated key hierarchy. A non-processor based descrambler 240 receives encrypted DK 216, applies a unique key to it, and decrypts it. No instructions, no code, no hashing, and no software is loaded into decryption logic 260. The decryption is performed entirely by decryption logic 260 being a hardware circuit or state machine using only a single key function.

One or more unique keys, generally referred to herein as "Unique Key," may be programmed into storage element 250 during manufacture or during implementation within a set-top box, television, or NRSS-B module. For example, in one embodiment, descrambler 240 is implemented with a programmable non-volatile storage element 250 such as flash. In another embodiment, descrambler 240 is implemented with non-programmable, non-volatile memory that can be written only once in order to enhance security. As a result, there is no way to either improperly read or overwrite the Unique Key that is originally loaded into storage element 250. An association between the serial number of conditional access unit 201 and the Unique Key loaded into descrambler 240 of the conditional access unit 201 may be recorded.

When conditional access unit 201 is manufactured and a smart card 210 is installed, smart card 210 can receive the Unique Key associated with conditional access unit 201 at the time of pairing. From then on, smart card 210 is "paired" to that particular host (e.g., conditional access unit 201). Later, if smart card 210 is ever replaced or moved to a new host, smart card 210 may be adapted to receive a unique key associated with the new host via an Entitlement Management Message (EMM). Of course, as an alternative, a new smart card with a newly programmed unique key may also be delivered to the user.

Figure 3:
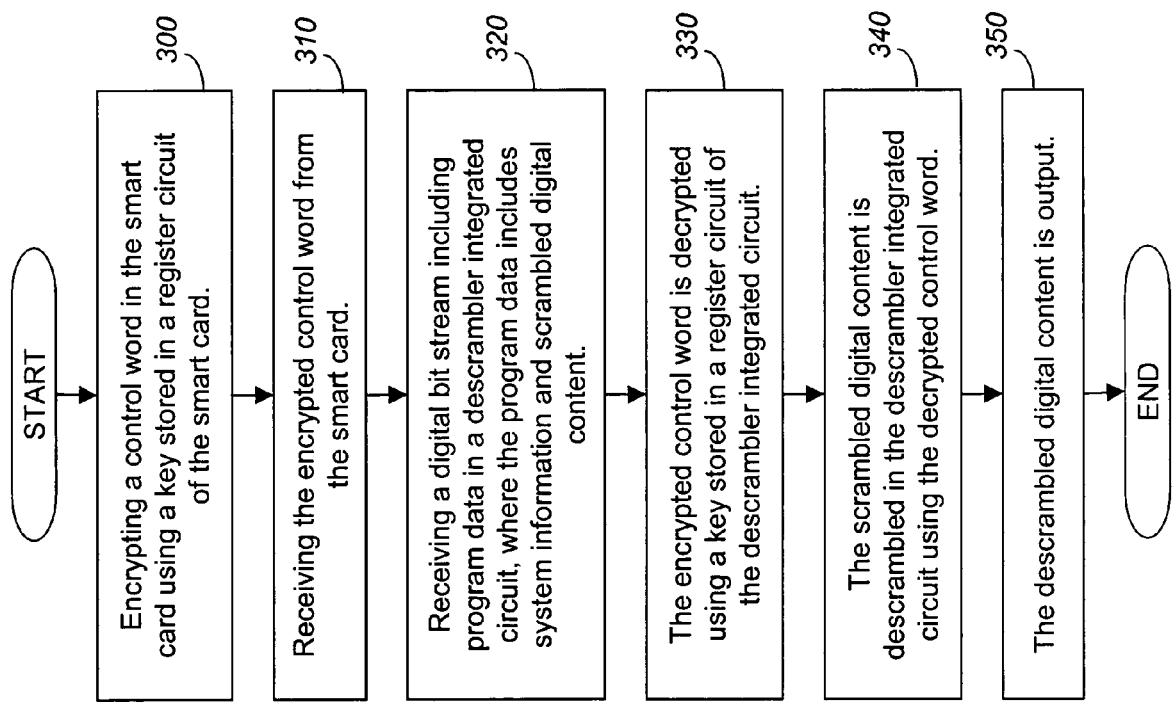
FIG. 3 is an exemplary embodiment of a method for securely transferring descrambling keys from the smart card to the conditional access unit of FIG. 2.

An exemplary method for transferring a descrambling key from smart card 210 to conditional access unit 201 of FIG. 2 is shown in FIG. 3. A descrambling key is encrypted in the smart card using a key stored in nonvolatile memory of the smart card (block 300). This key stored in the smart card, namely the Unique key, is associated with the key stored in the storage element of the descrambler. The encrypted descrambling key is received from the smart card (block 310).

This method includes receiving a digital bitstream including program data in a descrambler, where the program data includes system information and scrambled digital content (block 320). The encrypted descrambling key is decrypted using a key stored in a storage element of the descrambler (block 330). The scrambled digital content is descrambled in the descrambler using the decrypted descrambling key (block 340), and the descrambled digital content is output (block 350).

Figure 4:
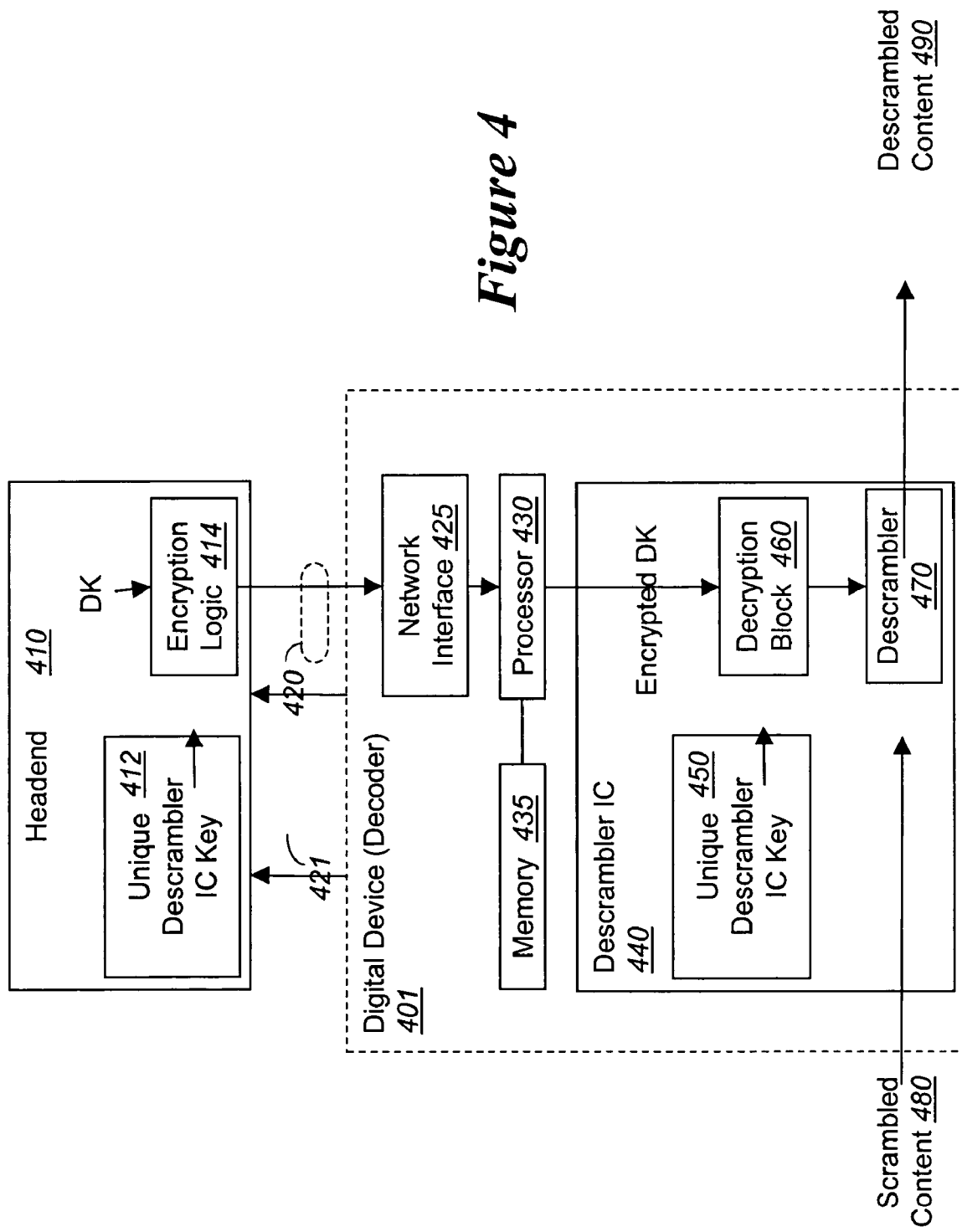
FIG. 4 is a second exemplary embodiment of a secure content delivery system that comprises a decoder adapted to a headend via a network connection.

As an alternative embodiment to the conditional access unit implementation of FIG. 2, the smart card may be replaced by a headend server (hereinafter referred to as "headend") 410 of a one-way or two-way network 420 as shown in FIG. 4. Headend 410 maintains the access rights for the digital device operating as a decoder (e.g., "decoder 401), instead of maintaining such access rights in a local cryptographic processor 215 of smart card 210 of FIG. 2.

Headend 410 can deliver one or more service keys (generally referred to as "Service Key") based on the Unique Key stored in descrambler 440. The encrypted Service Key may be stored locally in decoder 401 to facilitate transitions from one channel to another. The Service Key is stored in encrypted form, and is loaded as needed into descrambler 440. The Service Key is decrypted within descrambler 440, by using the Unique Key stored in a storage element 450 of descrambler 440.

In one embodiment of the invention, the Service Key is used as a descrambling key to descramble the content directly. In another embodiment of the invention, the Service Key is used to decrypt one or more descrambling keys, which are received in-band with the scrambled content and subsequently used for descrambling purposes. Each key of the Service Key may be encrypted using different public and proprietary encryption algorithms. These different proprietary algorithms may be considered as any-piracy measures to invalidate clone hardware.

Headend 410 can deliver the Service Key on a channel or "tier of service" basis in the EMMs. The Service Key is encrypted, stored locally in decoder 401, and used by a processor 430 as needed when tuning to different channels. While this embodiment works in one-way (non-IPPV) broadcast networks, it also performs in two-way, interactive networks, where the Service Key for a particular service is requested, such as IPPV or VOD purchases or any other non-subscription service. A return channel 421 is used to request the Service Key because the ability to grant access to a new service is performed by headend 410 instead of a local controlling cryptographic processor.

In order to avoid overload problems at headend 410 caused by a large number of simultaneous impulse buys of IPPV programs, a Free Preview period can be determined and IPPV programs can be marketed in advance of the actual viewing. In this embodiment, the Service Key for individual shows or movies may be requested by decoder 401 and delivered ahead of time. For example, interactive networks, such as a cable system having return channel 421 such as a DOCSIS modem or Out-of-Band transmitter/receiver for example, can deliver a Request for Program Key (RPK) message from decoder 401 to headend 410. Alternatively, decoder 401 may request the Service Key in real-time for each program accessed.

A controller (not shown) on headend 410 processes the RPK message. The RPK message may contain an address of decoder 401 as well as information needed to identify the channel to be viewed (all of which may be obtained from Motion Picture Experts Group "MPEG" system and program information already processed by the insecure processor). The RPK request may be encrypted, if desired, for non-repudiation and prevention of denial of service attacks, such as IPPV or VOD requests for example.

Upon receipt of the RPK message, headend 410 accesses entries of an access control list (listing each entitlement of decoder 401) and verifies decoder 401 is authorization to receive a particular Service Key. If authorized, headend 410 sends the Service Key (encrypted using the Unique Key contained in storage element 450 located in descrambler 440) to decoder 401.

Figure 5:
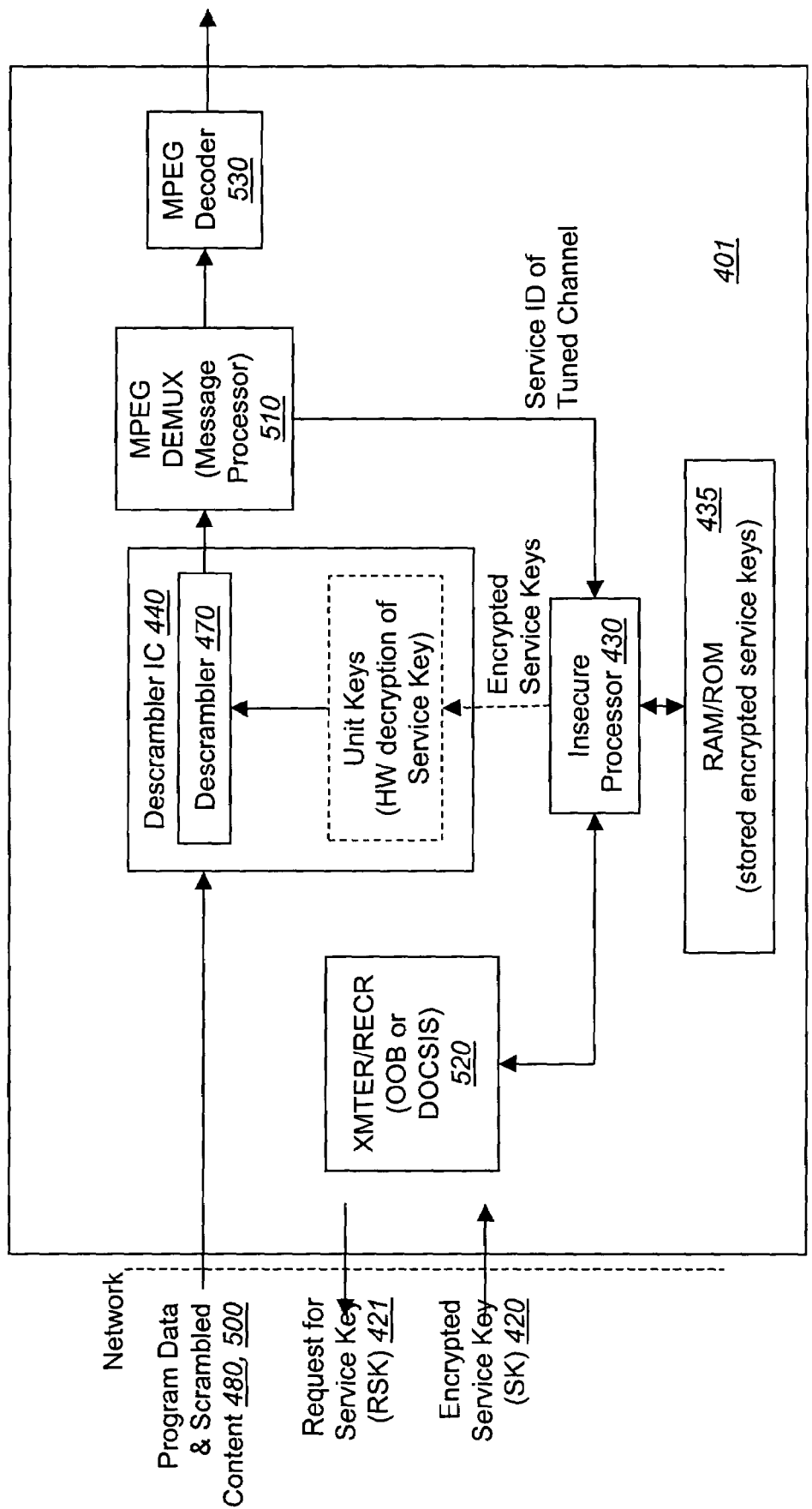
FIG. 5 is a more detailed illustration of the decoder adapted to the headend of FIG. 4.

FIG. 5 provides a more detailed illustration of decoder 401 of FIG. 4 adapted to headend 410 for request and receipt of the Service Key. According to one embodiment of the invention, program data 500 such as an Entitlement Control Message (ECM) or meta-data associated with an Electronic Program Guide (EPG) is provided to decoder 401 by a content provider. The program data 500 is adapted to convey at least an identifier of the desired channel or service (referred to as "Channel or Service ID"). In the event that program data 500 is an IPPV or VOD program, program data 500 may further include a Program identifier (PID).

An MPEG Demultiplexer 510 operates as a message processor to extract the Channel or Service ID. The Channel or Service ID are routed to processor 430, which in combination with transmitter/receiver logic 520 generates the RSK message 421 for routing to headend 410 over return channel 421.

In response, the requested Service Key (SK) in an encrypted format is received by the transmitter/receiver logic 520, which provides the SK to processor 430. Processor 430 may store the SK in a memory 435 and/or provide the SK to descrambler 440 for descrambling incoming scrambled content in real-time. For instance, memory 435 is an optional component for use if it is desirable to storage the SK locally.

Upon receiving the scrambled content of the program data, descrambler 440 descrambles such content, which is subsequently supplied to MPEG decoder 530 if the content is compressed with a MPEG format. MPEG decoder 530 decompresses the digital content and subsequently routes the decompressed digital content to either a digital-to-analog (D/A) converter for display on a television, a Digital Video Interface (DVI) link or a network interface (e.g., IEEE 1394 link).

As shown, processor 430, memory 435, descrambler 440, PEG Demultiplexer 510, transmitter/receiver logic 520 and PEG decoder 530 may be implemented on two or more integrated circuits interconnected through bus traces or another communication scheme (e.g., wires, optical fiber, etc.). Alternatively, these components may be implemented on a single integrated circuit.

In this embodiment, the SK may be valid for a certain period of time. Decoder 401 may store the SK in memory 435, allowing decoder 401 to re-access the service with if SK is still valid without having to request that Service Key again. In this embodiment, the SK is stored in encrypted form (as it comes over the network from headend 410) in memory 435.

The SK may be valid for the duration of a program or it may be valid for a selected period of time, e.g. 6 hours. Using a key for a longer period of time will reduce the overall number of transactions between decoder 401 and headend 410 because, once SK is stored in memory 435 of decoder 401, it is readily available. Depending on the duration of the current Service Key (e.g., SK), the next Service Key ($SK_{next}$) may be delivered along with the SK. Alternatively, decoder 401 may request the $SK_{next}$ after detecting the end of the SK's valid Epoch (e.g., time duration of the SK). In different embodiments, the Service Key may be valid for a duration of a user's subscription period.

Services can be sold a-la-carte or sold as a package. There may be several tiers of services, each identified by a Service ID. For example, there may be a basic tier of services, a medium tier offering more services, and advanced tiers offering different premium services. Each incremental tier of services may be given a separate Service Key.

In summary, decoder 401 of FIG. 4 comprises a descrambler 240 with a Unique Key loaded during IC manufacturer or creation of decoder. Service Keys are delivered to decoder 401 encrypted by the Unique Key and stored in encrypted form in decoder 401. Alternatively, decoder 401 could request a Service Key each time that decoder 401 tunes to a channel without storing the Service Key(s} locally.

The entitlements normally held by the secure cryptographic processor of FIG. 2 are held by the controlling authority such as a key server in headend 410 of FIG. 4 for example. Processor 430 in decoder 401 may receive a message (e.g., an ECM or an EMM), which tells it what it is authorized to descramble so that it may properly display viewing options to a viewer. Processor 430 can then request Service Keys for selected channels.

There is no embedded "secure" firmware or software. Using the hardware decryption circuit mentioned above, an embedded processor core or firmware that performs a cryptographic function is not needed. This enables a number of conditional access applications, which may be downloaded to the insecure processor. The Service Key is unit key encrypted. It may be a public asymmetric key or secret symmetric key.

Additional advantages include Pay-TV applications without using a cryptographic processor by providing decoder 401 having descrambler 440 with Unique Keys hardwired therein. Decoder 401 can request a Service Key or descrambling key from a network provider. Local access control can be performed by processor 430 because the critical "secure" function is isolated in descrambler 440.

Figure 6A:
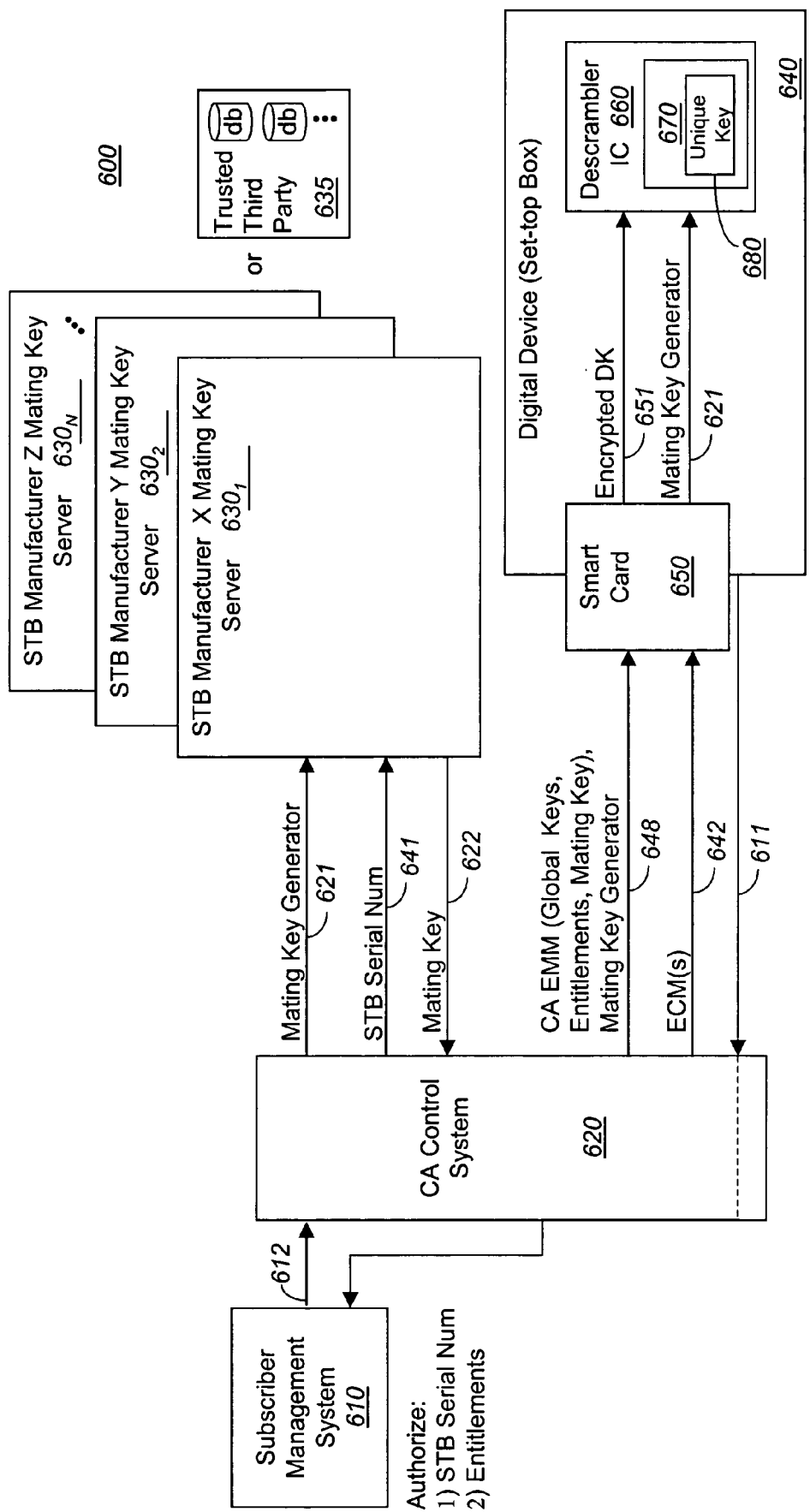
FIG. 6A is a third exemplary embodiment of a secure content delivery system.

Referring now to FIG. 6A, a third exemplary embodiment of a secure content delivery system 600 is shown. Secure content delivery system 600 comprises a subscriber management system 610, a Conditional Access (CA) control system 620, a plurality of mating key servers associated with different digital device (e.g., set-top box) manufacturers $630_1$-$630_N$ ($N \geq 2$) and a digital device (e.g., set-top box) 640 adapted to receive a smart card 650. Smart card 650 communicates with a descrambler 660, which includes local memory 670 configured to store a unique key (referred as "Unique Key") 680 of set-top box 640. Unique Key 680 is loaded during IC manufacturer or creation of set-top box 640.

Once a user of set-top box 640 desires to receive particular program data, set-top box 640 determines whether entitlements associated with the requested program data are already stored therein. If the entitlements are not stored, the user may be notified by a screen display and prompted to issue a request 611. Request 611 may be provided by the user via (i) an out-of-band communication pathway (e.g., electronic mail over the Internet, telephone call by the user, etc.) or (ii) an in-band communication pathway to CA control system 620 in communication with set-top box 640 as shown. Alternatively, request 611 may be sent automatically or may be routed to CA control system 620 which performs a lookup of information to authorize the user substantially in real time.

For one embodiment, request 611 is a message that comprises an identifier (e.g., an alphanumeric , or numeric code) of the requested content, a serial number of set-top box (referred to as "STB Serial Num") and/or an identifier of smart card 650 (referred to as "Smart Card ID"). Implemented as any information processing system (e.g., server, relay station or other equipment controlled by a service provider or content provider), subscriber management system 610 processes request 611 and determines what entitlements are to be provided to set-top box 640. Although not shown, it is contemplated that CA control system 620 could be configured to perform a lookup of databases containing serial numbers of set-top boxes or smart card IDs, thereby eliminating access to subscriber management system 610.

Upon receiving an authorization (AUTH) message 612 from subscriber management system 610, which may include the STB Serial Num and perhaps global keys (e.g., keys used to decrypt ECMs sent in-band with the content), CA control system 620 routes STB Serial Num 641 and a mating key generator 621 to at least one of the mating key servers $630_1$. .., or $630_N$ (generally referred to as "mating key server $630_i$," where $i \geq 1$). CA control system 620 operates as an intermediary to coordinate delivery of a mating key 622 that is used to recover digtal content from downloaded, scrambled content. CA control system 620 may be implemented as a head-end, a broadcast station, a satellite uplink or the like.

Alternatively, instead of CA control system 620 routing mating key generator 621 and STB Serial Num 641 to a mating key servers $630_1$-$630_N$, it is contemplated that such information may be sent to a trusted third party 635, which maintains and controls access to databases featuring mating keys. The values associated with mating key generator 621 and/or STB Serial Num 641 are used to retrieve mating key 622. "Trusted third party" 635 may include, but is not limited or restricted to a governmental entity, a company independently managed from any manufacturer, or the like.

Prior to transmission of STB Serial Num 641 and mating key generator 621, CA control system 620 may perform an authentication scheme with a selected mating key server, such as server $630_1$, in order to establish a session key between CA control system 620 and mating key server $630_1$. Of course, the authentication scheme would be performed with trusted third party 635 if implemented in lieu of mating key server $630_1$. The session key can be used to encrypt information exchanged between the parties in order to provide a secure link there between. Examples of various types of authentication schemes include an exchange of digital certificates, digital signatures, hash values or the like.

Figure 6B:
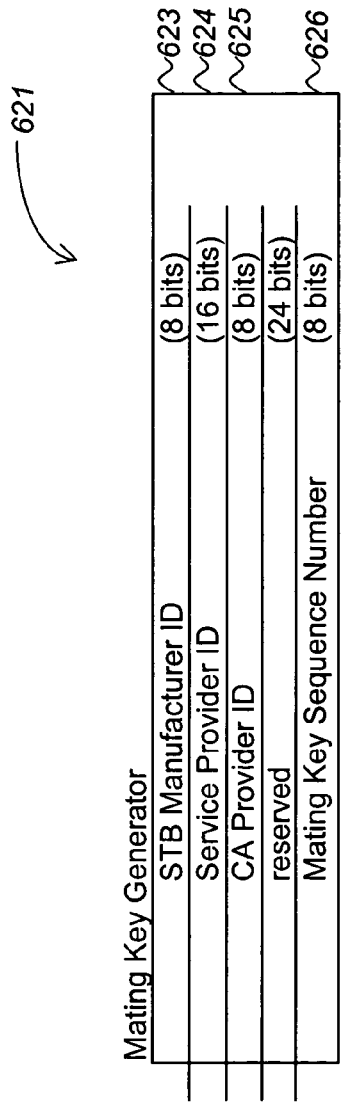
FIG. 6B is an exemplary embodiment of a data structure forming the mating key generator transmitted through a secure content delivery system.

As shown in FIG. 6B, mating key generator 621 is a message that comprises one or more of the following: a Set-Top-Box Manufacturer identifier (STB Manufacturer ID) 623, a Service Provider ID 624, a conditional access (CA) Provider ID 625 and a Mating Key Sequence Number 626. Of course, the size (in bits) of these values/fields can be varied.

For this embodiment, "STB manufacturer ID" 623 is a predetermined value that identifies a manufacturer of set-top box 640. Of course, it is contemplated that STB manufacturer ID 623 is optional, depending on the particular arrangement of STB Serial Num 641. "Service Provider ID" 624 is a value (e.g., one or more bits such as 16-bits) that identifies the communications system provider as well as the selected distribution mechanism. For example, Service Provider ID 624 may identify which cable, satellite, terrestrial or Internet company is supplying the requested program data and/or the particular head-end server of that company. "CA Provider ID" 625 indicates the provider of CA control system 620. "Mating Key Sequence Number" 626 is used for reordering packets of information if mating key 622 is more than one packet in length, and in certain systems, may also be used to indicate expiration of mating key generator 621.

Referring back to FIG. 6A, STB Serial Num 641 may have a unique portion for each STB Manufacturer ID 623 in order to identify mating key server $630_1$,..., or $630_N$ (or database of trusted third party 635) to which access is sought. Alternatively, STB Serial Num 641 may be expanded to include a serial number of set-top box 640 as well as a code field to identify the manufacturer of that set-top box 640. Of course, the number of bits is a design choice.

Upon receipt of mating key generator 621 and STB Serial Num 641, the appropriate mating key server (e.g., server $630_i$, where $i \geq 1$) returns mating key 622. In this embodiment, mating key 622 is used to encrypt a descrambling key needed to descramble scrambled content being sent to set-top box 640. More specifically, mating key server $630_i$ accesses a pre-stored key being an identical copy of Unique Key 680 and encrypts mating key generator 621 using the accessed key. This produces a key equivalent to mating key 622. Alternatively, it is contemplated that mating key generator 621 may undergo a one-way hash operation in which the result is encrypted or only a portion of mating key generator 621 may be encrypted to produce mating key 622. A similar operation needs to be repeated, however, within descrambler 660.

Upon receipt of mating key 622, CA control system 620 generates an entitlement management message (EMM) 648 along with one or more ECMs 642 sent to smart card 640. One embodiment of EMM 648 is illustrated in FIG. 6C.

Figure 6C:
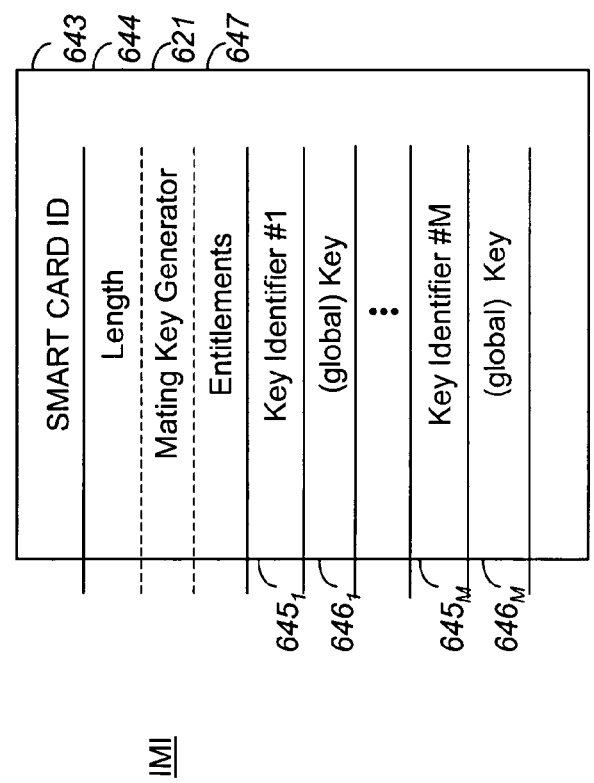
FIG. 6C is an exemplary embodiment of an entitlement management message (EMM) routed to a set-top box of the system of FIG. 6A.

As shown in FIG. 6C, EMM 648 comprises at least two of the following: Smart Card ID 643, length field 644, mating key generator 621, "M" ($M \geq 1$) key identifiers $645_1$-$645_M$ and keys $646_1$-$646_M$ associated with key identifiers $645_1$-$645_M$, respectively. Of course, other entitlements 647 may be included in EMM 648. Also, it is contemplated that mating key generator 621 may be excluded from EMM 648 and sent separately and generally concurrent with EMM 648.

In particular, with respect to FIG. 6C, smart Card ID 643 is a bit value that is used to indicate a particular set-top box and perhaps the manufacturer of the set-top box. "EMM length field" 644 is a bit value that is used to indicate the length of EMM 648. Mating key generator 621, as shown, is a bit value that includes the parameters forth above in FIG. 6B. Each "key identifier" $645_1$-$645_M$ is a 16-bit entitlement tag value that is signed for use in checking whether keys $646_1$-$646_M$ have been illicitly altered. Keys $646_1$-$646_M$ are used to decrypt ECMs 642 used to deliver access requirements and at least one descrambling key in an encrypted format.

Figure 7A:
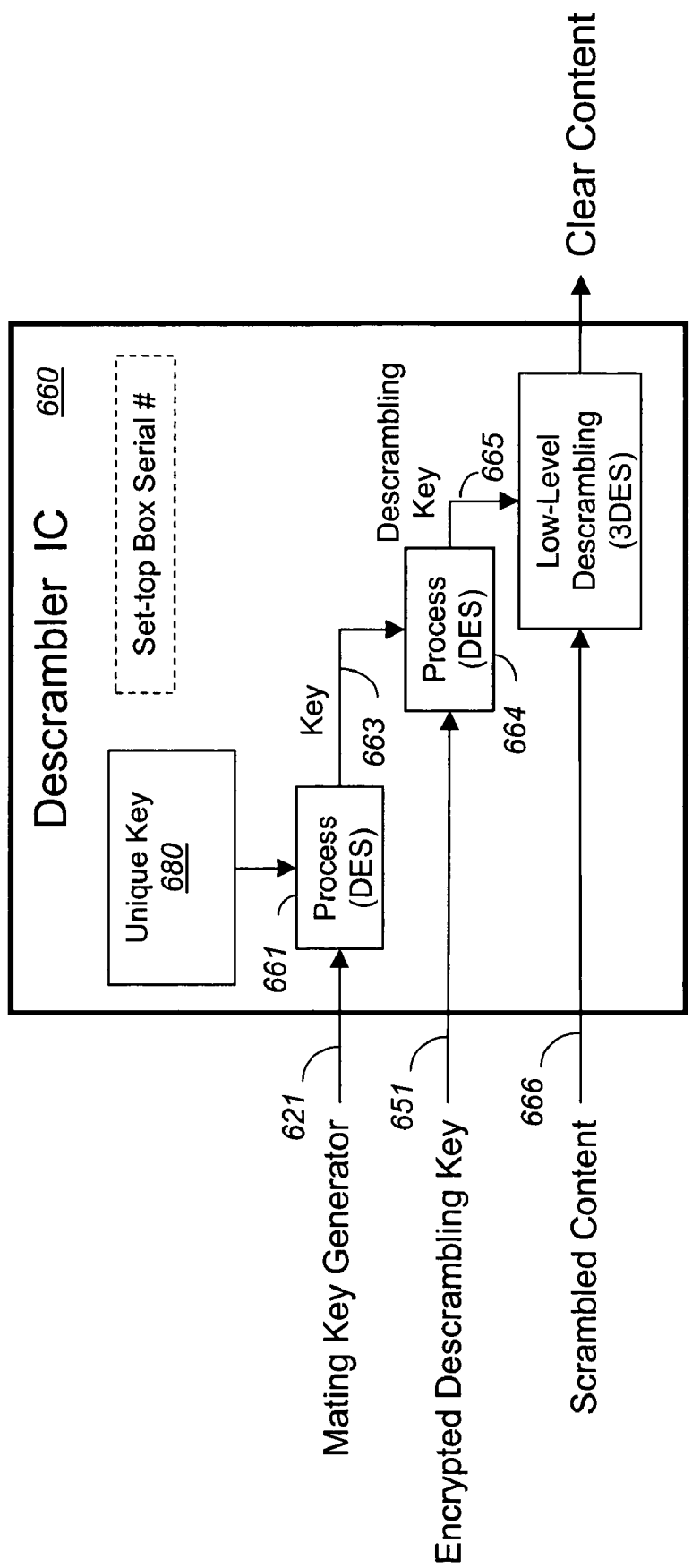
FIG. 7 is an exemplary embodiment of a descrambler implemented within the decoder of the set-top box of the system of FIG. 6A.
Figure 7B:
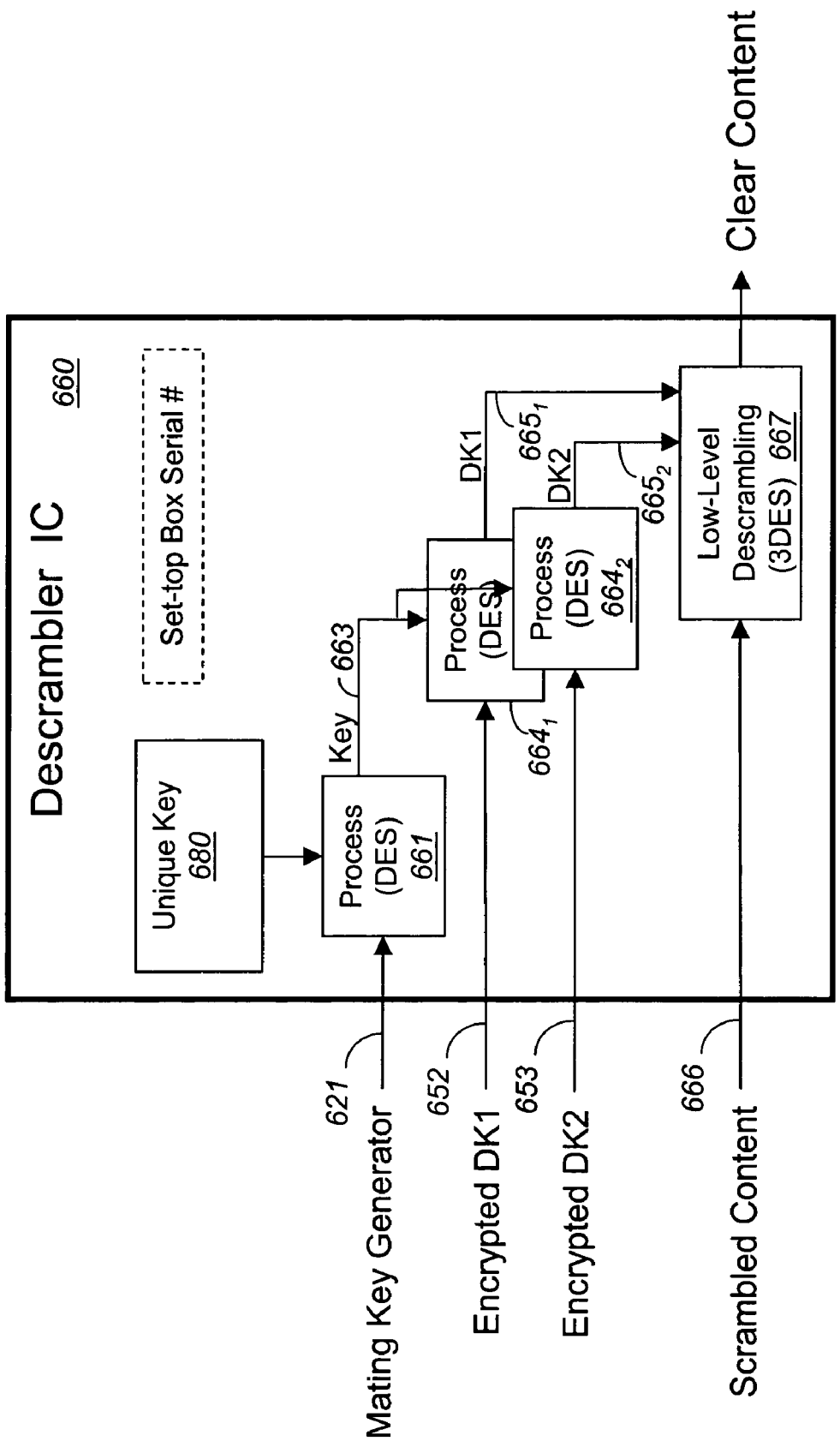
Figure 7C:
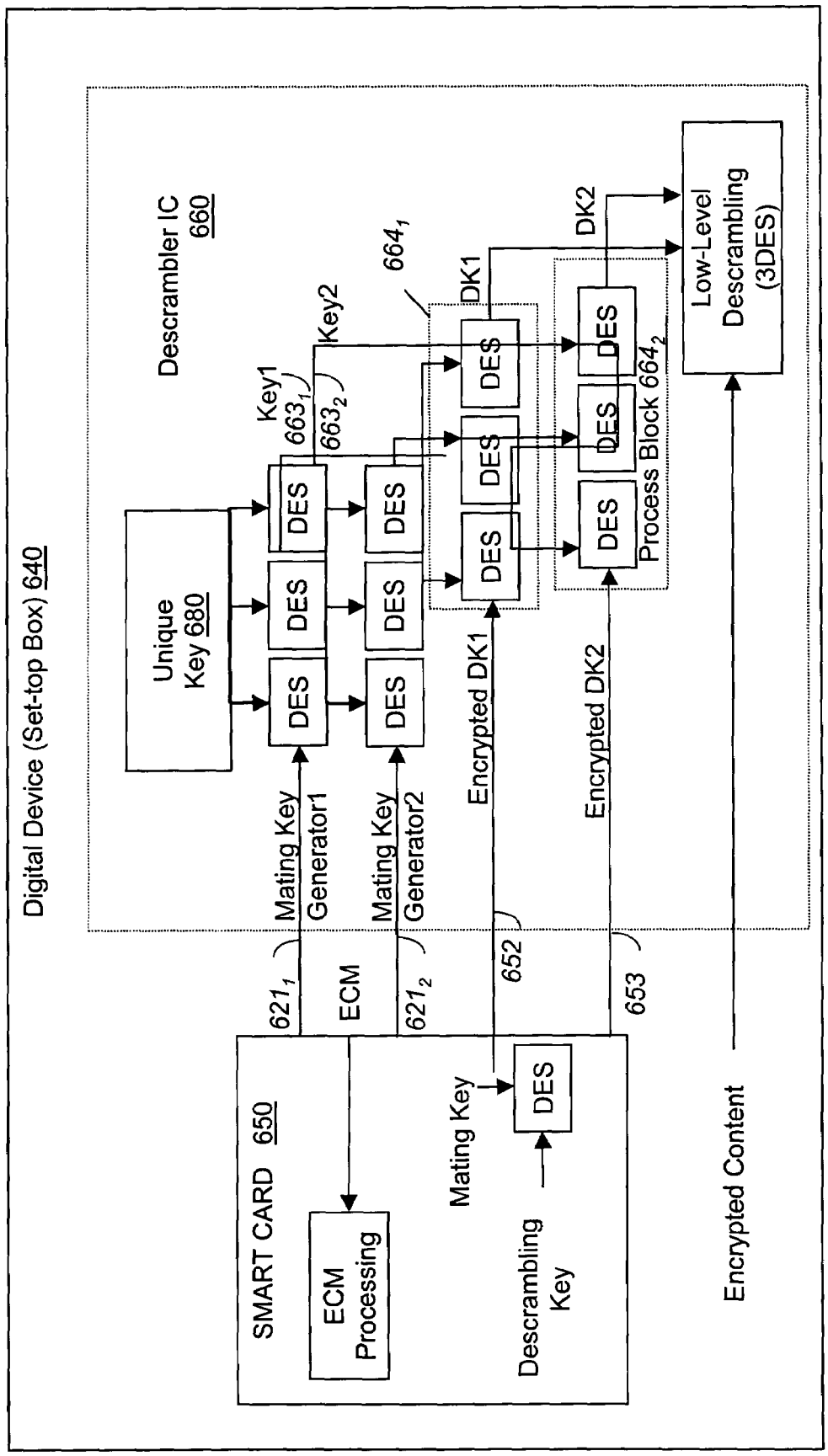

Smart card 650 receives EMM 648 and forwards mating key generator 621 and an encrypted descrambling key 651 recovered from ECM 642 to descrambler 660 of set-top-box 640 as described in FIGS. 7A-7C.

FIG. 7A is a first exemplary embodiment of descrambler 660 implemented within set-top box 640 of FIG. 6A. On receipt of mating key generator 621 and encrypted descrambling key 651 from smart card 650, descrambler 660 comprises a first process block 661 that performs an encryption operation on mating key generator 621 using Unique Key 680 stored in descrambler 660. The encryption or decryption operations associated with the process blocks may be performed in accordance with a cryptographic function such as Data Encryption Standard (DES), Advanced Encryption Standard (AES), IDEA, Triple DES (3DES) and the like. Some of these cryptographic functions are identified merely for illustrative purposes.

The encryption operation on mating key generator 621 produces a key 663 identical to mating key 622, which is loaded into a second process block 664. Process block 664 is used to decrypt encrypted descrambling key 651 to produce a descrambling key 665. Descrambling key 665 is used for descrambling scrambled content 666 loaded into set-top box 640 and in particular descrambler 660. Descrambling may include performance of 3DES operations on scrambled content 666. The result is content in a clear format, which may be transmitted from descrambler 660 and subsequently loaded into a MPEG decoder as shown in FIG. 5 or optionally into a D/A converter, DVI Interface or IEEE 1394 interface.

It is contemplated that process blocks 661 and 664 may be altered to support decryption and encryption respectively, depending on how mating key 622 is formulated.

FIG. 7B is a second exemplary embodiment of descrambler 660 implemented within set-top box 640 of FIG. 6A. The descrambling is in accordance with 3DES with 2 keys. As set forth in FIG. 7A, descrambler 660 comprises a first process block 661 that performs an encryption operation on mating key generator 621 using Unique Key 680.

The encryption operation on mating key generator 621 produces key 663, which is identical to mating key 622. The key 663 is loaded into two DES process blocks $664_1$ and $664_2$. Process block $664_1$ is used to decrypt a first encrypted descrambling key 652 to produce a first descrambling key (DK1) $665_1$. Process block $664_2$ is used to decrypt a second encrypted descrambling key 653 to produce a second descrambling key (DK2) $665_2$. DK1 $665_1$ and DK2 $665_2$ are used by a low-level 3DES descrambling logic 667 for descrambling scrambled content 666.

Of course, it is further contemplated that process block 661 may be configured to support 3DES with multiple keys as shown in FIG. 7C. For this embodiment, multiple mating key generators $621_1$ and $621_2$ are provided by smart card 650 to produce two keys $663_1$ and $663_2$ that are provided to process blocks $664_1$ and $664_2$, respectively. These process blocks $664_1$ and $664_2$ produce descrambling keys $665_1$ and $665_2$ that are used by a low-level 3DES descrambling logic 667 for descrambling scrambled content 666.

As illustrated in FIG. 7C, a first mating key generators $621_1$ may be configured as mating key generator 621 of FIG. 6B. However, a second mating key generators $621_2$ may be configured to authenticate copy protection parameters placed into key $663_2$. For instance, second mating key generators $621_2$ may comprise a copy control information (CCI) field that provides copy controls and a content identifier field that identifies incoming content to which the copy controls are applied. For instance, the CCI field may identify that the content cannot be copied for persistent storage or may be copied a certain number of times (once, twice, etc.). The CCI field may be used to identify the number of times that the content can be played back or sets prescribed viewing times for such content.

The second mating key generators $621_2$ may further comprise a Content ID field including a value that identifies the digital content associated therewith and may include data to manage validity/expiration of the digital content. The second mating key generators $621_2$ may further comprise a Copy Generation Number field including a value that identifies the number of times the digital content can be copied. Of course, to reduce the size of the fields, multiple parameters may be hashed and stored in the fields.

Figure 8:
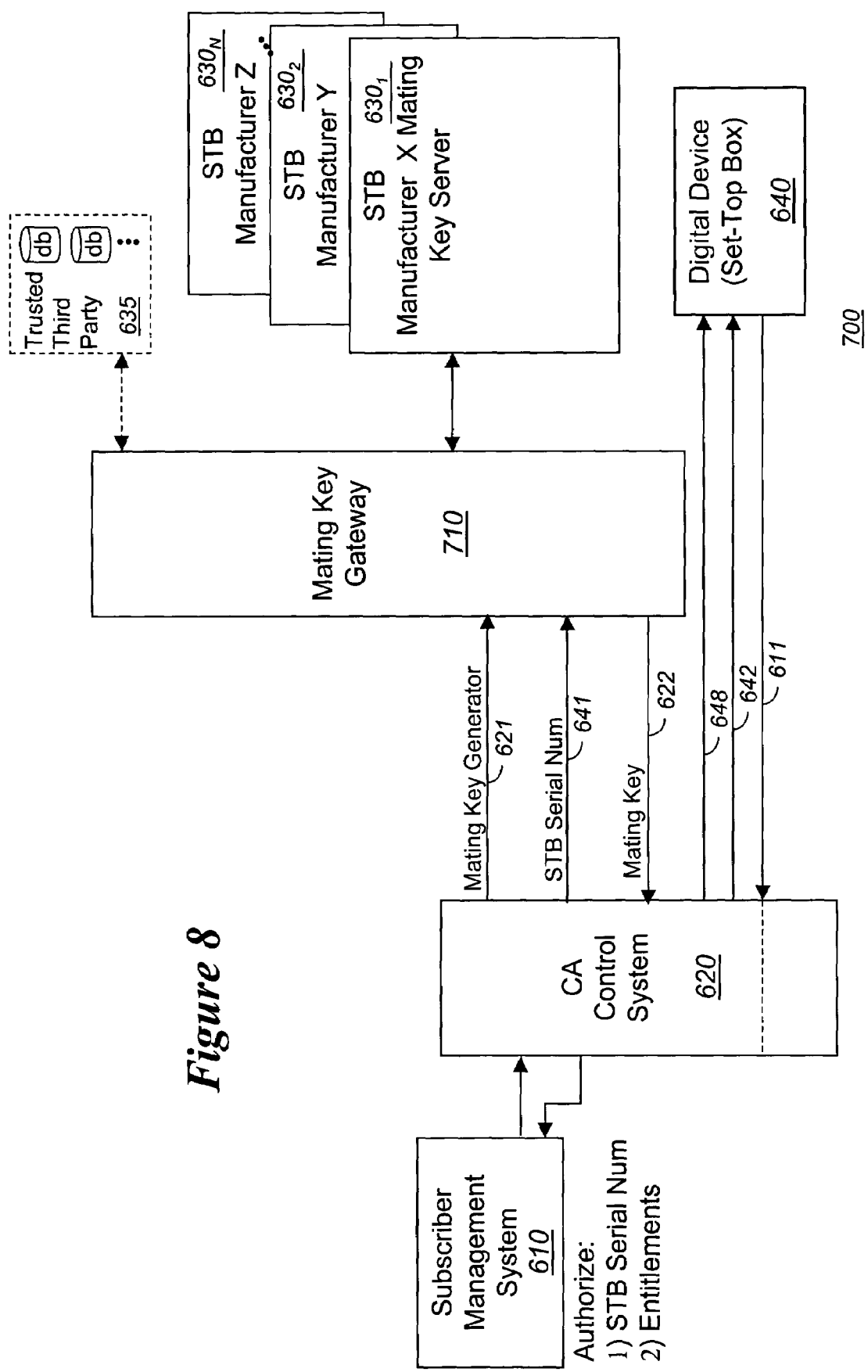
FIG. 8 is a fourth exemplary embodiment of a secure content delivery system.

Referring now to FIG. 8, a fourth exemplary embodiment of a secure content delivery system 700 is shown. Secure content delivery system 700 comprises subscriber management system 610, CA control system 620, a mating key gateway 710, mating key servers $630_1$-$630_N$ and set-top box 640. In lieu of transmitting mating key generator 621 and STB Serial Num 641 from CA control system 620 to mating key servers $630_1$-$630_N$ as shown in FIG. 6A, such information may be routed to mating key gateway 710. Mating key gateway 710 accesses the STB Manufacturer ID 623 of FIG. 6B from mating key generator 621 and appropriately routes mating key generator 621 and STB Serial Num 641 to a selected mating key server $630_i$. This reduces the amount of processing time by CA control system 620 or servers $630_1$-$630_N$ to recover mating key 622.

Alternatively, instead of mating key gateway 710 routing mating key generator 621 and STB Serial Num 641 to the selected mating key server $630_i$, it is contemplated that such information may be routed to trusted third party 635, which accesses a targeted database for retrieval of a mating key. The database selected for retrieval of mating key 622 is based on values associated with mating key generator 621 and/or STB Serial Num 641. For instance, each database may be accessible over a range of addresses based on values associated within mating key generator 621 and/or STB Serial Num 641. These values are used to identify the targeted database.

Figure 9A:
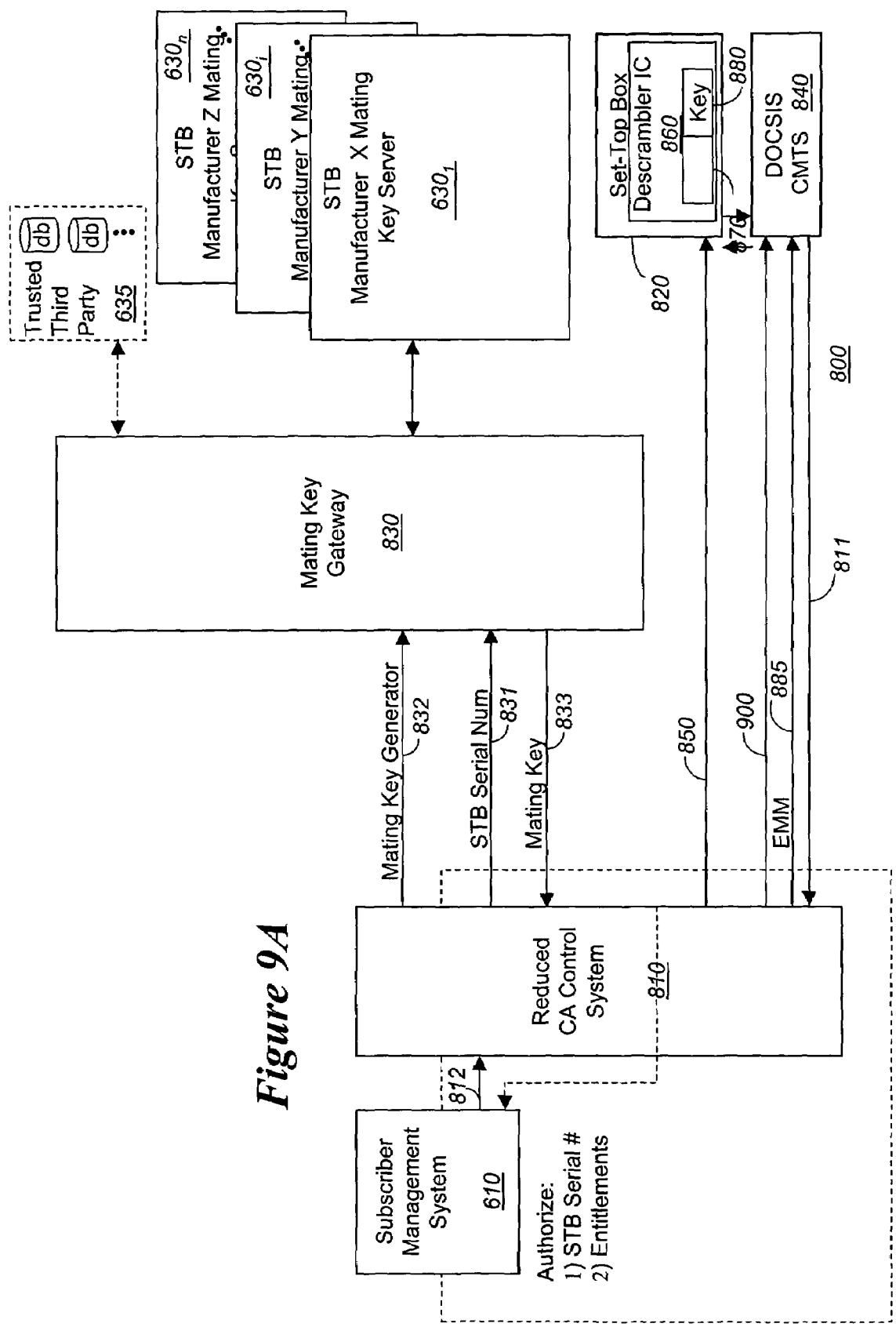
FIG. 9A is a fifth exemplary embodiment of a secure content delivery system.

FIG. 9A is a fifth exemplary embodiment of a secure content delivery system 800. Secure content delivery system 800 comprises subscriber management system 610 and a CA control system 810, a plurality of mating key servers $630_1$-$630_N$ associated with different set-top box manufacturers, a set-top box 820, a mating key gateway 830 (similar to gateway 710 of FIG. 8), and a network interface 840 (e.g., DOCSIS CMTS). Set-top box 820 comprises a descrambler 860 including local memory 870 configured to store a unique key 880 (referred to as "Unique Key") of set-top box 820. The Unique Key 880 is loaded during IC manufacturer or creation of set-top box 820.

Figure 9C:
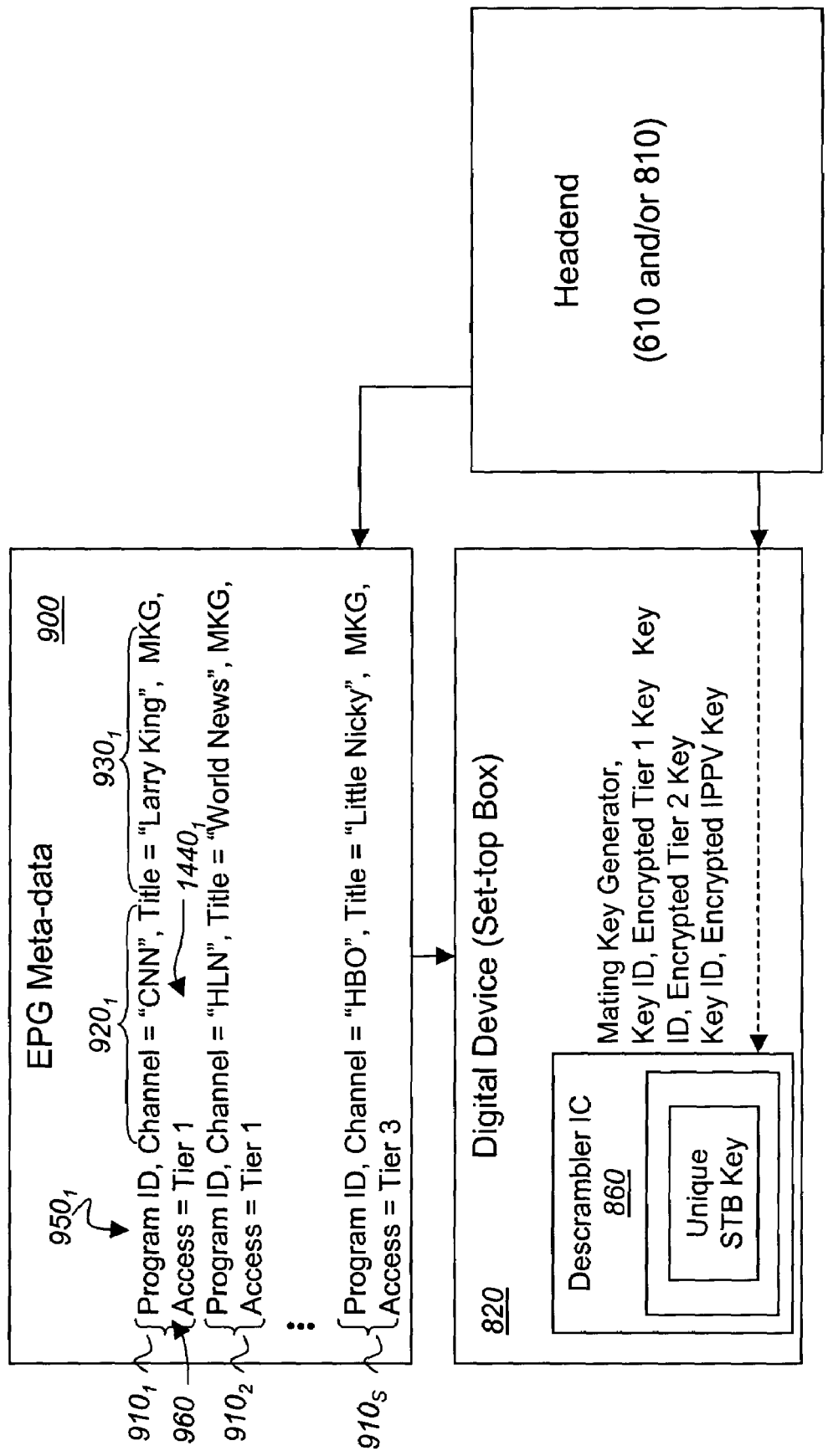
FIG. 9C is an exemplary embodiment of meta-data associated with an electronic program guide (EPG) routed to the set-top box of the system of FIG. 9A.

Set-top box 820 receives electronic program guide (EPG) meta-data with the EPG in an unscrambled format and receives digital programming content 850 in a scrambled format. In one embodiment, EPG meta-data 900 is provided out-of-band by CA control system 810. As shown in FIG. 9C, one embodiment of EPG meta-data 900 includes multiple tag entries $910_1$-$910_S$ (S≧1) for different types of content provided by a content provider. Each tag entry $910_j$ (1≦j≦S) comprises at least a channel name $920_j$, a name of the content $930_j$, and a key identifier $940_j$ indicating the tier of service associated with the channel. In addition, each tag entry $910_j$ further comprises a program identifier (PID) $950_j$ and a mating key generator (MKG) $960_j$. Meta-data 900 is used to provide a mating key generator (e.g., mating key generator 621) and key identifier(s) for verification of the keys provided in the EMM 885.

Referring back to FIG. 9A, once a user of set-top box 820 desires to receive particular type of content (e.g., PPV movie, broadcast channel, etc.), set-top box 820 determines whether entitlements associated with the requested content are already stored therein. If the entitlements are not stored, the user may be notified directly through a screen display or audio playback and prompted to provide a request 811 to subscriber management system 610 (or CA control system 810). Alternatively, the request 811 may be sent automatically without user control. Request 811 may be provided out-of-band (e.g., telephone call or e-mail over Internet via DOCSIS) as shown, or in-band to subscriber management system 610.

As shown for this embodiment, upon receiving an authentication message 815 from subscriber management system 610, including STB Serial Num 831 and entitlements (or looking up STB Serial Num 831 at CA control system 810), CA control system 810 routes STB Serial Num 831 and mating key generator 832 to mating key gateway 830. Mating key gateway 830 operates as an intermediary to coordinate delivery of mating key 833 that is used to extract the requested content from downloaded, scrambled information. Of course, CA control system 810 may perform an authentication scheme with mating key gateway 830 in order to establish secure communications there between.

Upon receipt of mating key 833, CA control system 810 generates one or more entitlement management message (EMM) 885. No ECMs are provided; only channel keys over EMM 885 for example. One embodiment of EMM 885 is illustrated in FIG. 9B.

As shown in FIG. 9B, EMM 885 comprises at least two of the following: STB Serial Num 831, EMM length field 842, mating key generator 832, "M" (M≧1) key identifiers $844_1$-$844_M$ and encrypted service keys $846_1$-$846_M$ associated with key identifiers $844_1$-$844_M$, respectively. Of course, other types of entitlements besides identifiers or service keys may be included in EMM 885 and the size (in bits) of these values can be varied. Also, it is contemplated that mating key generator 832 may be excluded from EMM 885 and sent separately and generally concurrent with EMM 885.

STB Serial Num 831 is a value that is used to indicate a particular set-top box and perhaps the manufacturer of the set-top box. "EMM length field" 842 is a bit value that is used to indicate the length of EMM 885. Mating key generator 832, as shown, is a bit value that includes the parameters forth above in FIG. 6B. Each "key identifier" $844_1$-$844_M$ is a 16-bit value that indicates a tier of service associated with a corresponding encrypted service key $846_1$-$846_M$, respectively. The encrypted service keys $846_1$-$846_M$ are decrypted by a key produced within descrambler 860 that corresponds to mating key 833 of FIG. 9A.

Figure 10:
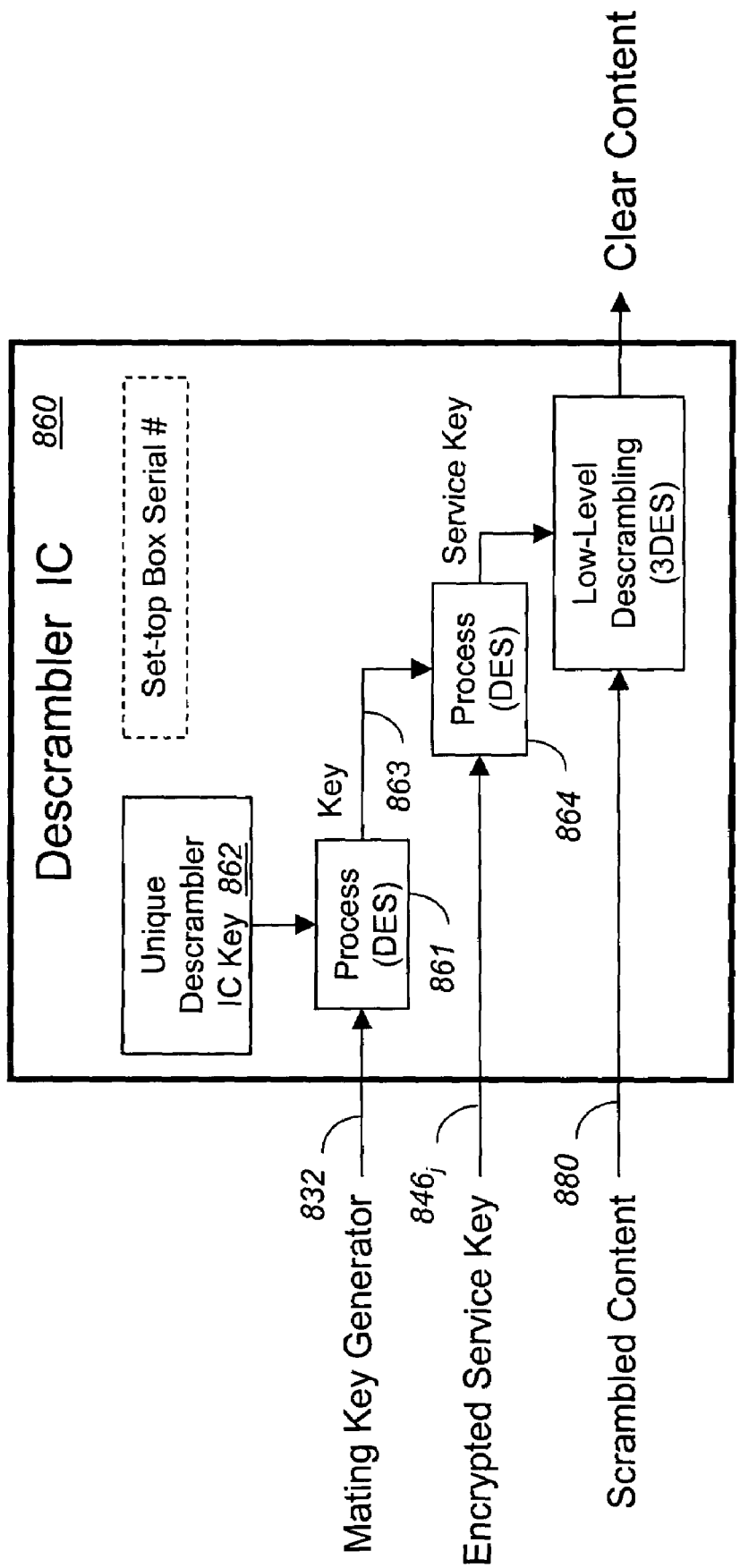
FIG. 10 is an exemplary embodiment of the descrambler implemented within the set-top box of FIG. 9A.

FIG. 10 is a first exemplary embodiment of descrambler 860 implemented within set-top box 820 of FIG. 9A. On receipt of mating key generator 832 and encrypted service keys $846_j$ (1≦j≦M) included in EMM 885, descrambler 860 comprises a first process block 861 that performs an encryption operation on mating key generator 832 using Unique Key 880 previously stored in descrambler 860. The encryption operation may be in accordance with symmetric key cryptographic functions such as DES, AES, IDEA, 3DES and the like. Of course, it is contemplated that process block 861 may be altered to perform a hashing function in lieu of an encryption function.

The encryption operation on mating key generator 832 produces a key 863 that is identical to mating key 833. Key 863 is loaded into a second process block 864 that is used to decrypt the encrypted service key $846_j$ to recover the service key used to descramble scrambled content 850 loaded into set-top box 840 and in particular the descrambler 860. Descrambling may include performance of 3DES operations on the scrambled content. The result may be content in a clear format, which is transmitted from descrambler 860 and subsequently loaded into a MPEG decoder as shown in FIG. 5 or optionally into a D/A converter, DVI Interface or IEEE 1394 interface.

Figure 11:
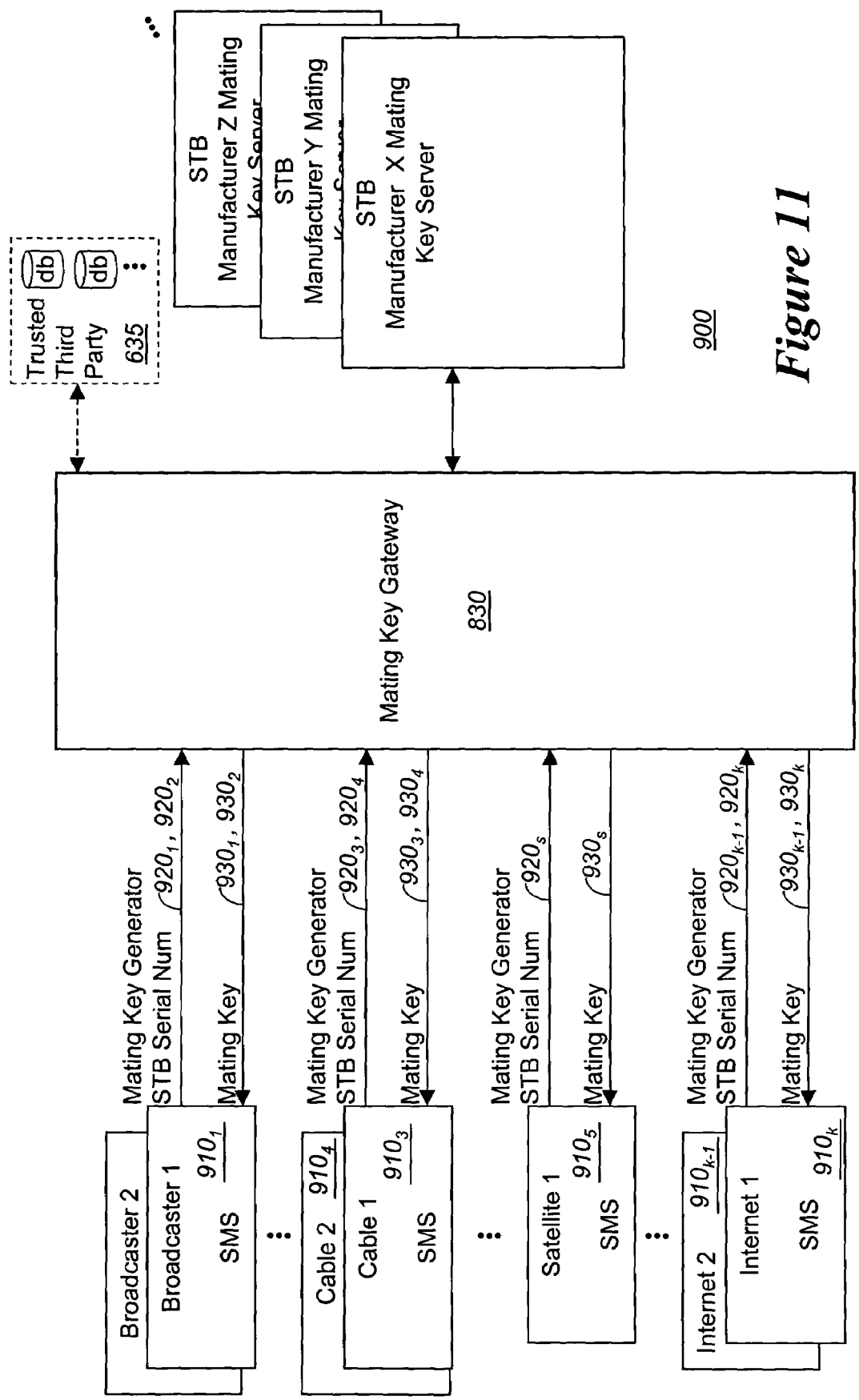
FIG. 11 is a portion of a sixth exemplary embodiment of a secure content delivery system.

Referring now to FIG. 11, a portion of a sixth exemplary embodiment of a secure content delivery system 900 is shown. In lieu of subscriber management system 610 and CA control system 810 of FIG. 9A, mating key gateway 830 may be adapted for communications with a plurality of subscriber management systems (SMS) $910_1$-$910_K$ (K≧1) each associated with a different content provider. Each of these subscriber management systems $910_1$-$910_K$ supply mating key generators and STB Serial Nums $920_1$-$920_K$ to mating key gateway 830 and, in return, receive corresponding mating keys $930_1$-$930_K$. These mating keys $930_1$-$930_K$ are used to encrypt service keys provided to one or more targeted set-top boxes (not shown). Alternatively, trusted third party 635 may be utilized as shown in FIGS. 6A, 8 and 9A.

For example, for this illustrated embodiment, subscriber management systems $910_1$ and $910_2$ are terrestrial broadcasters, each providing mating key generators and STB Serial Nums $920_1$, $920_2$ to mating key gateway 830 and receiving corresponding mating keys $930_1$, $930_2$. Similar in operation, subscriber management systems $910_3$ and $910_4$ are cable operators, subscriber management system $910_5$ is a direct broadcast satellite (DBS) company, and subscriber management systems $910_{K-1}$ and $910_K$ are Internet content sources.

Referring to FIG. 12, a portion of a seventh exemplary embodiment of a secure content delivery system 1000 is shown. A set-top box 1010 of the system 1000 receives scrambled or encrypted content 1020 from a first source and an entitlement management message (EMM) 1040 from a second source. The second source may be a smart card or a CA control system.

In accordance with one embodiment of the invention, EMM 1040 comprises a copy protection key generator (CPKG) 1042 and an encrypted user key 1041. As shown in FIGS. 12 and 13, encrypted user key ($E_{key}$) 1041 is a value that is calculated to generate a copy protection key 1035 in descrambler 1030 when $E_{key}$ 1041 is decrypted by a unique key ("Unique Key") 1031 or a derivative thereof. Unique Key 1031 is loaded during IC manufacturer or creation of set-top box 1010. Copy protection key 1035 is shared with other devices, such as another set-top box 1070, a portable computer (e.g., PDA) 1071, or even a portable jukebox 1072, for decryption purposes.

Figure 14:
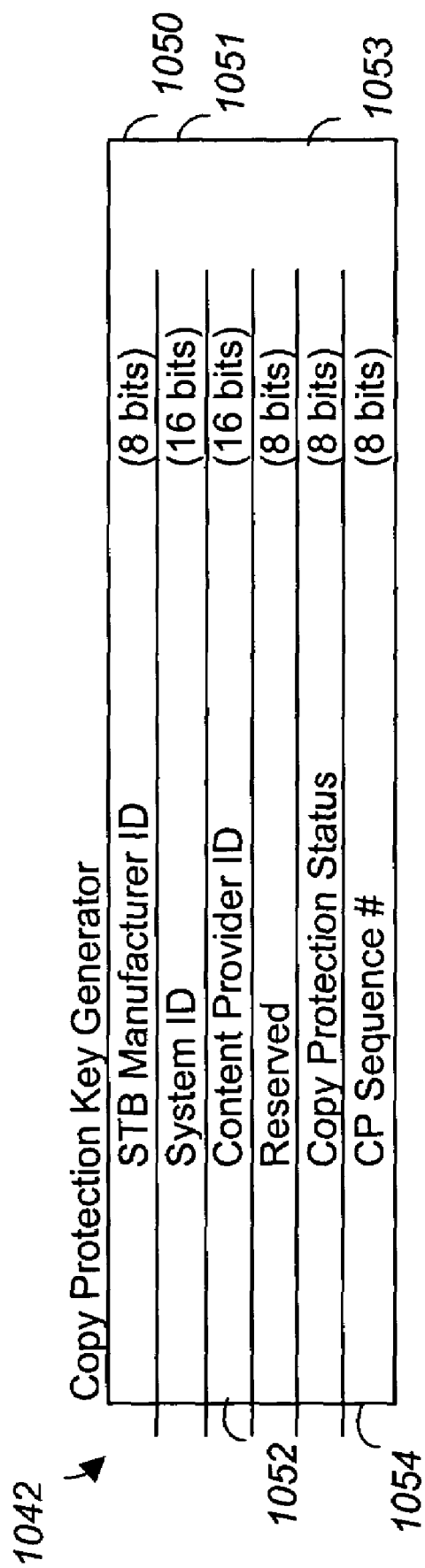
FIG. 14 is an exemplary embodiment of a data structure forming the copy protection key generator of FIG. 12.

As shown in FIG. 14, CPKG 1042 comprises STB manufacturer ID 1050, System ID 1051 to identify a system that provides EMM 1040 (e.g., similar to CA Provider ID 625 of FIG. 6B) Content Provider ID 1052 to identify the provider of the digital content (e.g., similar to Service Provider ID 624 of FIG. 6B), and CP Sequence Number 1053 being generally equivalent in purpose to Mating Key Sequence Number 626 of FIG. 6B. In addition, CPKG 1042 includes a Copy Protection Status value 1054 that provides content management controls such as whether or not the incoming content can be copied, number of times for playback, or date/time of playback.

Referring back to FIG. 13, an embodiment of the descrambler 1030 receives $E_{key}$ 1041, CPKG 1042 and an encrypted descrambling key 1043 from the second source. CPKG 1042 is substantially equivalent to mating key generator 832 of FIG. 9A. Descrambler 1030 comprises a first process block 1032 that decrypts $E_{key}$ 1041 with Unique Key 1031 in accordance with symmetric key cryptographic functions such as DES, AES, IDEA, 3DES and the like.

The decryption operation on $E_{key}$ 1041 recovers the user key 1033, which is loaded into a second process block 1634 that is used to encrypt CPKG 1042 to produce copy protection key 1035. Encrypted descrambling key 1043 is decrypted using Unique Key 1031 (or derivative thereof) to recover the descrambling key is a clear format for descrambling and/or decrypting the encrypted content 1020 loaded into set-top box 1010 and in particular descrambler 1030. Descrambling and/or decrypting may include performance of 3DES operations.

As a result, the content is temporarily placed in a clear format, but is routed to low-level encryption logic 1060, which encrypts the descrambled content with copy protection key 1035 associated with any or all of the destination digital devices. As a result, the content is secure during subsequent transmissions.

Figure 15:
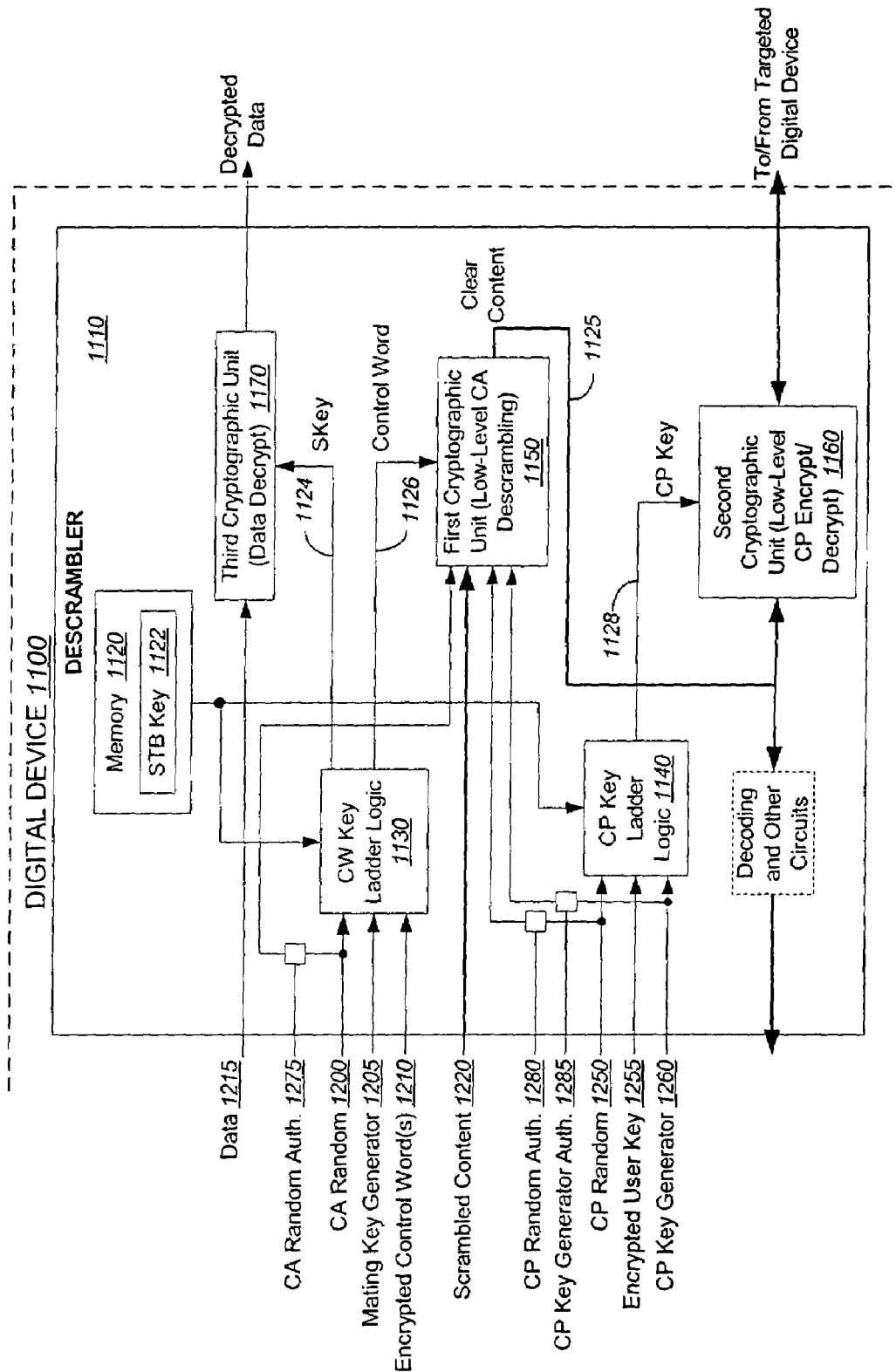
FIG. 15 is another exemplary embodiment of an descrambler implemented within a digital device.

Referring now to FIG. 15, another exemplary embodiment of a descrambler 1110 implemented within a digital device 1100 is shown. Adapted for communication with digital device 1100, descrambler 1110 receives program data from a content provider and routes the program data to a targeted digital device. The program data may be "copy protected" by encrypting or scrambling the program data to avoid the program data being accessible in the clear.

For one embodiment of the invention, descrambler 1110 comprises a memory 1120, Control Word (CW) key ladder logic 1130, Copy Protection (CP) key ladder logic 1140, and a plurality of cryptographic units 1150, 1160 and 1170. Herein, descrambler 1110 is deployed as a single integrated circuit. It is contemplated, however, that descrambler 1110 may be alternatively deployed as multiple integrated circuits contained within a multi-chip package.

As shown in FIG. 15, memory 1120 is a programmable, non-volatile memory that can be written only once in order to enhance security. As a result, at least one unique key 1122 (hereinafter generally referred to as "STB key" and each referred to as STB key-t, where $t \geq 1$) cannot be improperly read or overwritten after being loaded into one-time programmable memory 1120. STB key 1122 is provided to CW key ladder logic 1130 and CP key ladder logic 1140. Thus, STB key 1122, once programmed, cannot be reprogrammed, altered, or read from outside of descrambler 1110. In addition, J-tag cannot be used to read the value after programming. STB key 1122 can be deployed in a number of embodiments, such as, for example, a single 56-bit data sub-key, three 56-bit 3DES sub-keys, or a single 128-bit AES key.

As further shown in FIG. 15, CW key ladder logic 1130 receives input information, namely a conditional access (CA) random value 1200, a mating key generator 1205, and one or more encrypted control words 1210. CW key ladder logic 1130 processes the input information and produces one or more derivative keys 1124 of STB key 1122 (hereinafter generally referred to as "Skey" and each referred to as Skey-u, where $u \geq 1$). Skey 1124 is provided to a third cryptographic unit 1170 for decrypting incoming data 1215. Examples of incoming data 1215 include program data that is sent out-of-band, or hashed data produced by the digital device 1100 that can be used to confirm origination from the digital device 1100 when communicating back to a headend or CA control system for example.

CW key ladder logic 1130 also processes the input information to recover one or more control words 1126 (hereinafter generally referred to as "control words" and each referred to as "CW-v", where $v \geq 1$) from encrypted control words 1210. Control words 1126 are provided to a first cryptographic unit 1150 for descrambling scrambled content 1220. Thereafter, clear content 1225 is provided to a second cryptographic unit 1160, which is configured to as a copy protection mechanism to encrypt clear content 1225 prior to transmission to a digital device such as a digital recorder, a set-top box or the like.

Figure 16:
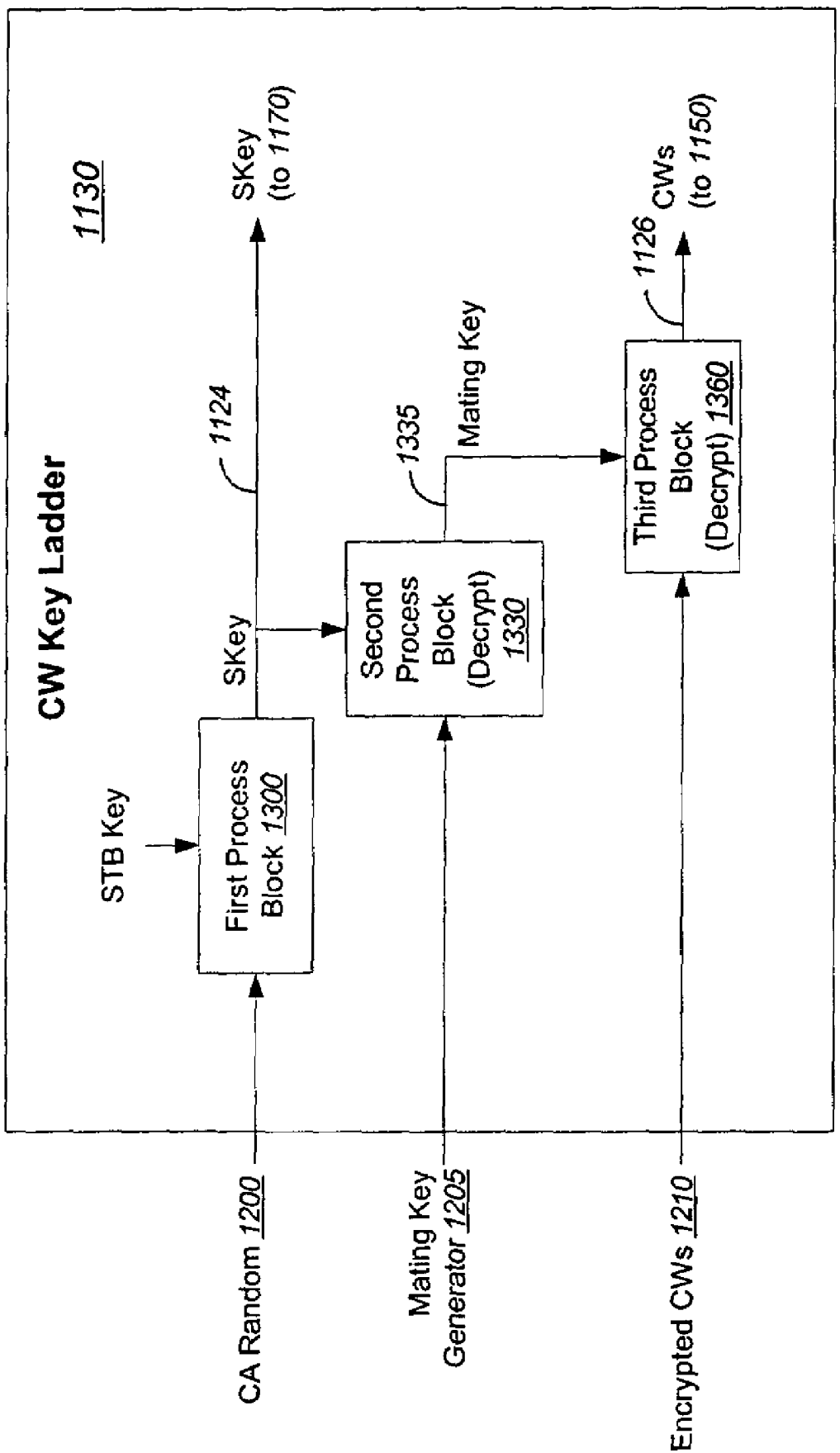
FIG. 16 is an exemplary embodiment of a Control Word (CW) key ladder logic of the descrambler of FIG. 15.

Referring to FIG. 16, an exemplary embodiment of a Control Word (CW) key ladder logic 1130 of descrambler 1110 of FIG. 15 is shown. In general, CW key ladder logic 1130 comprises a first process block 1300, a second process block 1330, and a third process block 1360. First process block 1300 is configured to generate Skey 1124, which is a derivation of STB key 1122. Second process block 1330 is configured to generate one or more mating keys 1335 (hereinafter generally referred to as "mating key" and each referred to as "mating key-w", where $w \geq 1$) based on mating key generator 1205 or a logical derivative thereof. Third process block 1360 is configured to recover control words 1126 upon decrypting encrypted control words 1210 using mating key 1335 or logical derivative(s) thereof.

Figures 17A, 17B, 17C:
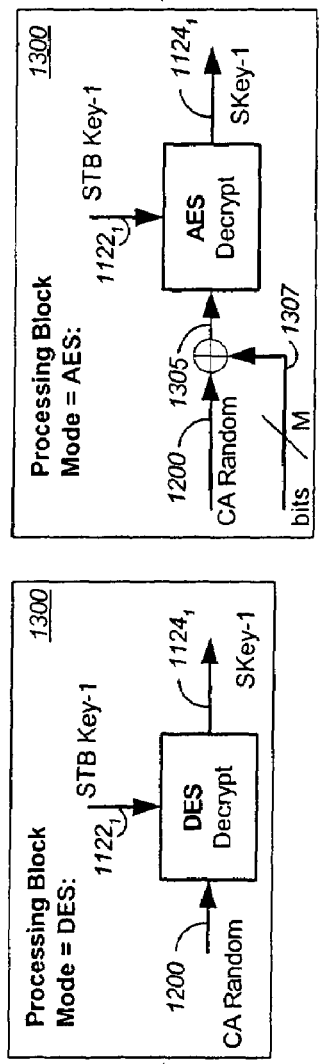
FIGS. 17A-17C are exemplary embodiments of a first process block of the CW key ladder logic of FIG. 16.

Referring now to FIGS. 17A through 17C, exemplary embodiments of operations of first process block 1300 of CW key ladder logic 1130 of FIG. 16 are shown. With respect to FIG. 17A, first process block 1300 performs DES cryptographic operations on CA random 1200, which is a seed value delivered to descrambler 1110 in a message from a content provider. Based on CA random 1200 and STB key-1 1122$_1$, Skey-1 1124$_1$ is generated. Skey-1 1124$_1$ is a derivative key of STB key-1 1122$_1$.

With respect to FIG. 17B, first process block 1300 may be adapted to perform AES cryptographic operations in lieu of DES cryptographic operations. In particular, first process block 1300 is configured to generate Skey-1 1124$_1$, a derivative key of STB key-1 1122$_1$, based on an input bit value 1305 and STB key-1 1122$_1$. For one embodiment of the invention, input value 1305 comprises CA random 1200 in combination with "M" additional bits 1307 set to a predetermined logic value (e.g., all logic "0"). For one embodiment, bits 1307 are positioned as the most significant bits of input value 1305. Input value 1305 is decrypted using STB key-1 1122$_1$ to produce Skey-1 1124$_1$. Herein, where "M" is 64 and CA random 1200 is 64-bits in length, Skey-1 1124$_1$ is 128-bits in length. It is contemplated, however, that other bit sizes may be utilized.

With respect to FIG. 17C, first process block 1300 may be adapted to perform 3DES cryptographic operations in lieu of DES or AES cryptographic operations. When 3DES cryptographic operations are performed, first process block 1300 may be configured to perform logical operations between predetermined values and CA random 1200. The "logical" operations may involve at least one Exclusive OR operation or, if input 1200 is broken out into three separate input paths for data inputs 1310, 1314 and 1315 may involve a bitwise logical check of multiple data values to ensure that the data values are different. The problem is that if data inputs 1310, 1314 and 1315 are the same, then data outputs 1124$_1$, 1124$_2$, 1124$_3$ will be the same. This can relegate 3DES to a single DES operation as two of the keys will cancel each other. This can weaken the security of the overall implementation.

As shown in this embodiment, CA random 1200 is routed via a first computation path 1310. However, CA random 1200 is XOR'ed (e.g., one type of a bitwise logical operation) with a first predetermined value 1311 and a second predetermined value 1312, where results 1314 and 1315 are routed along second and third computation paths 1316 and 1317, respectively. Such XOR operations may be processed in parallel with each other. For this embodiment of the invention, predetermined values 1311 and 1312 differ from each other (e.g., x01H, x02H).

CA random 1200 along with results 1314 and 1315 undergo DES decryption operations using a first unique key "STB key-1" 1122$_1$. The decrypted results are subsequently encrypted using a second unique key "STB key-2" 1122$_2$, and then, are decrypted using a third unique key "STB key-3" 1122$_3$. As a result, first process block 1300 produces Skey 1124; namely, for this embodiment, a first derivative key "Skey-1" 1124$_1$, second derivative key "Skey-2" 1124$_2$, and third derivative key "Skey-3" 1124$_3$.

Regardless of the type of cryptographic function used, Skey 1124 is provided to second process block 1330 in order to produce mating key(s) 1335.

Referring to FIGS. 18A-18C, exemplary embodiments of second process block 1330 of CW key ladder logic 1130 of FIG. 16 is shown. With respect to FIG. 18A, second process block 1330 performs DES cryptographic operations on mating key generator 1205 utilizing Skey-1 1124$_1$, which is a single derivative key of STB key-1 $1122_1$ for this embodiment. This produces mating key-1 $1335_1$ that is provided to third process block 1360.

With respect to FIG. 18B, when AES cryptographic operations are performed, second process block 1330 is configured to generate mating key-1 $1335_1$, based on mating key generator 1205 and Skey-1 $1124_1$. For one embodiment of the invention, an input value 1340 comprises mating key generator 1205 in combination with M-bits 1345 having a predetermined logic value (e.g., all bits set to logic "0"). M-bits 1345 are positioned as the most significant bits of input value 1340, wherein M≦64 for this embodiment. Input value 1340 is decrypted using Skey-1 $1124_1$ to produce mating key-1 $1335_1$.

With respect to FIG. 18C, when 3DES cryptographic operations are performed, second process block 1330 is configured to perform logical operations between predetermined values and mating key generator 1205. More specifically, mating key generator 1205 is routed via first computation path 1350. Also, mating key generator 1205 is XOR'ed with a first predetermined value 1351 and a second predetermined value 1352. These results 1354 and 1355 are routed via second and third computation paths 1356 and 1357, respectively. Such XOR operations may be processed in parallel with each other.

Unlike FIG. 17C, mating key generator 1205 and results 1354 and 1355 undergo DES decryption operations using a derivative keys $1124_1$-$1124_3$, namely Skey-1 $1124_1$, Skey-2 $1124_2$, and Skey-3 $1124_3$. This produces mating keys 1335, namely a mating key-1 $1335_1$, a mating key-2 $1335_2$, and a mating key-3 $1335_3$.

Figure 19A:
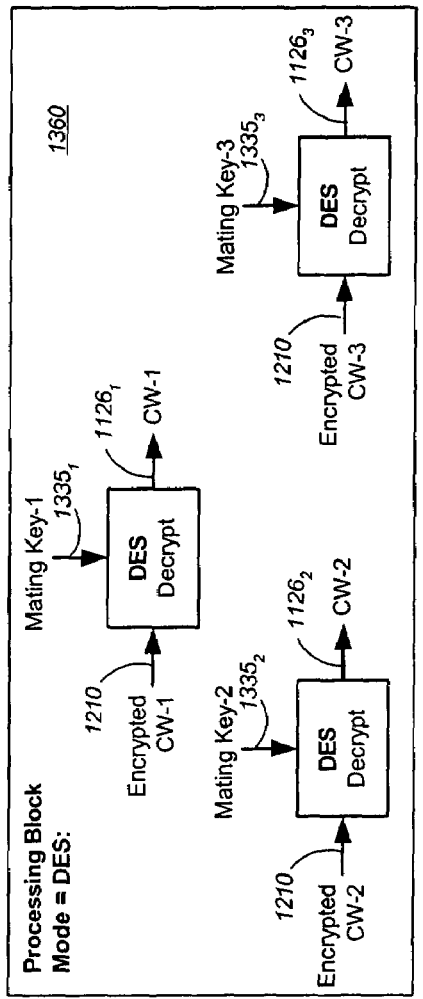
FIGS. 19A-19C are exemplary embodiments of a third process block of the CW key ladder logic of FIG. 16.
Figure 19C:
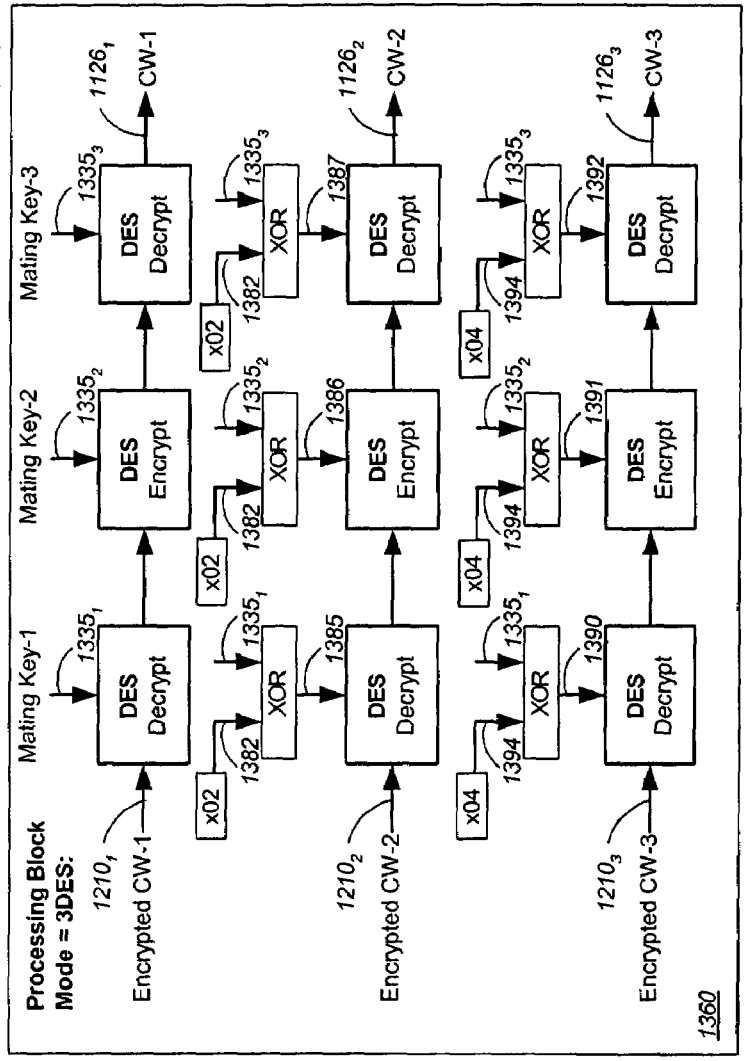
Figure 19B:
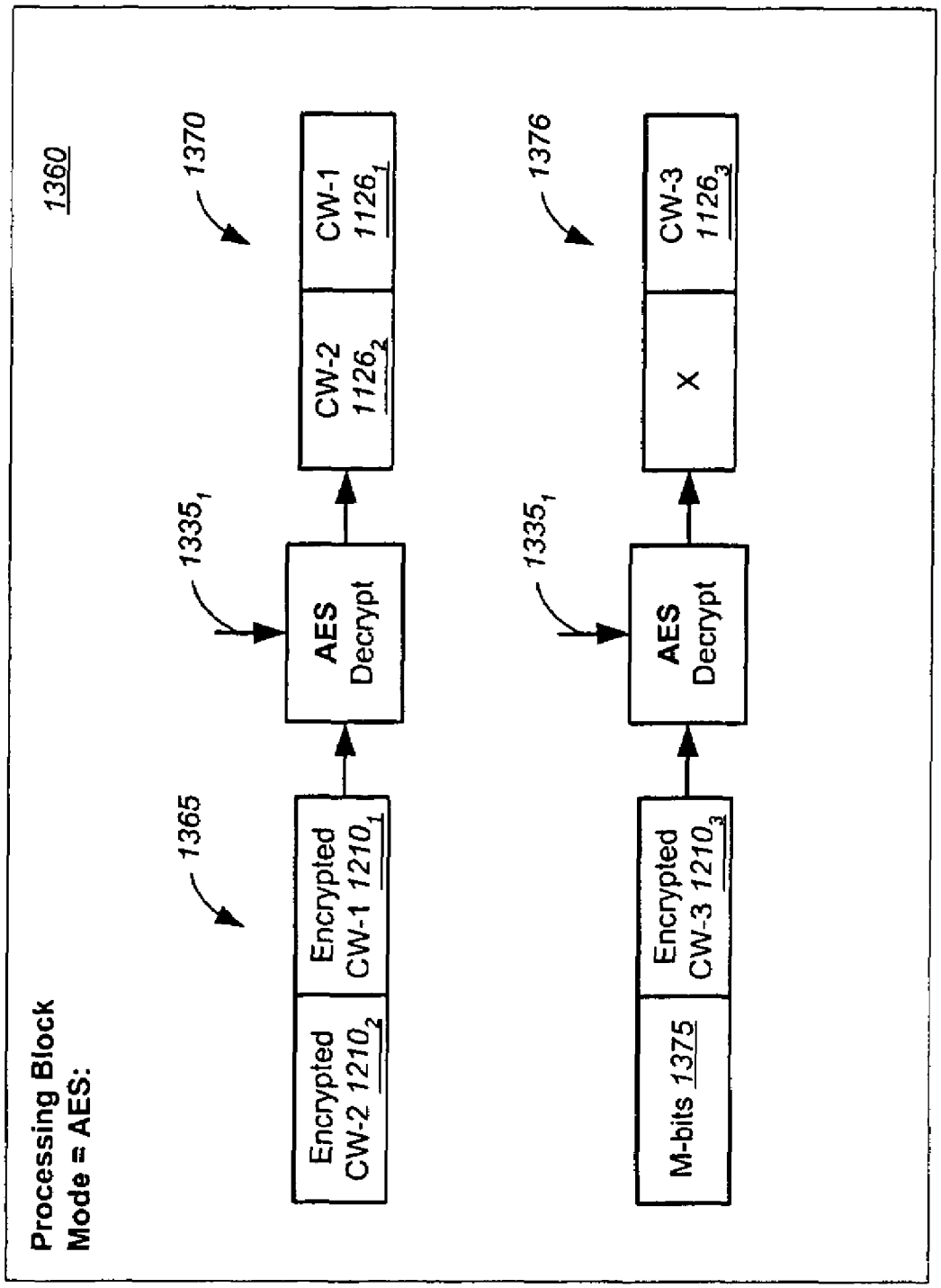

Referring to FIGS. 19A-19C, exemplary embodiments of third process block 1360 of CW key ladder logic 1130 of FIG. 16 is shown. With respect to DES cryptographic function as shown in FIG. 19A, mating key-1 $1335_1$ is used to recover control words 1126. As an illustrative embodiment, control words 1126 feature a plurality of control words, namely a first control word (CW-1) $1126_1$, a second control word (CW-2) $1126_2$, and a third control word (CW-3) $1126_3$.

With respect to FIG. 19B, when AES cryptographic operations are performed, third process block 1360 is configured to recover control words in a collective manner. For instance, according to one embodiment of the invention, input value 1365 comprises first encrypted control word $1210_1$, situated as the least significant portion. A second encrypted word $1210_2$ is positioned as the most significant portion of input value 1365. Input value 1365 is decrypted in accordance with the AES cryptographic function using mating key-1 $1335_1$ produced by second process block 1330 of FIG. 16, which produces a result 1370 having a bit width equivalent to a bit width of input value 1365. For result 1370, CW-1 $1126_1$ is positioned as the least significant portion while CW-2 $1126_2$ is positioned at the most significant portion.

In addition, third process block 1360 is also configured to decrypt a third encrypted control word $1210_3$, perhaps in combination with a plurality of bits 1375 positioned as the most significant bits. Such decryption is performed using mating key-1 $1335_1$, and a result 1376 is produced. Such decryption is in accordance with an AES cryptographic function. CW-3 $1126_3$ may be extracted from result 1376. In one embodiment, the extraction is accomplished by accessing a predetermined number of least significant bits from result 1376.

As shown in FIG. 19C, a plurality of encrypted control words are routed through a 3-DES cryptographic function as shown herein. This recovers CW-1 $1126_1$ through CW-3 $1126_3$. As an example, first encrypted control word $1210_1$ is decrypted in accordance with DES function using mating key-1 $1335_1$. Then, decrypted control word is encrypted using mating key-2 $1335_2$, and subsequently decrypted using the DES function according to a third mating key $1335_3$ to recover CW-1 $1126_1$.

Second encrypted control word $1210_2$, however, is decrypted using key information 1385 produced by first mating key $1335_1$ being XOR'ed with a first predetermined value 1382 (e.g., x02H). This XOR operation prevents cancellation of the keys where recovered CW-1 $1126_1$ is equivalent to recovered CW-2 $1126_2$. This first predetermined value 1382 is XOR'ed with other alternating keys $1335_2$-$1335_3$ to produce key information 1386 and 1387 loaded into DES encryption logic for processing. The same function applies to the recovery of CW-3 $1126_3$, but third encrypted control word $1210_3$ is processed in accordance with cryptographic DES using key information 1390, 1391, 1392 based on mating keys $1335_1$-$1335_3$ XOR'ed with a second predetermined value 1394 (e.g., x04H).

Figure 20:
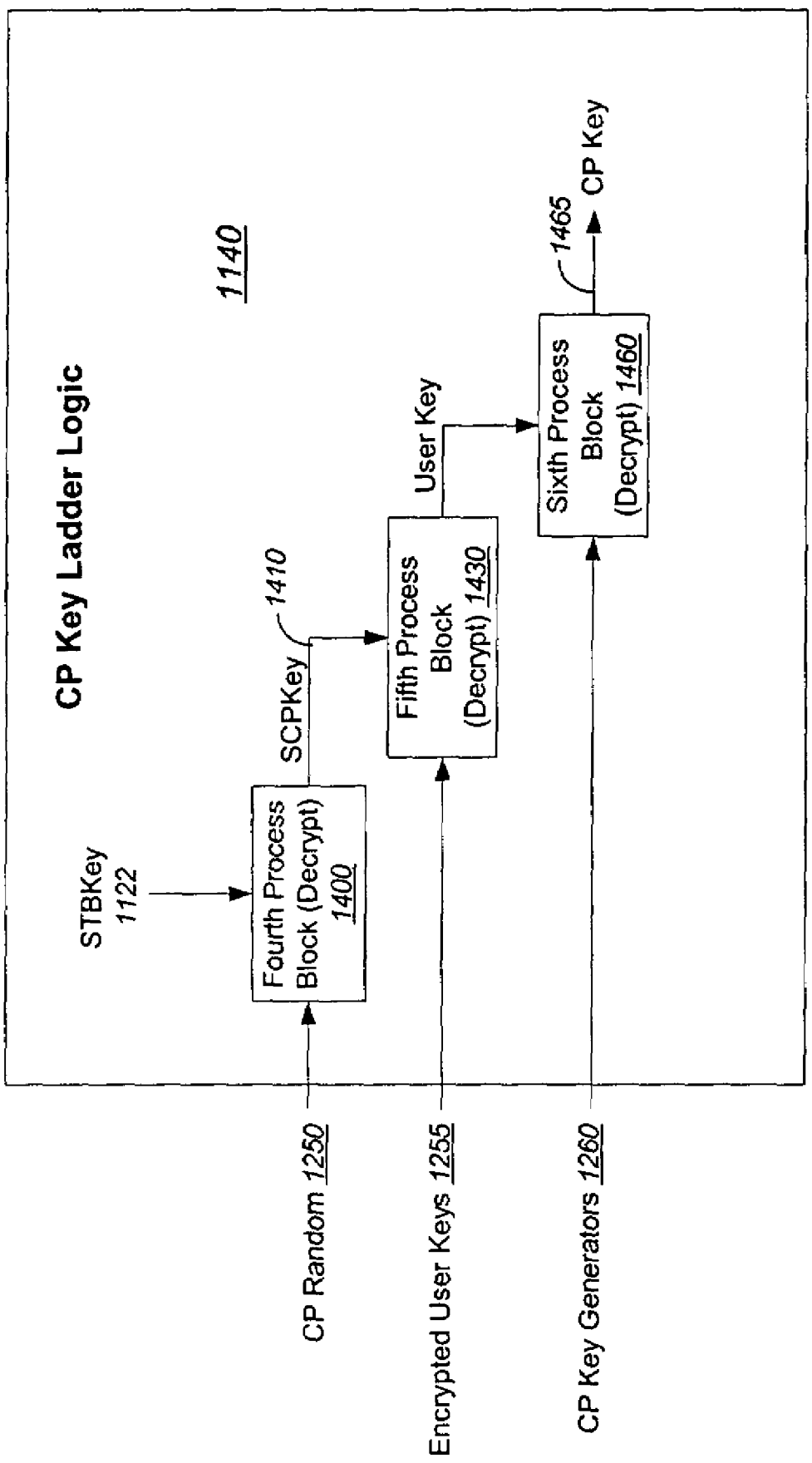
FIG. 20 is an exemplary embodiment of a Copy Protection (CP) key ladder logic of the descrambler of FIG. 15.

Referring now to FIG. 20, an exemplary embodiment of CP key ladder logic 1140 of descrambler 1110 of FIG. 15 is shown. Herein, CP key ladder logic 1140 includes a fourth process block 1400, a fifth process block 1430 and a sixth process block 1460. Fourth process block 1400 is configured to generate one or more derivative keys 1410 (hereinafter generally referred to as "SCPkey" and each referred to as "SCPkey-x", where x≧1) based on CP random 1250 and STB key 1122 or a logical derivation thereof. Fifth process block 1430 is configured to generate one or more user keys 1435 (hereinafter generally referred to as "user key" and each referred to as "user key-y", where y≧1) based on encrypted user keys 1255 or a logical derivation thereof. Sixth process block 1460 is configured to generate one or more CP keys 1465 (hereinafter generally referred to as "CP key" and each referred to as "CP key-z", where z≧1) by decrypting one or more copy protection (CP) key generators 1260 using user key 1435 (or derivatives thereof) generated by fifth process block 1430.

Figures 21A, 21B, 21C:
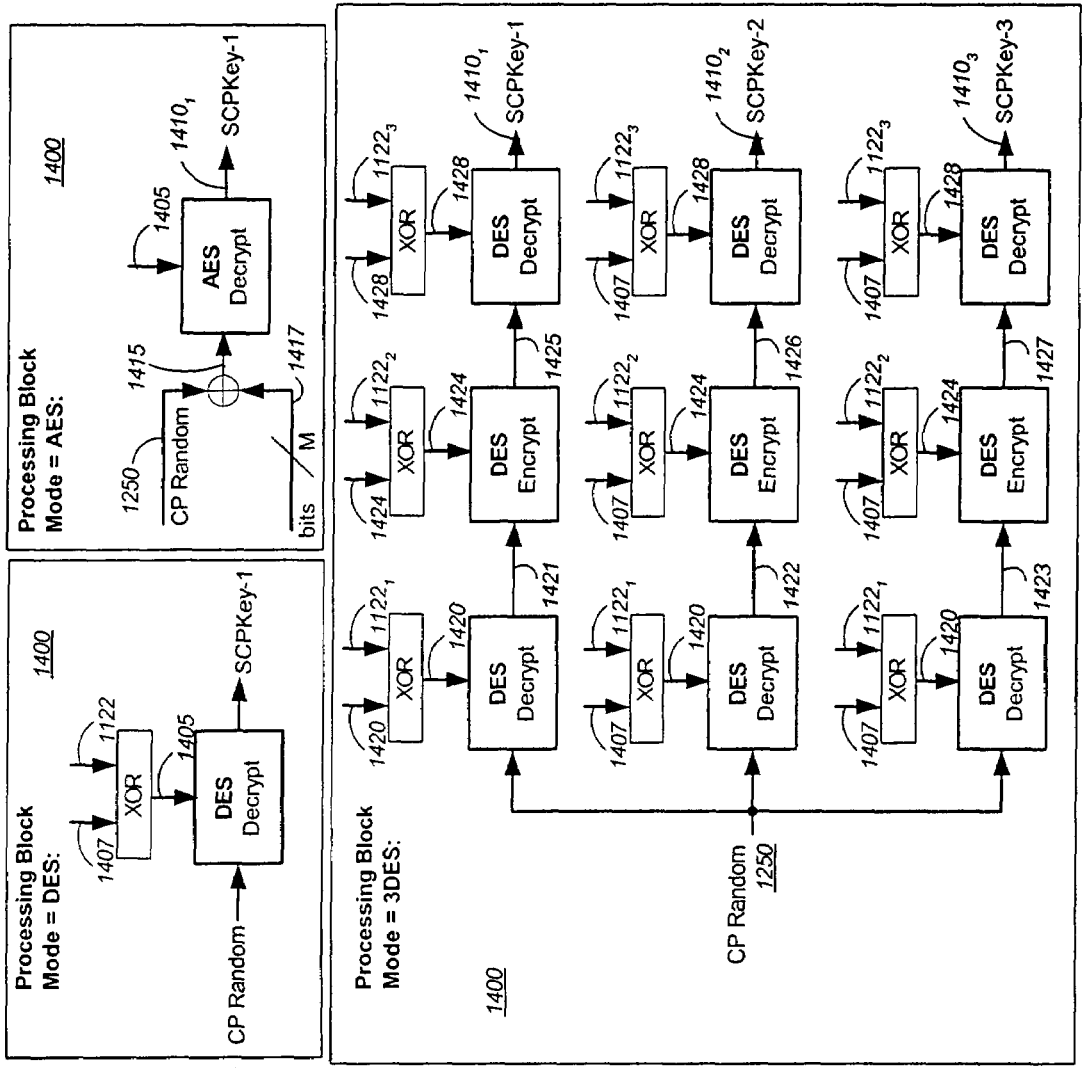
FIGS. 21A-21C are exemplary embodiments of a fourth process block of the CP key ladder logic of FIG. 20.

With respect to FIG. 21A, fourth process block 1400 performs DES cryptographic operations on CP random 1250, which is a seed value delivered to descrambler 1110 in a message from a content provider. SCPkey-1 $1410_1$ is produced based on CP random 1250 and a logical derivation 1405 of STB key 1122 (e.g., STB key-1 $1122_1$). Logical derivation 1405 is a result produced by STB key-1 $1122_1$ being XOR'ed with a predetermined value 1407. Hence, SCPkey-1 $1410_1$ is a derivative key of STB key-1 $1122_1$.

With respect to FIG. 21B, when AES cryptographic operations are performed, fourth process block 1400 is configured to generate SCPkey 1410, a derivative key of STB key 1122, based on an input bit value 1415 and logical derivation 1405. For one embodiment of the invention, input bit value 1415 comprises CP random 1250 in combination with a plurality of bits (M) 1417. Bits 1417 are positioned as the most significant bits of input bit value 1415. Herein, these "M" may be 64 bits which are all set to logic "0", although another bit size and a different logic value may be utilized. Input bit value 1415 is decrypted using logical derivation 1405 to produce SCPkey-1 $1410_1$.

With respect to FIG. 21C, when 3DES cryptographic operations are performed, fourth process block 1400 is configured to perform cryptographic operations on CP random 1250. More specifically, CP random value 1250 is decrypted based on a first logical derivation 1420, which is a value produced by predetermined value (e.g., x0AH) 1407 being XOR'ed with STB key-1 $1122_1$. Such XOR operations may be processed in parallel with each other.

The decrypted results 1421, 1422 and 1423 undergo DES encryption operations using a second logical deviation 1424, which is a result STB key-2 $1122_2$ XOR'ed with predetermined value 1407. This produces encrypted results 1425, 1426 and 1427, which are decrypted using a third logical deviation 1428. Third logical deviation is a result of STB key-3 $1122_3$ XOR'ed with predetermined value 1407. The resultant outputs are first derivative key "SCPkey-1" $1410_1$, second derivative key "SCPkey-2" $1410_2$, and third derivative key "SCPkey-3" $1410_3$.

Referring to FIGS. 22A-22C, exemplary embodiments of fifth process block 1430 of CP key ladder logic 1140 of FIG. 20 is shown. With respect to FIG. 22A, for this embodiment of the invention, fifth process block 1430 performs DES cryptographic operations on encrypted user keys 1255 utilizing SCPkey 1410 (e.g., SCPkey-1 $1410_1$) from fourth process block 1400. This produces user key 1435 (e.g., user key-1 $1435_1$) that is provided to sixth process block 1460.

It is contemplated that an XOR operation may be performed on encrypted user keys 1255 prior to receipt by fifth process block 1430. Alternatively, a logical check may be performed in lieu of XOR operations to ensure that all SCP-keys $1410_1$-$1410_x$ are unique.

With respect to FIG. 22B, when AES cryptographic operations are performed, fifth process block 1430 is configured to generate user key 1435 (e.g., user key-1 $1435_1$), based on encrypted user key 1255 and a predetermined value 1440. For one embodiment of the invention, an input value 1445 comprises encrypted user keys 1255 in combination with a plurality of bits 1440 set to predetermined logic values and positioned as the most significant bits of input value 1445. Herein, 64 bits may be used, although another bit size may be utilized. Input value 1445 is decrypted using SCPkey (e.g., SCPkey-1 $1410_1$) to produce user key $1435_1$.

With respect to FIG. 21C, when 3DES cryptographic operations are performed, fifth process block 1430 is configured to perform logical operations between predetermined values and encrypted user keys 1255. More specifically, encrypted user key 1255 is routed over a first computation path 1450. In addition, a first predetermined value 1451 (e.g., x01H) is XOR'ed with encrypted user key 1255 to produce a logical derivation 1452, which is routed over a second computation path 1453. Also, encrypted user key 1255 is XOR'ed with a second predetermined value 1454 to produce a logical derivation 1455 which is routed over a third computation path 1456. Such XOR operations may be processed in parallel with each other. For this embodiment of the invention, predetermined values 1451 and 1454 are different (x01H, x02H).

The results undergo DES decryption operations using SCPkey 1410, namely SCPkey-1 $1410_1$, SCPkey-2 $1410_2$, and SCPkey-3 $1410_3$. The final results, after undergoing encryption-decryption-encryption operations, produce user key-1 $1435_1$, user key-2 $1435_2$, and user key-3 $1435_3$.

Figures 23A, 23C:
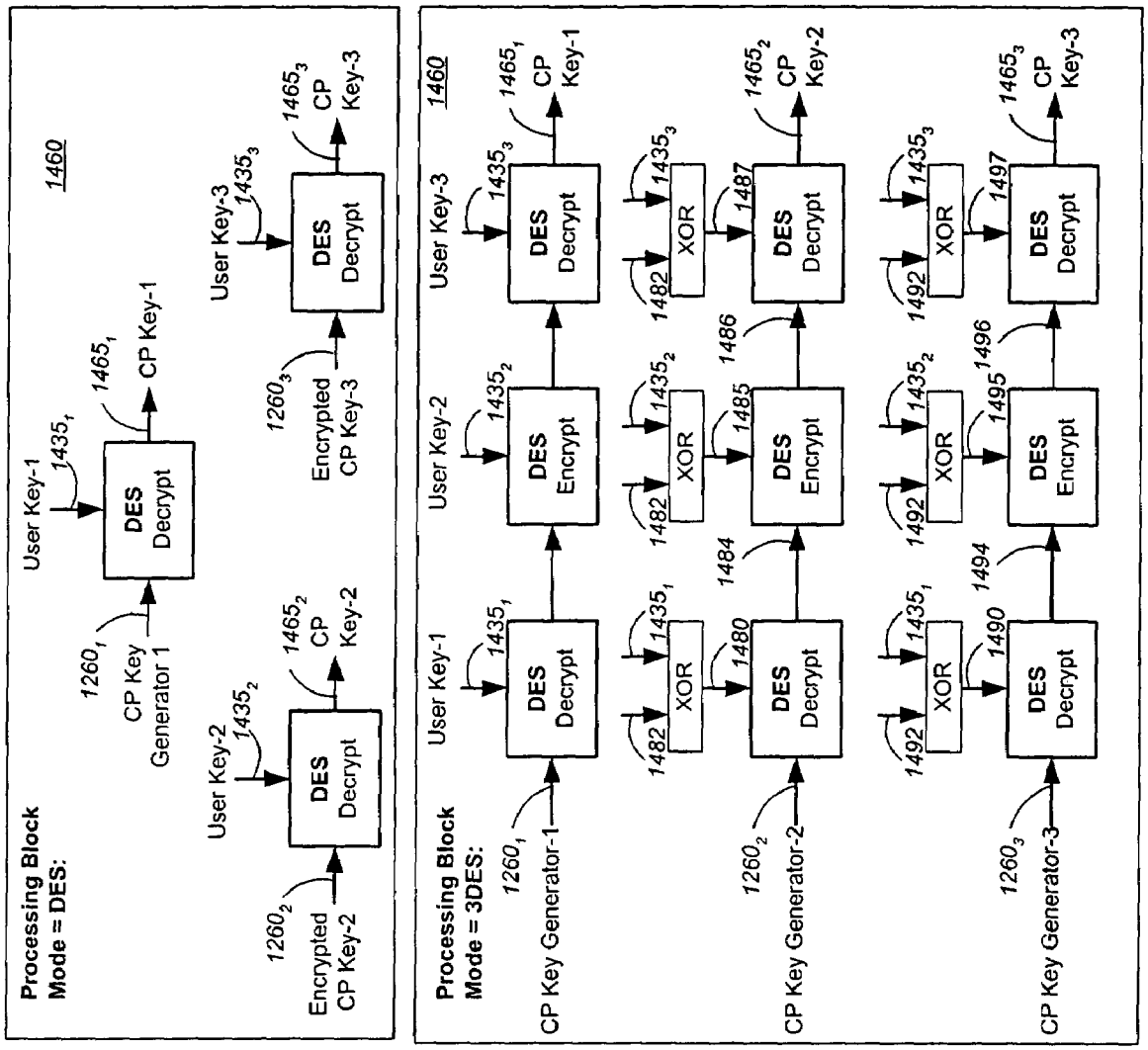
FIGS. 23A-23C are exemplary embodiments of a data decrypt logic of the descrambler of FIG. 15.
Figure 23B:
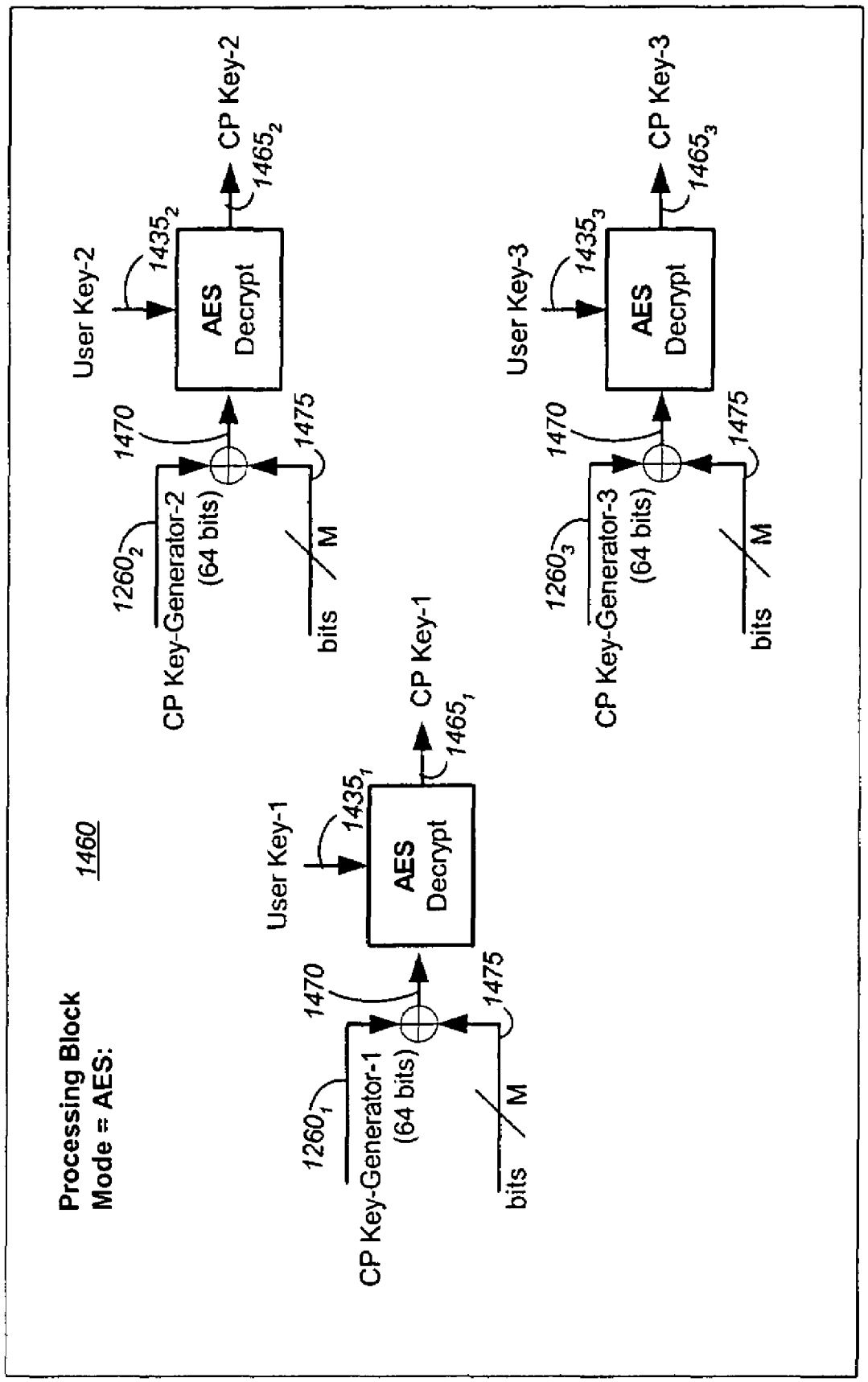

Referring to FIGS. 23A-23C, exemplary embodiments of sixth process block 1460 of CP key ladder logic 1140 is shown. With respect to DES cryptographic function as shown in FIG. 23A, one or more CP key generators 1260 ((hereinafter generally referred to as "CP key generator" and each referred to as "CP key generator-r, where r≧1) may be used to recover corresponding CP key 1465. For example, CP key generator-1 $1260_1$ is decrypted by a cryptographic function using user key-1 $1435_1$ to produce CP key-1 $1465_1$. Likewise, second and third CP key generators $1260_2$ and $1260_3$ are decrypted by a cryptographic function using user key-2 $1435_2$ and user key-3 $1435_3$. This produces a CP key-2 $1465_2$ and CP key-3 $1465_3$, respectively.

With respect to FIG. 23B, when AES cryptographic operations are performed, sixth process block 1460 is configured to recover copy protection keys for use in re-encrypting content before transmission to another digital device. For instance, according to one embodiment of the invention, a first input value 1470 comprises a concatenation of CP key generator-1 $1260_1$ and a predetermined value 1475. As shown, for illustrative purposes, CP key generator-1 $1260_1$ is situated in the least significant portion of first input value 1470 and predetermined value 1475 is situated in the most significant portion. First input value 1470 is decrypted in accordance with the AES cryptographic function using a user key (e.g., user key $1435_1$ produced by fifth process block 1430). This produces CP key-1 $1465_1$. Similar operations are performed on CP key generator-2 $1260_2$ and CP key generator-3 $1260_3$ to produce CP key-2 $1465_2$ and CP key-3 $1465_3$, respectively.

As shown in FIG. 23C, when 3DES cryptographic operations are performed, sixth process block 1460 is configured to recover copy protection keys for use in re-encrypting content before transmission to another digital device. According to one embodiment of the invention, CP key generator-1 $1260_1$ is decrypted using user key-1 $1435_1$. The result is encrypted using user key-2 $1435_2$, and then, the encrypted result is decrypted using user key-3 $1435_3$. This produces CP key-1 $1465_1$.

Similarly, second CP key generator $1260_2$ is decrypted using a first logical deviation 1480 of user key-1 $1435_1$. As one embodiment of the invention, first logical deviation 1480 is a result of user key-1 $1435_1$ XOR'ed with a predetermined value 1482. This produces a decrypted result 1484, which is subsequently encrypted using a second logical deviation 1485. Second logical deviation 1485 is a result of user key-2 $1435_2$ XOR'ed with predetermined value 1482. This produces an encrypted result 1486, which is subsequently decrypted using a third logical deviation 1487, namely a result of user key-3 $1435_3$ XOR'ed with predetermined value 1482. This produces CP key-2 $1465_2$.

In addition, CP key generator-3 $1260_3$ is decrypted using a fourth logical deviation 1480 of user key-1 $1435_1$. As one embodiment of the invention, fourth logical deviation 1490 is a result of user key-1 $1435_1$ XOR'ed with a predetermined value 1492. This produces a decrypted result 1494, which is subsequently encrypted using a fifth logical deviation 1495. Fifth logical deviation 1495 is a result of user key-2 $1435_2$ XOR'ed with predetermined value 1492. This produces an encrypted result 1496, which is subsequently decrypted using a sixth logical deviation 1497, namely a result of user key-3 $1435_3$ XOR'ed with predetermined value 1492. This produces CP key-3 $1465_3$.

Figure 24:
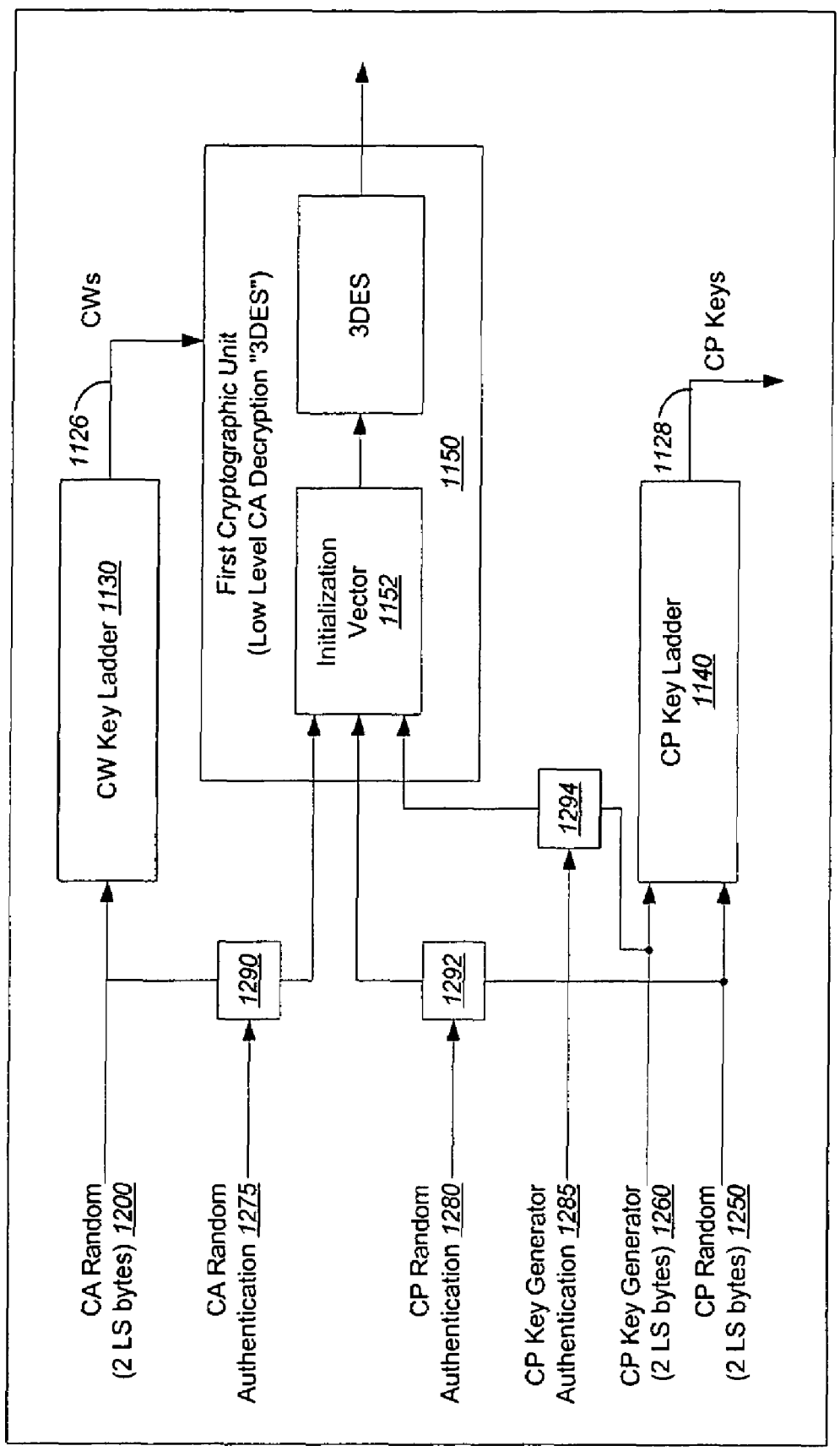
FIG. 24 is an embodiment of the descrambler of FIG. 15.

Referring now to FIGS. 15 and 24, a detailed embodiment of authentication logic implemented within descrambler 1110. Herein, the authentication logic comprises a first component 1290 adapted to route CA Random 1200 to first cryptographic unit 1150. The authentication logic further comprises a second component 1292, adapted to route at least a portion of CP random 1250 to first cryptographic unit 1150, as well as a third component 1294 adapted to route at least a portion of CP key generator 1260 to first cryptographic unit 1150.

Authentication of CA random 1200 is normally used with 3DES low-level encryption in order to verify that the correct value for CA random 1200 is being used. Such authentication is accomplished by enabling a CA Random Authentication signal 1275, which allows first component 1290 to load a portion of CA Random 1200 into an Initialization Vector 1152 of the 3DES function, such as two least significant bytes for example. Initialization Vector 1152 is adjusted to prevent a hacker from continually using an illicitly uncovered mating key, even though the secure content delivery system has been updated.

Moreover, updating CA Random value 1200 to another value may be accomplished by temporarily disabling CA Random Authentication signal 1275 while an updated CA Random is transmitted to descrambler 1110. This prevents the current CA Random value, in the process of being updated, from being improperly loaded into first cryptographic unit 1150.

After a certain period of time of elapsed to allow the updated CA Random value has propagated through the secure content delivery system, CA Random Authentication signal 1275 is again enabled.

Referring still to FIGS. 15 and 24, authentication of CP Random 1250 is used with 3DES low-level encryption to verify that the correct CP Random value and derivative user key are being used. When enabled, CP Random Authentication signal 1280 allows second component 1292 to load at least a portion of CP Random 1250, such as the two least significant bytes of CP Random 1250 for example, into Initialization Vector 1152 of the 3DES function. Otherwise, it may be possible for a hacker writing rogue code to tag all content with the same user key in order to recover the CP keys and share content with other players which would not ordinarily get access to certain content.

Authentication of at least a portion of CP key generator 1260 is used to authenticate the copy protection status of content. When enabled, CP Key Generator Authentication signal 1285 allows third component 1294 to load a portion of CP key generator 1260 into Initialization Vector 1152 of the 3DES low-level encryption function. For one embodiment, the two least significant bytes of CP key generator 1260 are loaded. Of course, different groups of bytes forming CP key generator 1260 may be loaded for authentication purposes. Otherwise, it may be possible for a hacker writing rogue code to tag all content as "copy free".

According to one embodiment of the invention, a content provider is responsible for enabling and disabling of CA Random Authentication signal 1275, CP Random Authentication signal 1280 and CP Key Generator Authentication signal 1285.

Figure 25:
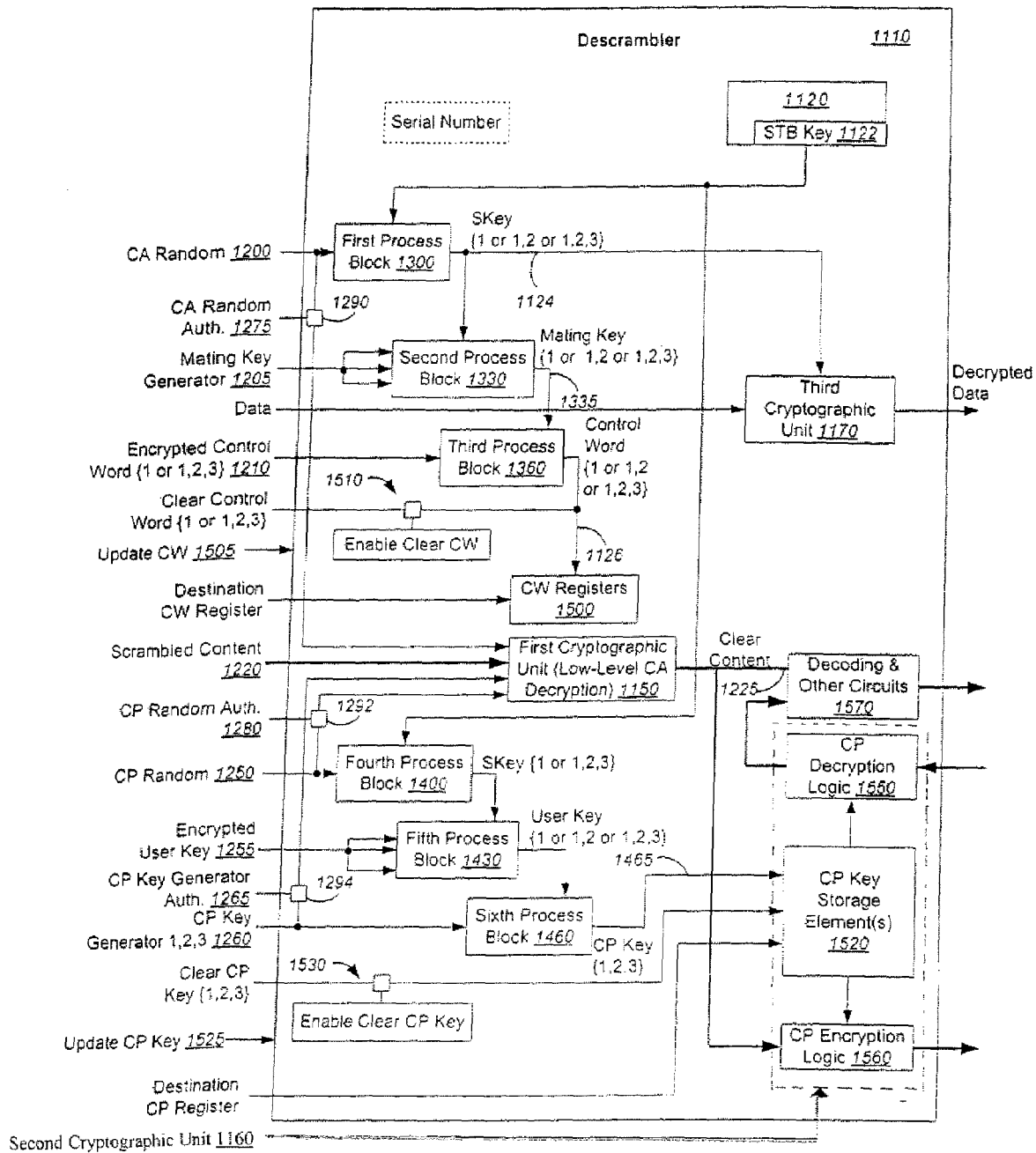
FIG. 25 is a more detailed embodiment of the descrambler of FIG. 24.
Figure 13:
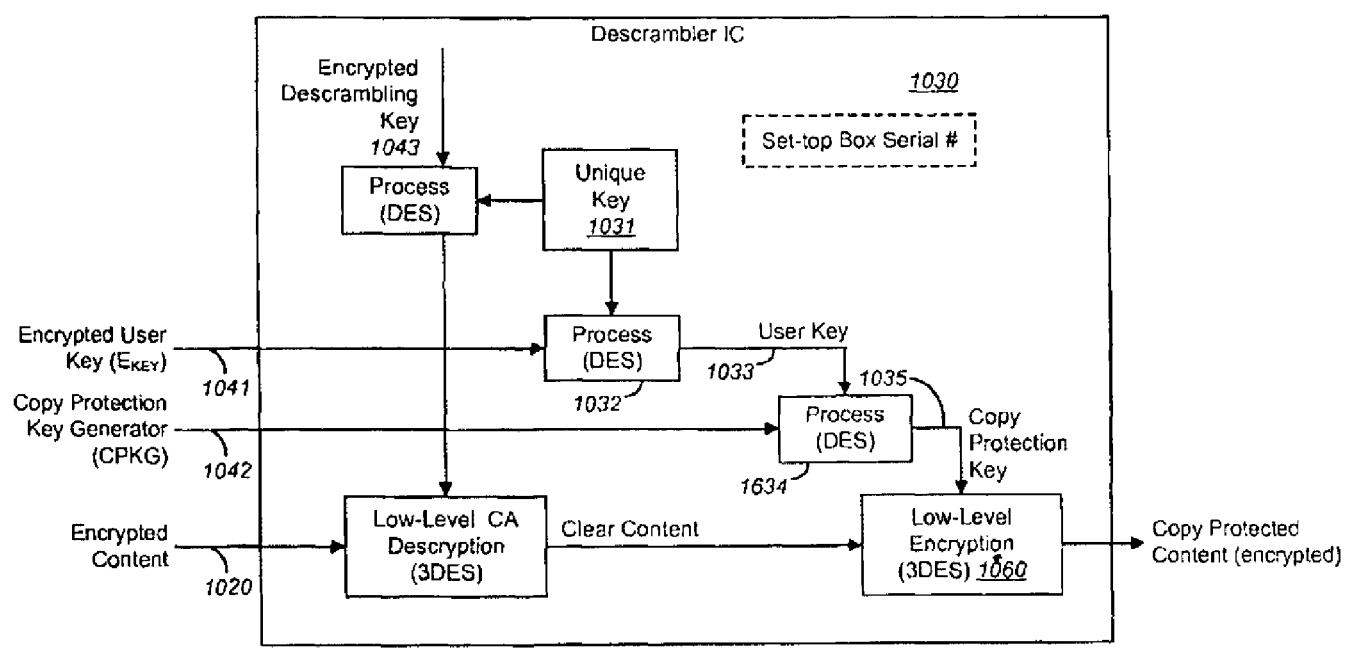

Referring now to FIG. 25, a detailed embodiment of the descrambler 1110 of FIG. 24 is shown. As described above, descrambler 1110 comprises one-time programmable memory 1120; a plurality of process blocks 1300, 1330, 1360, 1400, 1430, 1460; a plurality of cryptographic units 1150, 1160, 1170; and authentication logic 1290, 1292, 1294.

In general, first process block 1300 produces Skey 1124 based on CA Random 1200 and STB key 1122. Second process block 1330 produces mating key 1335 based on mating key generator 1205 and Skey 1124. Third process block 1360 produces control words 1126 recovered from one or more encrypted control words 1210 using mating key 1335. Control words 1126 are stored in one or more storage components 1500 such as random access memory, flash memory, or registers for example.

By enabling an Update CW signal 1505, additional control words are allowed to be stored within storage component 1500. By disabling Clear CW signal 1510, however, some or all of control words 1126 stored in storage component 1500 are removed (i.e., their storage location can be overwritten).

Fourth process block 1400 produces one or more SCPkeys 1410 based on CP Random 1250 and STB keys 1122. Fifth process block 1430 produces user key 1435 based on one or more encrypted user keys 1255 and SCPkey 1410. Sixth process block 1460 produces CP key 1465 based on CP key generator 1260 and user key 1435. CP keys 1465 are stored in one or more key storage components 1520 such as registers, random access memory, flash memory, or the like. By enabling an Update CP Key signal 1525, additional CP keys 1465 can be stored within key storage component 1520. By enabling Clear CP Key signal 1530, however, some or all of CP keys 1465 stored in storage component 1520 are not preserved.

As further shown in FIG. 25, CP decryption logic 1550 is part of second cryptographic unit 1160 of FIG. 15. CP decryption logic 1550 decrypts encrypted (copy protected) content from a digital device using CP keys stored within key storage components 1520. CP encryption logic 1560 encrypts content in the clear using CP keys stored within key storage components 1520. Decoding circuitry 1570 performs decompression of the video and audio content. After decompression, there are two possibilities, 1) digital to analog conversion, e.g. for baseband video out and audio out, or 2) the decompressed digital content can be encoded for transmittal across the Digital Video Interface (DVI).

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A descrambler comprising:
a non-volatile memory to store a unique key;
a control word key ladder logic to produce (i) a first value generated based on a seed value and the unique key, (ii) a second value generated using the first value, the second value being a mating key recovered by performing a decryption operation on a mating key generator using the first value, the mating key generator being a message comprising one or more of the following: a manufacturer identifier, a service provider identifier, a conditional access (CA) provider identifier and a mating key sequence number, and (iii) a third value recovered by a cryptographic operation using the second value;
a first cryptographic unit to descramble incoming content in a scrambled format based on the third value; and
a second cryptographic unit to decrypt incoming encrypted data using the first value.

2. The descrambler of claim 1 being a single integrated circuit.

3. The descrambler of claim 1 implemented within a set-top box.

4. The descrambler of claim 1, wherein the first value is a derivative key generated by performing a decryption operation on the seed value using the unique key.

5. The descrambler of claim 1, wherein the first value is a derivative key derived by performing a decryption operation on a combination of the seed value and padding data.

6. The descrambler of claim 5, wherein the second value is a mating key recovered by performing a decryption operation on at least 128-bits of data comprising a mating key generator being a message comprising one or more of the following: a manufacturer identifier, a service provider identifier, a conditional access (CA) provider identifier and a mating key sequence number.

7. The descrambler of claim 1, wherein the third value is a control word recovered by performing a decryption operation on an encrypted control word using the mating key.

8. The descrambler of claim 6, wherein the third value is a control word recovered by performing (i) a first decryption operation using the mating key on a first combination of a first encrypted control word and a second encrypted control word, and (ii) a second decryption operation using the mating key on a second combination of a third encrypted control word and a plurality of bits operating as padding for the second combination to be at least 128-bits in length.

9. The descrambler of claim 1 further comprising a third cryptographic unit to encrypt the descrambled incoming content prior to transmission to a digital device.

10. The descrambler of claim 9 further comprising a copy protection ladder logic to produce a copy protection key used by the third cryptographic unit to encrypt the descrambled incoming content.

11. The descrambler of claim 10, wherein the copy protection ladder logic to produce a copy protection key by performing a decryption operation on a concatenation of a seed value and a plurality of bits to produce a result being at least 128-bits in length, using a logical derivation being a result of an Exclusive OR (XOR) operation of the unique key and a predetermined value.

12. A descrambler comprising:
a control word key ladder logic to produce (i) a first value generated from a cryptographic operation on a seed value using a unique key, (ii) a second value recovered from a mating key generator undergoing a cryptographic operation using the first value where the mating key generator is a message that comprises at least one of a set-top-box manufacturer identifier, a service provider identifier, a conditional access (CA) provider identifier and a mating key sequence number, and (iii) a control word recovered by decrypting an encrypted control word using the second value; and
a first cryptographic unit to descramble incoming content in a scrambled format using the control word.

13. The descrambler of claim 12 being a single integrated circuit.

14. The descrambler of claim 12 further comprising a second cryptographic unit to decrypt incoming encrypted program data received out-of-band by a digital device implemented with the descrambler.

15. The descrambler of claim 14, wherein the encrypted program data comprises an encrypted entitlement management message that comprises at least two of (i) a smart card identifier, (ii) a length field, (iii) a mating key generator, (iv) at least one key identifier and (v) at least one key associated with the at least one key identifiers.

16. The descrambler of claim 15, where the mating key generator is part of the encrypted entitlement management message.

17. The descrambler of claim 12 further comprising a copy protection ladder logic to produce a copy protection key based on a plurality of process blocks, wherein
a first process block configured to generate a derivative key based on a second seed value and either the unique key or a logical derivation of the unique key,
a second process block configured to recover a user key from an encrypted user key using the derivative key, and
a third process block configured to generate a copy protection key from a copy protection key generator using the user key.

18. The descrambler of claim 17 further comprising a third cryptographic unit to encrypt the descrambled incoming content using the copy protection key prior to transmission to a digital device.

19. The descrambler of claim 17 further comprising a one-time programmable, non-volatile memory coupled to the control word key ladder logic and the copy protection ladder logic, the non-volatile memory to store the unique key.

20. The descrambler of claim 18 further comprising a memory to store the copy protection key, the memory being coupled to the third cryptographic unit.

21. A descrambler comprising:
a memory to store a unique key;
a control word key ladder logic coupled to the memory, the control word ladder logic comprising
a first process block configured to generate a first derivative key of the unique key,
a second process block configured to generate a mating key from a mating key generator using the first derivative key, the mating key generator being a message that comprises at least one of a set-top-box manufacturer identifier, a service provider identifier, a conditional access (CA) provider identifier and a mating key sequence number, and
a third process block configured to recover a control word by decrypting an encrypted control word using the mating key; and
a first cryptographic unit coupled to the control word key ladder logic, the first cryptographic unit to descramble incoming content in a scrambled format using the control word.

22. The descrambler of claim 21 being a single integrated circuit.

23. The descrambler of claim 21 further comprising a second cryptographic unit to decrypt incoming encrypted program data received out-of-band by a digital device implemented with the descrambler.

24. The descrambler of claim 23, wherein the encrypted program data comprises an encrypted entitlement management message that comprises at least two of (i) a smart card identifier, (ii) a length field, (iii) a mating key generator, (iv) at least one key identifier and (v) at least one key associated with the at least one key identifier.

25. The descrambler of claim 21 further comprising a copy protection ladder logic coupled to the first cryptographic unit, the copy protection ladder logic comprising
a fourth process block configured to generate a second derivative key based on a random value and the unique key;
a fifth process block configured to decrypt an encrypted user key using the second derivative key to recover a user key; and
a sixth process block configured to generate a copy protection key from a copy protection key generator using the user key.

26. The descrambler of claim 25 further comprising a second cryptographic unit to encrypt the descrambled incoming content using the copy protection key prior to transmission to a digital device.

27. A descrambler comprising:
a non-volatile memory to store a plurality of unique keys;
a control word key ladder logic to produce (i) a plurality of derivative keys generated based on a seed value and a corresponding plurality of unique keys, (ii) a plurality of mating keys generated using the plurality of derivative keys, wherein the plurality of mating keys comprise at least a first mating key generated by performing at least one transformation on a mating key generator using the plurality of unique keys, the mating key generator being a message that comprises at least one of a manufacturer identifier, a service provider identifier, a conditional access (CA) provider identifier and a mating key sequence number, and (iii) a plurality of control words recovered using the plurality of mating keys; and a first cryptographic unit to descramble incoming content in a scrambled format based on at least one of the plurality of control words.

28. The descrambler of claim 27, wherein the plurality of derivative keys comprising:
   (i) a first derivative key generated by the seed value undergoing at least three transformations in succession, wherein a first transformation is performed on the seed using a first unique key of the plurality of unique keys to produce a first result, a second transformation is performed on the first result using a second unique key of the plurality of unique keys to produce a second result, and a third transformation is performed on the second result using a third unique key of the plurality of unique keys to produce the first derivative key,
   (ii) a second derivative key is generated by the seed value and a first predetermined value undergoing a bitwise logical operation to produce a fourth result, followed by the fourth result undergoing at least three transformations in succession, wherein a fourth transformation is performed on the fourth result using the first unique key to produce a fifth result, a fifth transformation is performed on the fifth result using the second unique key to produce a sixth result, and a sixth transformation is performed on the sixth result using the third unique key to produce the second derivative key, and
   (iii) a third derivative key is generated by the seed value and a second predetermined value, differing from the first predetermined value, undergoing a bitwise logical operation to produce a seventh result, followed by the seventh result undergoing at least three transformations in succession, wherein a seventh transformation is performed on the seventh result using the first unique key to produce an eighth result, a eighth transformation is performed on the eighth result using the second unique key to produce a ninth result, and a ninth transformation is performed on the ninth result using the third unique key to produce the third derivative key.

29. The descrambler of claim 27, wherein the plurality of mating keys comprising
   (i) the first mating key generated by the mating key generator undergoing at least three transformations in succession, wherein a first transformation being performed on the mating key generator using a first derivative key of the plurality of derivative keys to produce a first result, a second transformation being performed on the first result using a second derivative key of the plurality of derivative keys to produce a second result, and a third transformation being performed on the second result using a third derivative key of the plurality of derivative keys to produce the first mating key,
   (ii) a second mating key generated by the mating key generator and a first predetermined value undergoing a bitwise logical operation to produce a third result, followed by the third result undergoing at least three transformations in succession, wherein a fourth transformation being performed on the third result using the first derivative key to produce a fourth result, a fifth transformation being performed on the fourth result using the second derivative key to produce a fifth result, and a sixth transformation being performed on the fifth result using the third derivative key to produce the second mating key, and
   (iii) a third mating key is generated by the mating key generator and a second predetermined value, differing from the first predetermined value, undergoing a bitwise logical operation to produce a sixth result, followed by the sixth result undergoing at least three transformations in succession, wherein a seventh transformation being performed on the sixth result using the first derivative key to produce an seventh result, a eighth transformation being performed on the seventh result using the second derivative key to produce an eighth result, and a ninth transformation being performed on the eighth result using the third derivative key to produce the third mating key.

30. The descrambler of claim 28, wherein the plurality of control words comprising
   (i) a first control word recovered by a first encrypted control word undergoing at least three transformations in succession, wherein a first transformation being performed on a first encrypted control word using the first mating key of the plurality of mating keys to produce a first result, a second transformation being performed on the first result using a second mating key of the plurality of mating keys to produce a second result, and a third transformation being performed on the second result using a third mating key of the plurality of mating keys to produce the first control word,
   (ii) a second control word recovered from a second encrypted control word and a first predetermined value undergoing a bitwise logical operation to produce a third result, followed by the third result undergoing at least three transformations in succession, wherein a fourth transformation being performed on the third result using the first mating key to produce a fourth result, a fifth transformation being performed on the fourth result using the second mating key to produce a fifth result, and a sixth transformation being performed on the fifth result using the third mating key to produce the second control word, and
   (iii) a third control word recovered from a third encrypted control word and a second predetermined value, differing from the first predetermined value, undergoing a bitwise logical operation to produce a sixth result, followed by the sixth result undergoing at least three transformations in succession, wherein a seventh transformation being performed on the sixth result using the first mating key to produce an seventh result, a eighth transformation being performed on the seventh result using the second mating key to produce an eighth result, and a ninth transformation being performed on the eighth result using the third mating key to produce the third control word.

31. The descrambler of claim 29, wherein the bitwise logical operation is an Exclusive OR operation.

* * * * *

UNITED STATES PATENT AND TRADEMARK OFFICE
CERTIFICATE OF CORRECTION

| | | |
|---|---|---|
| PATENT NO. | : 7,711,115 B2 | Page 1 of 2 |
| APPLICATION NO. | : 10/690192 | |
| DATED | : May 4, 2010 | |
| INVENTOR(S) | : Brant L. Candelore | |

It is certified that error appears in the above-identified patent and that said Letters Patent is hereby corrected as shown below:

In the Drawings

Figure 13 should be deleted and substitute therefor the attached fig. 13 as shown on the attached page 2.

Signed and Sealed this
Fourth Day of November, 2014

Michelle K. Lee
*Deputy Director of the United States Patent and Trademark Office*